United States Patent
Lee et al.

(10) Patent No.: US 10,135,662 B2
(45) Date of Patent: Nov. 20, 2018

(54) METHOD FOR GENERATING PREAMBLE SEQUENCE IN WIRELESS LAN SYSTEM

(71) Applicant: LG ELECTRONICS INC., Seoul (KR)

(72) Inventors: Kilbom Lee, Seoul (KR); Hangyu Cho, Seoul (KR); Wookbong Lee, Seoul (KR); Jinsoo Choi, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/524,873

(22) PCT Filed: Nov. 30, 2015

(86) PCT No.: PCT/KR2015/012902
§ 371 (c)(1),
(2) Date: May 5, 2017

(87) PCT Pub. No.: WO2016/089056
PCT Pub. Date: Jun. 9, 2016

(65) Prior Publication Data
US 2017/0373911 A1     Dec. 28, 2017

Related U.S. Application Data

(60) Provisional application No. 60/086,592, filed on Dec. 2, 2014, provisional application No. 62/086,719, filed on Dec. 3, 2014.

(51) Int. Cl.
*H04B 1/16* (2006.01)
*H04L 27/26* (2006.01)
*H04L 27/38* (2006.01)

(52) U.S. Cl.
CPC ...... *H04L 27/2694* (2013.01); *H04L 27/3872* (2013.01)

(58) Field of Classification Search
CPC ............ H04L 27/2675; H04L 27/2692; H04L 27/2694; H04L 27/3872; H04W 84/12; H04W 72/04; H04W 74/004; H04W 88/02; H04W 88/08
See application file for complete search history.

(56) References Cited

U.S. PATENT DOCUMENTS

| | | | | |
|---|---|---|---|---|
| 7,515,581 B2 * | 4/2009 | Moorti | ................ | H04L 27/2613 370/335 |
| 8,027,329 B2 * | 9/2011 | Hafeez | ................ | H04B 1/7077 370/328 |
| 8,116,195 B2 * | 2/2012 | Hou | .................... | H04J 13/0062 370/208 |

(Continued)

*Primary Examiner* — Nhan Le
(74) *Attorney, Agent, or Firm* — Birch, Stewart, Kolasch & Birch, LLP

(57) ABSTRACT

Disclosed is a sequence generation method comprising: generating a basic sequence structure including $C_{48}$ having 48 tones, $X_6$ having six tones, and $X_5$ having five tones; selecting any one of a plurality of phase rotation factors predetermined for a bandwidth; and generating a sequence to be inputted into a preamble to be transmitted to a terminal, by using the phase rotation factor, applied in basic sequence structural units, and the basic sequence structure.

16 Claims, 13 Drawing Sheets

(56) References Cited

U.S. PATENT DOCUMENTS

| | | | |
|---|---|---|---|
| 8,213,523 B2* | 7/2012 | Birru | H04L 27/261 370/331 |
| 8,619,902 B2* | 12/2013 | Zheng | H04L 27/2605 370/336 |
| 9,178,745 B2* | 11/2015 | Zhang | H04L 1/0046 |
| 2011/0013607 A1 | 1/2011 | Van Nee et al. | |
| 2011/0013721 A1 | 1/2011 | Liao et al. | |
| 2012/0051454 A1 | 3/2012 | Zheng et al. | |
| 2014/0029681 A1 | 1/2014 | Zhang et al. | |
| 2014/0163507 A1 | 6/2014 | Kudo et al. | |

* cited by examiner

METHOD FOR GENERATING PREAMBLE SEQUENCE IN WIRELESS LAN SYSTEM

TECHNICAL FIELD

The present invention relates to a wireless communication system, and more particularly, to a method and apparatus for generating a sequence to be used between a user equipment (UE) and a base station (BS).

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, if the number of apparatuses is increased, in order to reduce unnecessary power consumption and interference, a channel access mechanism needs to be more efficiently improved.

DISCLOSURE

Technical Problem

An object of the present invention devised to enhance performance of a sequence to be transmitted to a user equipment (UE) in a new communication system.

An object of the present invention devised to maximize gain in terms of adaptive gain control (AGC) while minimizing performance degradation in terms of a peak to average power ratio (PAPR).

An object of the present invention devised to variously provide sequences to be used by a communication system by proposing a plurality of phase rotation factors for obtaining the same PAPR according to a communication bandwidth.

The technical problems solved by the present invention are not limited to the above technical problems and other technical problems which are not described herein will become apparent to those skilled in the art from the following description.

Technical Solution

The object of the present invention can be achieved by providing a method of generating a sequence, including generating a basic sequence structure including $C_{48}$ including 48 tones and having 12 non-zero values, $X_6$ including 6 tones and having one non-zero value, and $X_5$ including five tones and having one non-zero value, determining X1 that is a non-zero value included in the $X_6$ and X2 that is a non-zero value included in the $X_5$, selecting any one of a plurality of predetermined phase rotation factors with respect to a bandwidth for communication with a user equipment (UE), and generating a sequence inserted into a preamble to be transmitted to the UE using the basic sequence structure and the phase rotation factor, wherein the phase rotation factor is applied in a unit of the basic sequence structure that is repeatedly included in the sequence once or more.

The basic sequence structure may be configured in the form of $X_6 C_{48(1:24)} 0_5 C_{48(25:48)} X_5$, the $C_{48(1:24)}$ may indicate first to $24^{th}$ tones of the $C_{48}$, the $C_{48(25:48)}$ may indicate $25^{th}$ to $48^{th}$ tones of the $C_{48}$, and $0_5$ may indicate five consecutive 0.

The $X_6$ may be configured in the form of [0, 0, 0, 0, X1, 0] and the $X_5$ may be configured in the form of [0, X2, 0, 0, 0].

The X1 and the X2 may satisfy Mathematical Expression $$[X_1 \ X_2] = \frac{1}{\sqrt{2}}[-1-j \ \ 1+j].$$

The basic sequence structure may be configured in the form of $X_6 C_{48(1:24)} A_5 C_{48(25:48)} X_5$, the $C_{48(1:24)}$ indicates first to $24^{th}$ tones of the $C_{48}$, the $C_{48(25:48)}$ indicates $25^{th}$ to $48^{th}$ tones of the $C_{48}$, and $A_5$ may include 5 tones and may include one non-zero value in a central part.

The basic sequence structure may be repeated once to generate the sequence with respect to a bandwidth of 20 MHz, the basic sequence structure is repeated twice and the sequence is generated using two corresponding phase rotation values with respect to a bandwidth of 40 MHz, and the basic sequence structure is repeated four times and the sequence is generated using four corresponding phase rotation values with respect to a bandwidth of 80 MHz.

The basic sequence structure may be repeated once to generate the sequence with respect to a bandwidth of 20 MHz, a sequence obtained by removing $X_6$ and $X_5$ from the basic sequence structure may be repeated twice and a sequence may be generated using two corresponding phase rotation values and $A_{11}$, $X_6$, and $X_5$ with respect to a bandwidth of 40 MHz, and a sequence obtained by removing $X_6$ and $X_5$ from the sequence of a bandwidth of 40 MHz may be repeated twice and a sequence may be generated using two corresponding phase rotation values with respect to a bandwidth of 80 MHz.

The $A_{11}$ may be configured in the form of [0, A2, 0, 0, 0, A3, 0, 0, 0, A4, 0] and the A2, A3, and A4 may be a complex number that is not 0.

The method may further include inserting the generated sequence into the preamble and transmitting the sequence to the UE.

In another aspect of the present invention, provided herein is an access point (AP) including a transmitter, a receiver, and a processor connected to the transmitter and the receiver and configured to generate a sequence, wherein the processor may generate a basic sequence structure including $C_{48}$ including 48 tones and having 12 non-zero values, $X_6$ including 6 tones and having one non-zero value, and $X_5$ including five tones and having one non-zero value, determines X1 that is a non-zero value included in the $X_6$ and X2 that is a non-zero value included in the $X_5$, select any one of a plurality of predetermined phase rotation factors with respect to a bandwidth for communication with a user equipment (UE), and generate a sequence inserted into a preamble to be transmitted to the UE using the basic sequence structure and the phase rotation factor, and the phase rotation factor may be applied in a unit of the basic sequence structure that is repeatedly included in the sequence once or more.

Advantageous Effects

According to the embodiments of the present invention have the following effects.

First, a preamble sequence with enhanced performance may be used in a new communication with an increased bandwidth.

Second, performance degradation may be minimized in terms of a peak to average power ratio (PAPR) while obtaining gain of adaptive gain control (AGC) performance.

Third, a communication system may select and use any one of among various sequence candidates by proposing a plurality of sequences with respect to a bandwidth.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Figure 1:
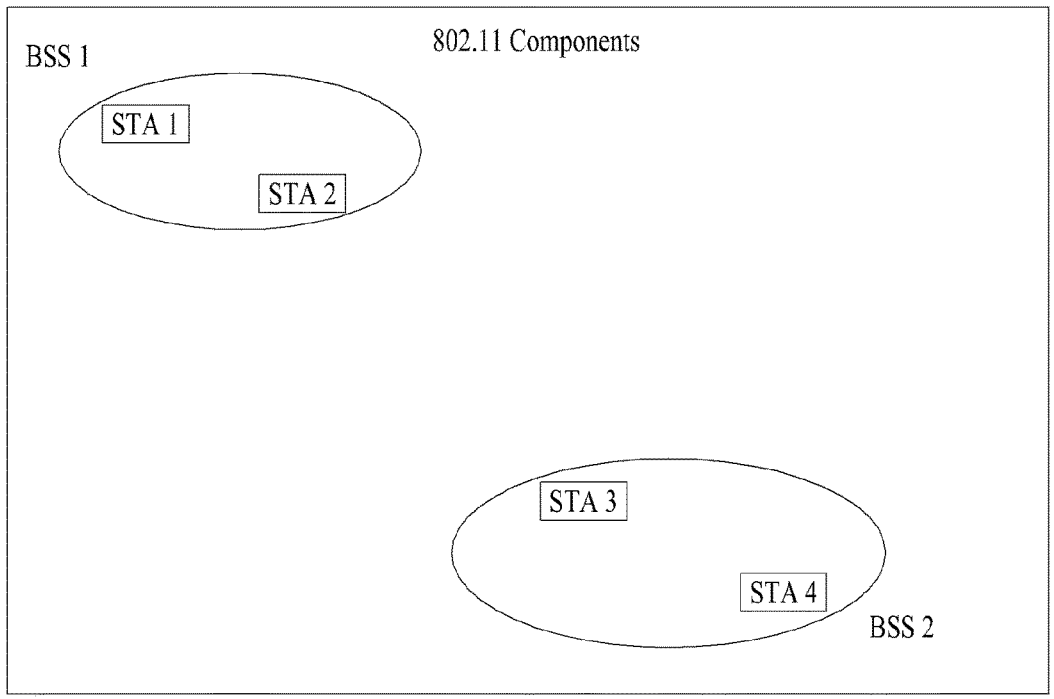
FIG. 1 is a diagram showing an exemplary structure of an IEEE 802.11 system to which the present invention is applicable.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. IEEE 802.11 System Overview 1.1 Structure of WLAN System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
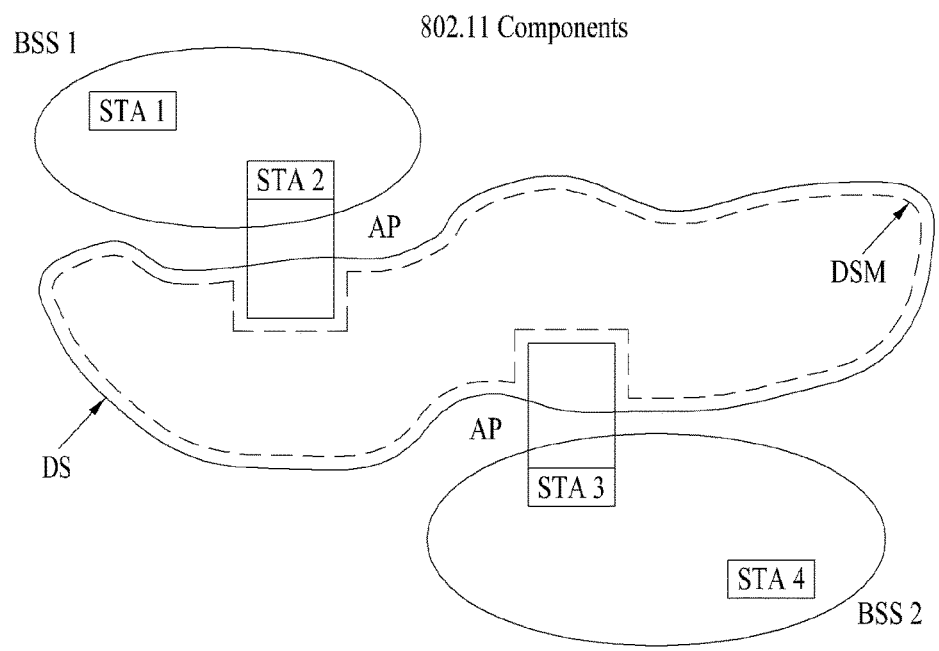
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance. Although such distance restriction may be possible, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since plural media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
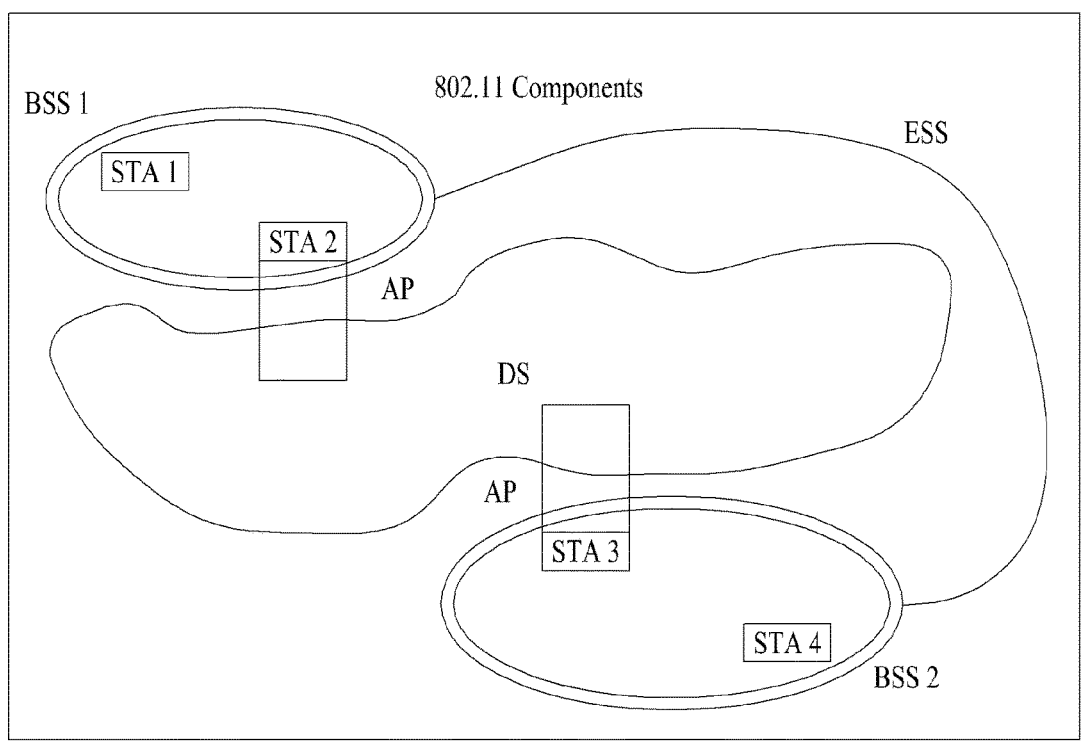
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network may be physically present in the same space as one (or more) ESS network. This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
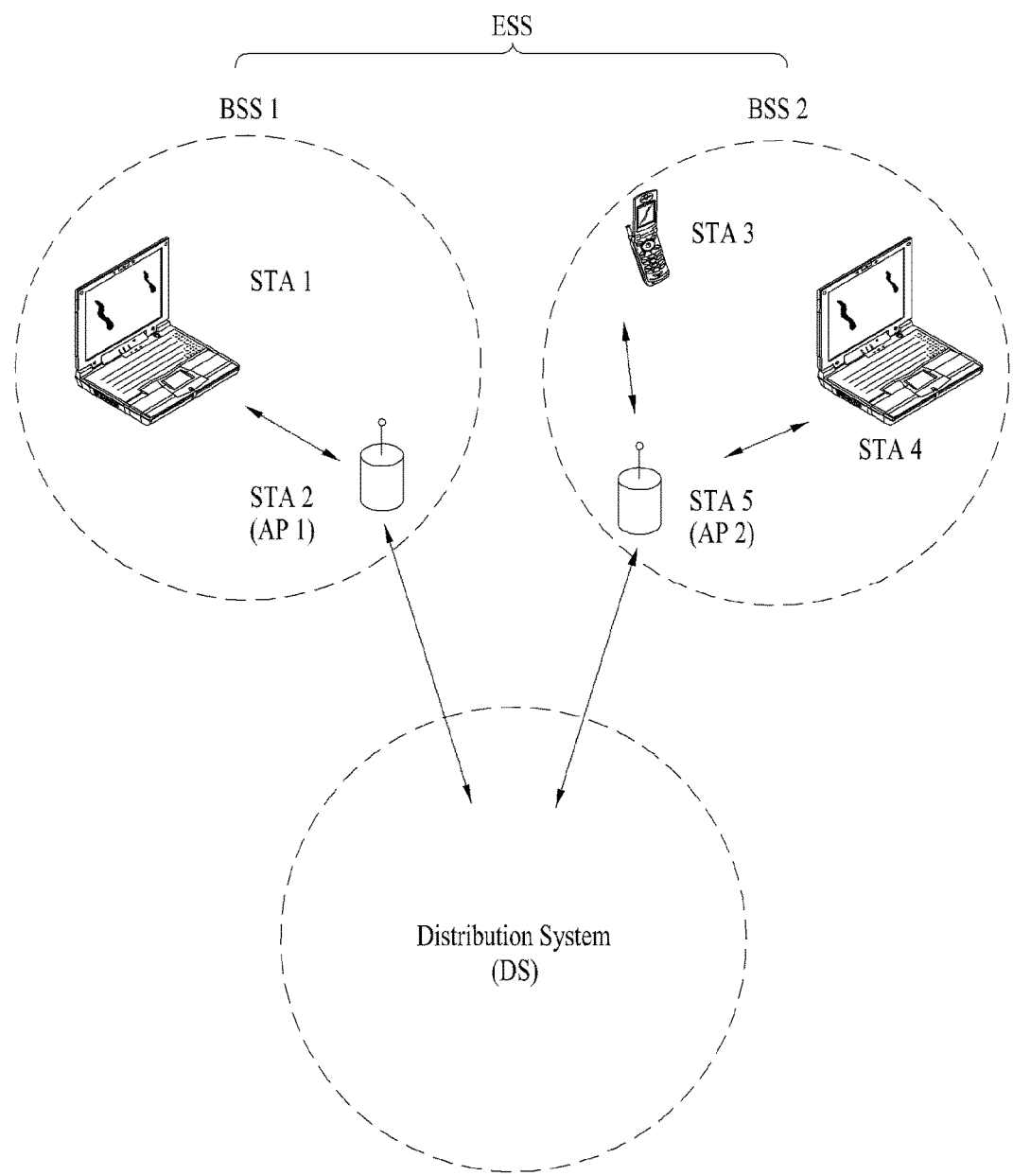
FIG. 4 is a diagram showing an exemplary structure of a WLAN system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

1.2 Link Setup Process

Figure 5:
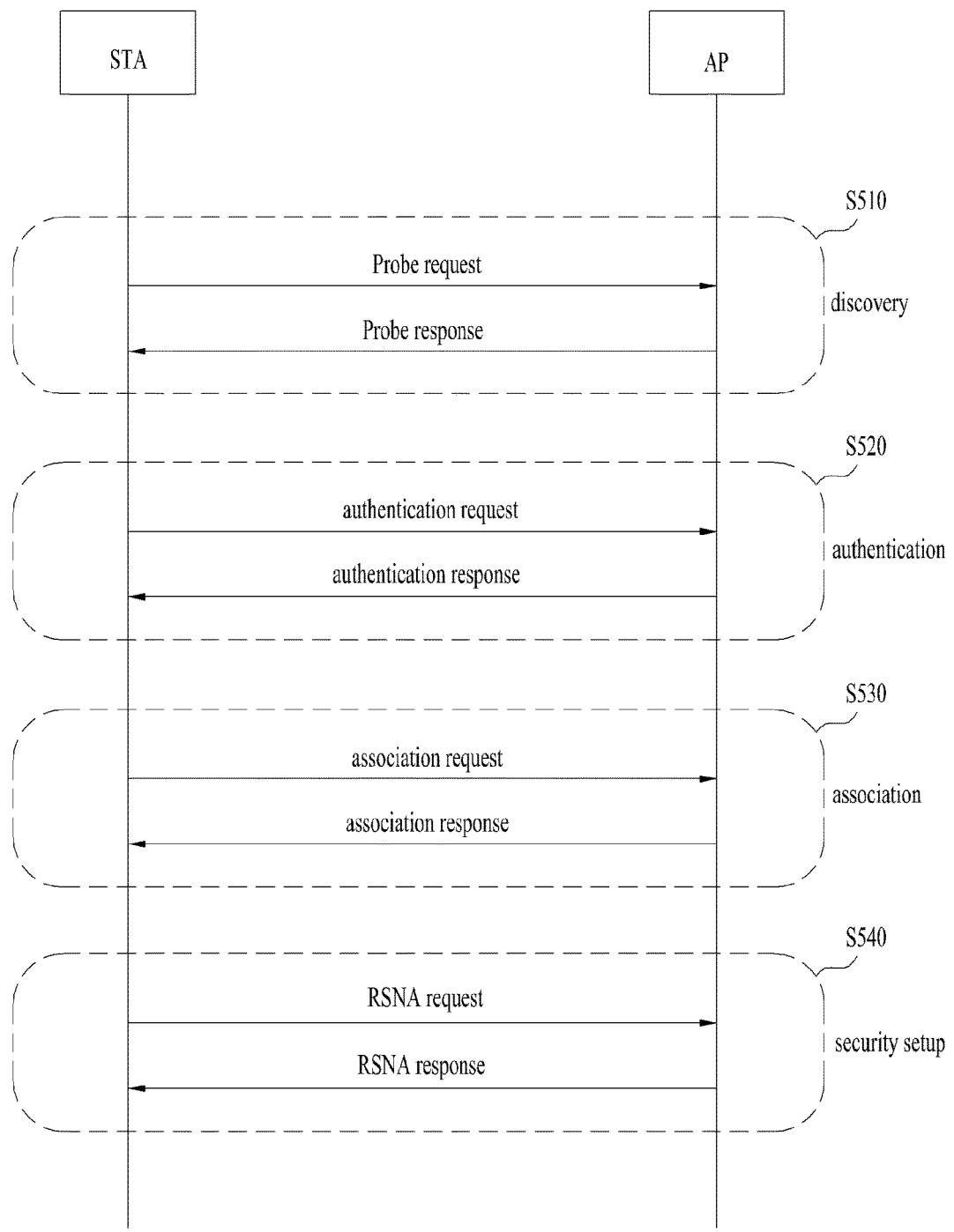
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning. The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

2.1 Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

2.2 Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
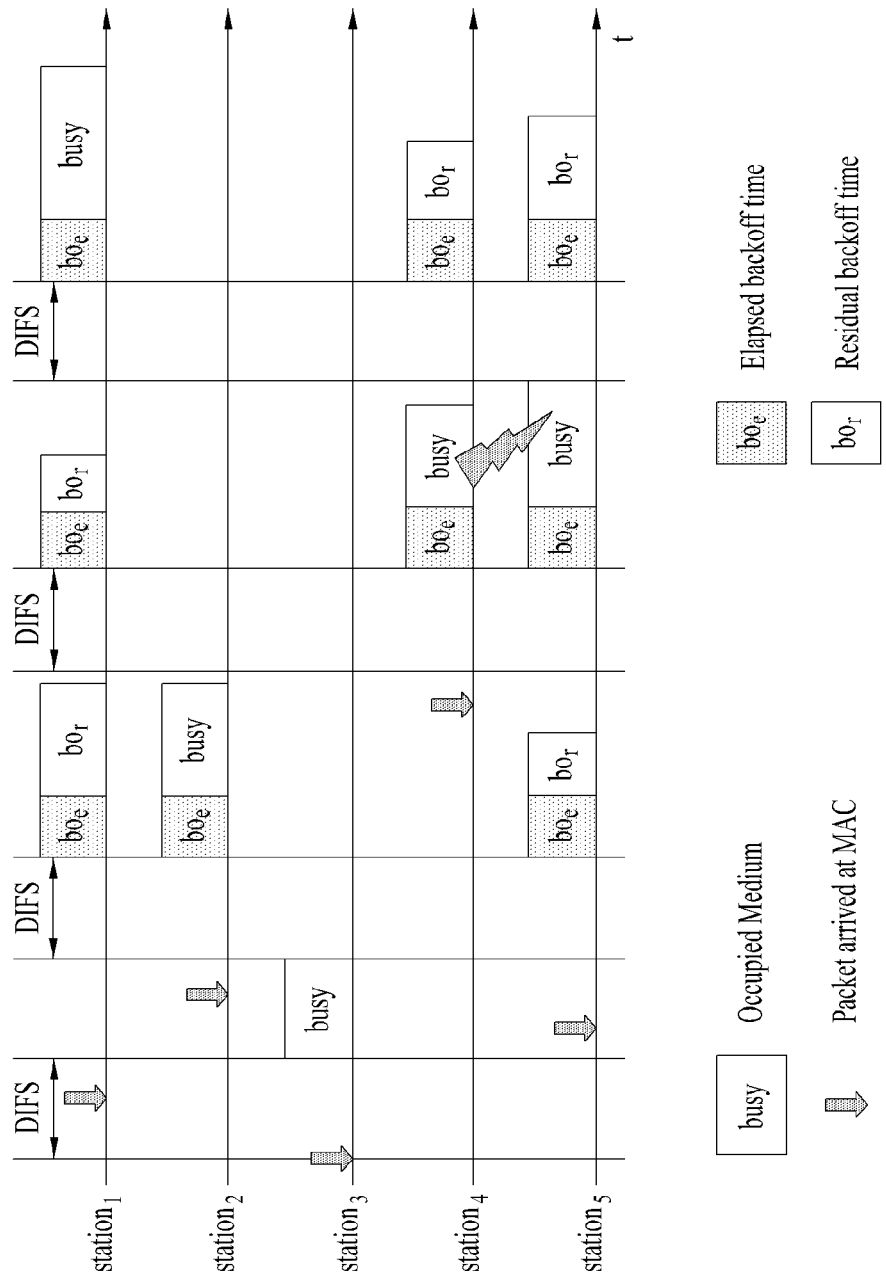
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2n-1$ (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values.

In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission.

If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

2.3 Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
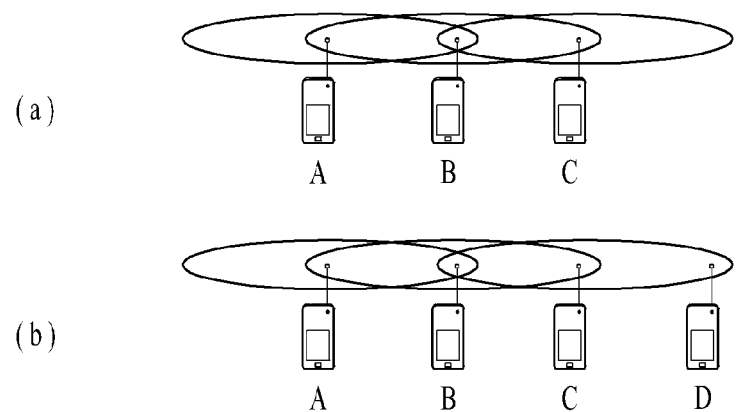
FIG. 7 is a diagram illustrating a hidden node and an exposed node.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
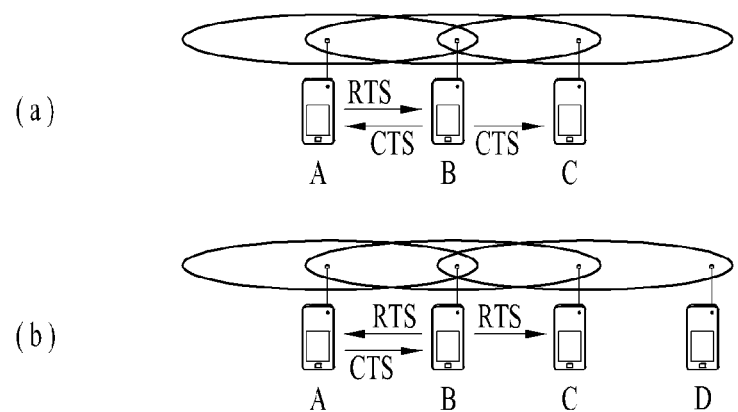
FIG. 8 is a diagram illustrating request to send (RTS) and clear to send (CTS)

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

2.4 Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
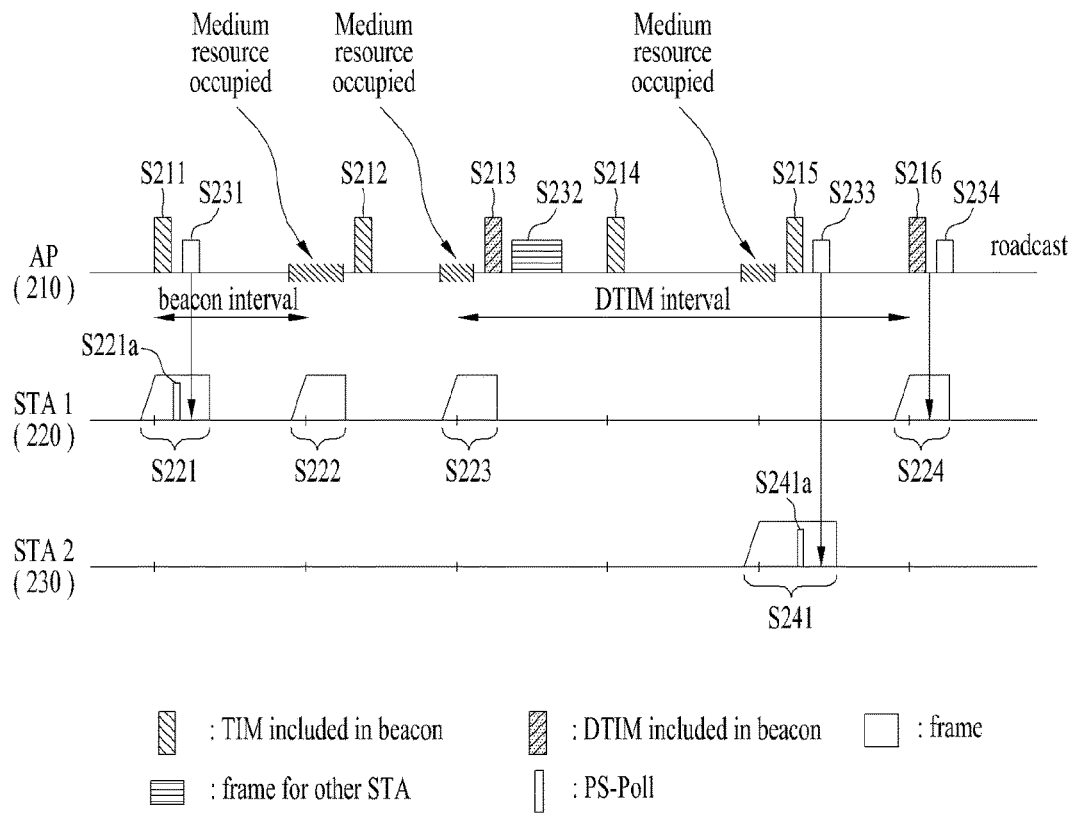
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
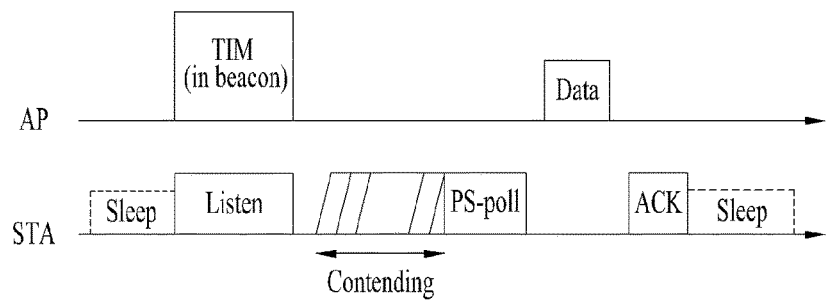
FIGS. 10 to 12 are diagrams illustrating operation of a station (STA) which receives a traffic indication map (TIM)
Figure 11:
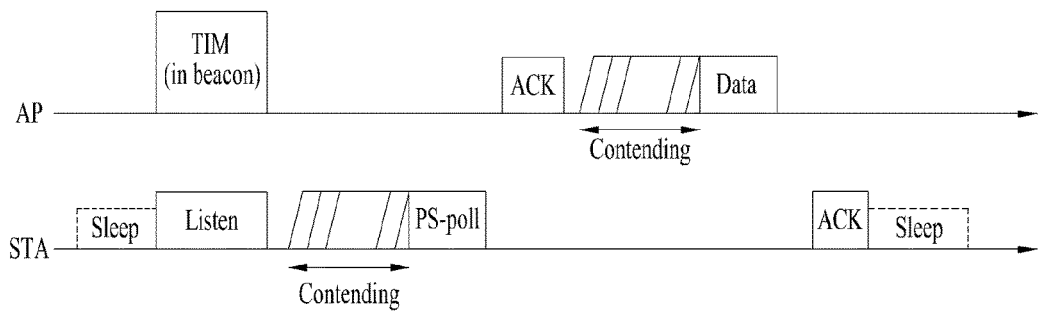
Figure 12:
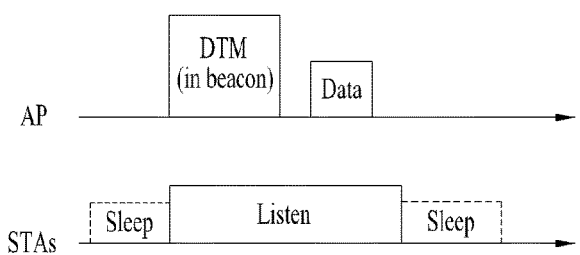

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

2.5 TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

FIG. 13(a) shows an example of AIDs assigned based on a group. In the example of FIG. 13(a), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(a) shows another example of AIDs assigned based on a group. In the example of FIG. 13(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 13:
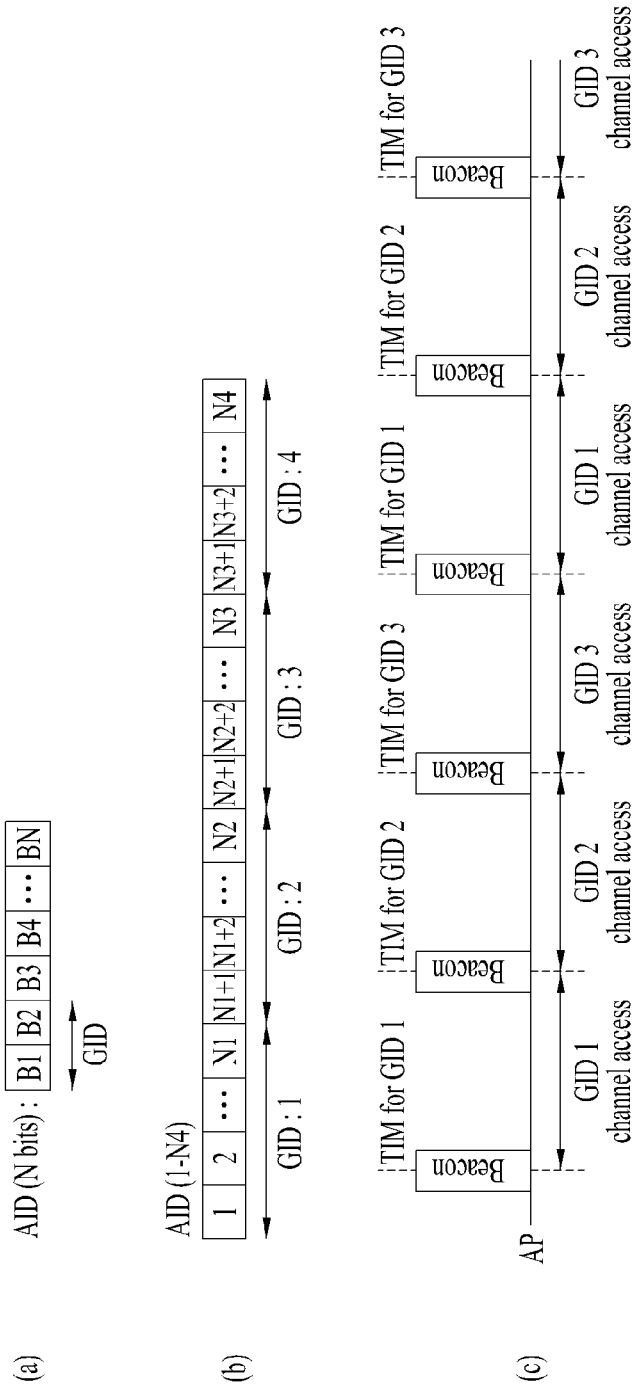
FIG. 13 is a diagram illustrating a group based association identifier (AID)

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

2.6 Improved Channel Access Method

If AIDs are assigned/managed based on a group, STAs belonging to a specific group may use a channel only at a "group channel access interval (or RAW)" assigned to the group. If an STA supports an M2M application, traffic for the STA may have a property which may be generated at a long period (e.g., several tens of minutes or several hours). Since such an STA does not need to be in the awake state frequently, the STA may be in the sleep mode for g a long period of time and be occasionally switched to the awake state (that is, the awake interval of the STA may be set to be long). An STA having a long wakeup interval may be referred to as an STA which operates in a "long-sleeper" or "long-sleep" mode. The case in which the wakeup interval is set to be long is not limited to M2M communication and the wakeup interval may be set to be long according to the state of the STA or surroundings of the STA even in normal WLAN operation.

If the wakeup interval is set, the STA may determine whether a local clock thereof exceeds the wakeup interval. However, since the local clock of the STA generally uses a cheap oscillator, an error probability is high. In addition, if the STA operates in long-sleep mode, the error may be increased with time. Accordingly, time synchronization of the STA which occasionally wakes up may not match time synchronization of the AP. For example, although the STA computes when the STA may receive the beacon frame to be switched to the awake state, the STA may not actually receive the beacon frame from the AP at that timing. That is, due to clock drift, the STA may miss the beacon frame and such a problem may frequently occur if the STA operates in the long sleep mode.

Figure 14:
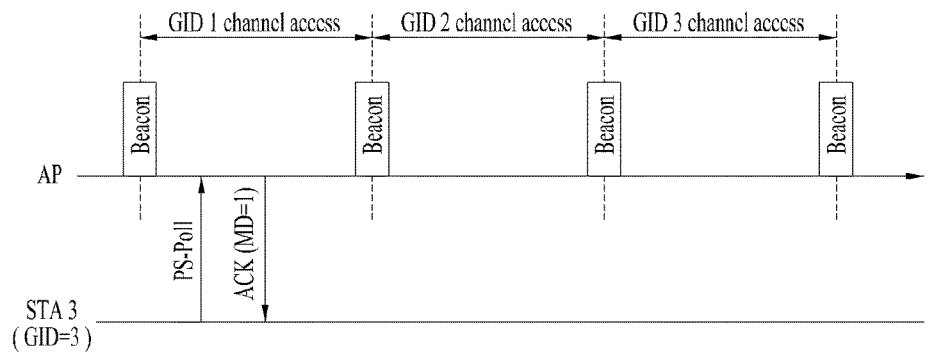
FIGS. 14 to 16 are diagrams showing examples of operation of an STA if a group channel access interval is set.
Figure 15:
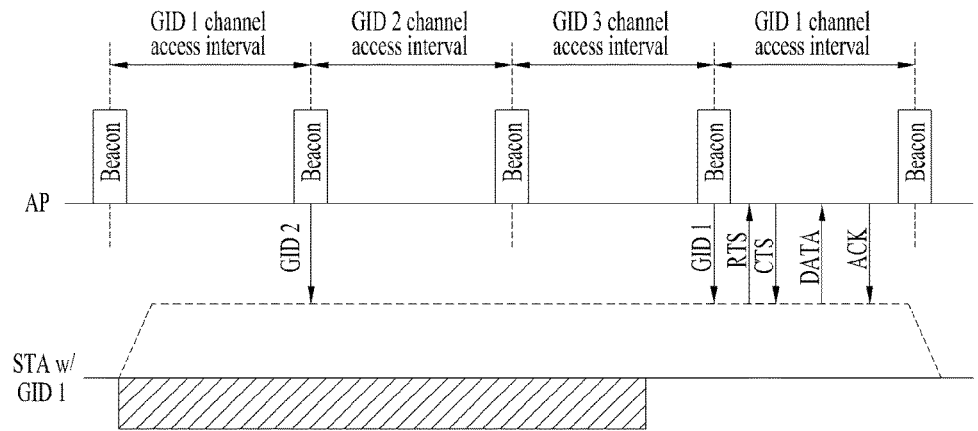
Figure 16:
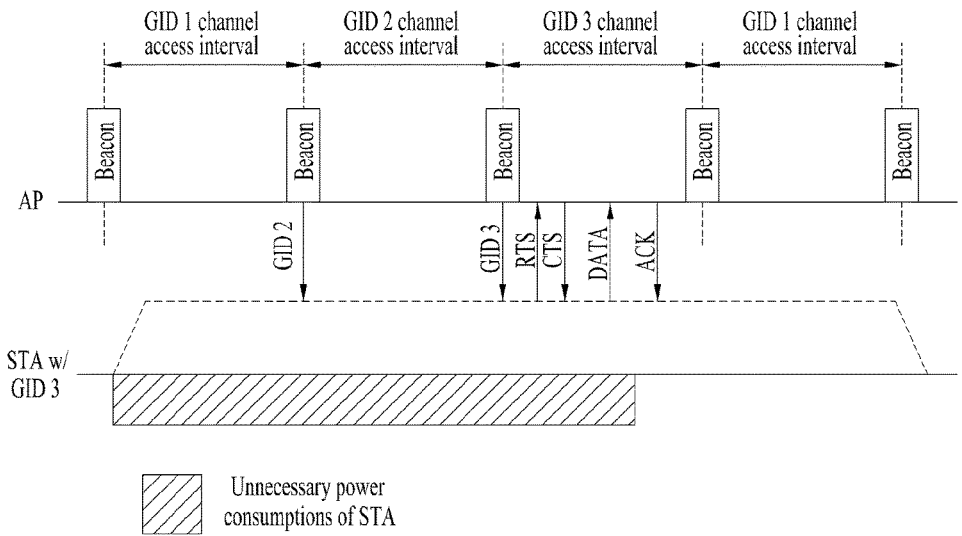

FIGS. 14 to 16 are diagrams showing examples of operation of an STA if a group channel access interval is set.

In the example of FIG. 14, STA3 may belong to group 3 (that is, GID=3), wake up at a channel access interval assigned to group 1 and perform PS-Poll for requesting frame transmission from the AP. The AP which receives PS-Poll from the STA transmits an ACK frame to STA3. If buffered data to be transmitted to STA3 is present, the AP may provide information indicating that data to be transmitted is present via the ACK frame. For example, the value of a "More Data" field (or an MD field) having a size of 1 bit included in the ACK frame may be set to 1 (that is, MD=1) to indicate the above information.

Since a time when STA3 transmits PS-Poll belongs to the channel access interval for group 1, even if data to be transmitted to STA3 is present, the AP does not immediately transmit data after transmitting the ACK frame but transmits data to STA3 at a channel access interval (GID 3 channel access of FIG. 14) assigned to group 3 to which STA3 belongs.

Since STA3 receives the ACK frame set to MD=1 from the AP, STA3 continuously waits for transmission of data from the AP. That is, in the example of FIG. 14, since STA3 cannot receive the beacon frame immediately after waking up, STA3 transmits PS-Poll to the AP on the assumption that a time when STA3 wakes up corresponds to the channel access interval assigned to the group, to which STA3 belongs, according to computation based on the local clock thereof and data to be transmitted thereto is present. Alternatively, since STA3 operates in the long-sleep mode, on the assumption that time synchronization is not performed, if the data to be transmitted thereto is present, STA3 may transmit PS-Poll to the AP in order to receive the data. Since the ACK frame received by STA3 from the AP indicates that data to be transmitted to STA3 is present, STA3 continuously waits for data reception under the assumption of the interval in which channel access thereof is granted. STA3 unnecessarily consumes power even when data reception is not allowed, until time synchronization is appropriately performed from information included in a next beacon frame.

In particular, if STA3 operates in the long-sleep mode, the beacon frame may frequently not be received, CCA may be performed even at the channel access interval, to which STA2 does not belong, thereby causing unnecessary power consumption.

Next, in the example of FIG. 15, the beacon frame is missed when the STA having GID 1 (that is, belonging to group 1) wakes up. That is, the STA which does not receive the beacon frame including the GID (or PID) assigned thereto is continuously in the awake state until the beacon frame including the GID (or PID) thereof is received. That is, although the STA wakes up at channel access interval assigned thereto, the STA cannot confirm whether the GID (or PID) thereof is included in the TIM transmitted via the beacon frame and thus cannot confirm whether the timing corresponds to the channel access interval assigned to the group thereof.

In the example of FIG. 15, the STA which is switched from the sleep state to the awake state is continuously in the awake state until the fourth beacon frame including the GID (that is, GID 1) thereof is received after the first beacon frame has been missed, thereby causing unnecessary power consumption. As a result, after unnecessary power consumption, the STA may receive the beacon frame including GID 1 and then may perform RTS transmission, CTS reception, data frame transmission and ACK reception.

FIG. 16 shows the case in which an STA wakes up at a channel access interval for another group. For example, the STA having GID 3 may wake up at the channel access interval for GID 1. That is, the STA having GID 3 unnecessarily consumes power until the beacon frame having the GID thereof is received after waking up. If a TIM indicating GID 3 is received via a third beacon frame, the STA may recognize the channel access interval for the group thereof and perform data transmission and ACK reception after CCA through RTS and CTS.

3. Proposed Method of Generating Sequence

The conventional WiFi standard defines sequences of a short training field (STF) and long training field (LTF). In particular, for cases in which a frequency is 20, 40, and 80 MHz, an STF sequence and an LTF sequence are separately defined. When a bandwidth is extended (BW extension), a phase rotation factor applied to an STF sequence and an LTF sequence may also be defined for bandwidths of 20, 40, and 80 MHz.

As interest in future Wi-Fi and demand for improvement of throughput and QoE (quality of experience) after 802.11ac increase, it is necessary to define a new frame format for future WLAN systems. The most important part in a new frame format is a preamble part because design of a preamble used for synchronization, channel tracking, channel estimation, adaptive gain control (AGC) and the like may directly affect system performance.

In the future Wi-Fi system in which a large number of APs and STAs simultaneously access and attempt data transmission and reception, system performance may be limited when legacy preamble design is employed. That is, if each preamble block (e.g., a short training field (STF) in charge of AGC, CFO estimation/compensation, timing control and the like or a long training field (LTF) in charge of channel estimation/compensation, residual CFO compensation and the like) executes only the function thereof defined in the legacy preamble structure, frame length increases, causing overhead. Accordingly, if a specific preamble block can support various functions in addition to the function designated therefor, an efficient frame structure can be designed.

Furthermore, since the future Wi-Fi system considers data transmission in outdoor environments as well as indoor environments, the preamble structure may need to be designed differently depending on environments. Although design of a unified preamble format independent of environment variation can aid in system implementation and operation, of course, it is desirable that preamble design be adapted to system environment.

Preamble design for efficiently supporting various functions is described hereinafter. For convenience, a new WLAN system is referred to as an HE (High Efficiency) system and a frame and a PPDU (PLCP (Physical Layer Convergence Procedure) Protocol Data Unit) of the HE system are respectively referred to as an HE frame and an HE PPDU. However, it is obvious to those skilled in the art that the proposed preamble is applicable to other WLAN systems and cellular systems in addition to the HE system.

The following table 1 shows OFDM numerology which is a premise of a pilot sequence transmission method described below. Table 1 shows an example of new OFDM numerology proposed in the HE system and numerals and items shown in Table 1 are merely examples and other values may be applied. Table 1 is based on the assumption that FFT having a size four times the legacy one is applied to a given BW and 3 DCs are used per BW.

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. See NOTE. |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 µs | | | IDFT/DFT period for non-HE portion |
| $T_{DFT\_HE}$ | | | 12.8 µs | | | IDFT/DFT period for HE portion |
| $T_{GI}$ | | | 0.8 µs = $T_{DFT}/4$ | | | Guard interval duration for non-HE portion |
| $T_{GI\_HE}$ | | | 3.2 µs = $T_{DFT\_HE}/4$ | | | Guard interval duration for HE portion |
| $T_{GI2}$ | | | 1.6 µs | | | Double guard interval for non-HE portion |
| $T_{GIS\_HE}$ | | | 0.8 µs = $T_{DFT\_HE}/16$ [Alternative: 0.4 µs (1/32 CP)] | | | Short guard interval Duration (used only for HE data) |
| $T_{SYML}$ | | | 4 µs = $T_{DFT} + T_{GI}$ | | | Long GI symbol interval for non-HE portion |
| $T_{SYML\_HE}$ | | | 16 µs = $T_{DFT\_HE} + T_{GI\_HE}$ | | | Long GI symbol interval for HE portion |
| $T_{SYMS\_HE}$ | | | 13.6 µs = $T_{DFT\_HE} + T_{GIS\_HE}$[Alternative: 13.2 µs (with 1/32 CP)] | | | Short GI symbol interval (used only for HE data) |
| $T_{SYM}$ | | | $T_{SYML}$ or $T_{SYMS}$ depending on the GI used | | | Symbol interval for non-HE portion |
| $T_{SYM\_HE}$ | | | $T_{SYML\_HE}$ or $T_{SYMS\_HE}$ depending on the GI used | | | Symbol interval for HE portion |
| $T_{L-STF}$ | | | 8 µs = 10 * $T_{DFT}/4$ | | | Non-HE Short Training field duration |
| $T_{L-LTF}$ | | | 8 µs = 2 × $T_{DFT} + T_{GI2}$ | | | Non-HE Long Training field duration |
| $T_{L-SIG}$ | | | 4 µs = $T_{SYML}$ | | | Non-HE SIGNAL field duration |

TABLE 1-continued

| Parameter | CBW20 | CBW40 | CBW80 | CBW80 + 80 | CBW160 | Description |
|---|---|---|---|---|---|---|
| $T_{HE\text{-}SIGA}$ | 12.8 µs = 2($T_{SYML}$ + 3$T_{GI}$) in HE-PPDU format-1 or $T_{SYML\_HE}$ in HE-PPDU format-2 and HE-PPDU format-3 | | | | | HE Signal A field duration |
| $T_{HE\text{-}STF}$ | | | $T_{SYML\_HE}$ | | | HE Short Training field duration |
| $T_{HE\text{-}LTF}$ | | | $T_{SYML\_HE}$ | | | Duration of each HE LTF symbol |
| $T_{HE\text{-}SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

NOTE
$N_{ST} = N_{SD} + N_{SP}$

Figure 17:
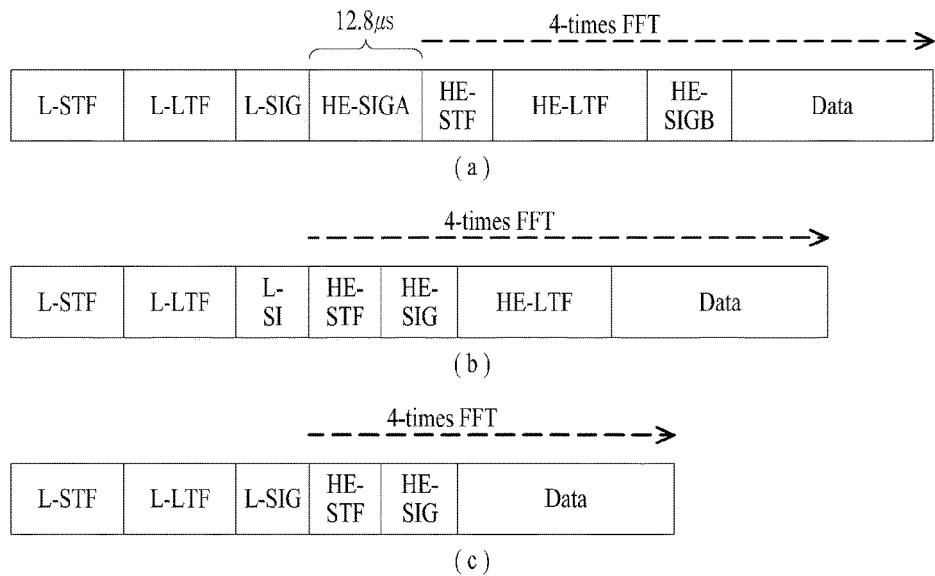
FIG. 17 is a diagram illustrating frame structures related to an embodiment of the present invention.

FIG. 17 is a diagram illustrating frame structures related to an embodiment of the present invention. As illustrated in FIGS. 17(a), 17(b) and 17(c), various frame structures can be configured, and a proposed pilot sequence transmission method is related to an HE-STF (High Efficiency Short Training Field) in a preamble in a frame structure.

Hereinafter, a sequence that is newly defined as an enhanced preamble is defined as described above will be described. In addition, a corresponding sequence generating method will also be described below.

First, preconditions of the proposed sequence generating method will be described. Hereinafter, $0_5$ refers to 5 consecutive 0, $0_7$ refers to 7 consecutive 0, and $0_{12}$ refers to 12 consecutive 0. $C_{52}$ refers to a vector with a size of 52 and is defined according to Mathematical Expression 1 below.

$$C_{52} = \sqrt{1/2}\{0,0,0,c1,0,0,0,c2,\ldots,c12\} \quad \text{[Mathematical Expression 1]}$$

4 null tones including a DC component are present in a center of 52 components included in $C_{52}$. $C_{52}$ includes a total of 52 components including 12 (c1, c2, ..., c12) coefficient values, 12*3 values of 0 positioned between the coefficient values, and 4 null tones. The 12 coefficient values c1 to c12 may reuse an STF sequence corresponding to a bandwidth of 20 MHz in a legacy VHT system.

Hereinafter, a sequence for each of bandwidths of 20, 40, and 80 MHz using the aforementioned vector $C_{52}$ will be described in detail.

First, in a system to which FFT with a size of 256 is applied, a sequence for a bandwidth of 20 MHz is defined. The sequence for a bandwidth of 20 MHz may be defined according to Mathematical Expression 2 below.

$$0_5 C_{52} 0_{12} C_{52} 0_{12} C_{52} 0_{12} C_{52} 0_7 \quad \text{[Mathematical Expression 2]}$$

The sequence for 20 MHz defined according to Mathematical Expression 2 includes a total of 256 tones (5+52+12+52+12+52+12+52+7=256).

Mathematical Expression 3 below defines a sequence for a bandwidth of 40 MHz.

$$0_5 C_{52} 0_{12} C_{52} 0_{12} C_{52} 0_{12} C_{52} 0_{12} C_{52} 0_{12} C_{52} 0_{12} C_{52} 0_7 \quad \text{[Mathematical Expression 3]}$$

The sequence for 40 MHz defined according to Mathematical Expression 3 above includes a total of 512 tones and a component $C_{52} 0_{12} C_{52} 0_{12} C_{52} 0_{12} C_{52}$ obtained by removing $0_5$ and $0_7$ at opposite ends in a structure of the 20 MHz sequence described in Mathematical Expression 2 above are positioned at right and left sides based on $0_{12}$ positioned in a center. That is, a sequence for 40 MHz is defined in the form in which parts of $-0_{12}$-20 MHz-$0_7$ sequences of parts of $0_5$-20 MHz sequences are sequentially arranged. In addition, the sequence for 40 MHz may be understood as the form in which sequences for 20 MHz are consecutive twice ($0_5+0_7=0_{12}$).

Mathematical Expression 4 below defines a sequence for a bandwidth of 80 MHz.

$$0_5 C_{52} 0_{12} C_{52} 0_{12} C_{52} 0_{12} C_{52} 0_{12} C_{52} 0_{12} C_{52} 0_{12} C_{52} \\ 0_{12} C_{52} \ldots 0_{12} C_{52} 0_{12} C_{52} 0_{12} C_{52} 0_{12} C_{52} 0_{12} \\ C_{52} 0_{12} C_{52} 0_{12} C_{52} 0_{12} C_{52} 0_7 \quad \text{[Mathematical Expression 4]}$$

As defined according to Mathematical Expression 4 above, a sequence for 80 MHz is defined as a total of 1024 tones and sequences for a bandwidth of 20 MHz are defined to be consecutively arranged a total of four times ($0_5+0_7=0_{12}$). A DC component may be inserted into a component $0_{12}$ that is positioned in a center in the aforementioned sequences for 20, 40, and 80 MHz.

Hereinafter, an STF sequence that is newly defined by adding a specific tone that is repeated at an interval of 4 tones or 2 tones to a component $0_{12}$ will be desired based on the aforementioned sequence structures. Even if a UE is allocated a subband of new sequences, even a subband including only 0 may not be present invention. A sequence applied to legacy STF and LTF may be applied to component $C_{52}$ of the aforementioned sequence for 20, 40, and 80 MHz in the same way.

According to an exemplary embodiment of the present invention, in a sequence defined according to Mathematical Expression 2 to Mathematical Expression 4 above, one or more components $0_{12}$ may be replaced with $D_{12}$ to generate a sequence. As described above, a component $D_{12}$ may refer to the form in which non-zero components that are not 0 are repeated at an interval of 4 tones or 2 tones in a component $0_{12}$. For example, a component $D_{12}$ according to an exemplary embodiment of the present invention may be defined according to Mathematical Expression 5 below.

$$D_{12} = \\ \{0\ 0\ 0\ 1+j\ 0\ 0\ 0\ -1-j\ 0\ 0\ 0\ -1-j\} \quad \text{[Mathematical Expression 5]}$$

According to an exemplary embodiment according to Mathematical Expression 5 above, $D_{12}$ may include components that have 1+j as a fourth tone, -1-j as an eighth tone, -1-j as a twelfth tone, and are not 0. In the aforementioned defined sequences for 20, 40, and 80 MHz, one or more components $0_{12}$ may be replaced with a component $D_{12}$ according to Mathematical Expression 5 above.

According to the replacement procedure, a peak to average power ratio (PAPR) is increased compared with a component $0_{12}$. Accordingly, according to an exemplary embodiment of the present invention, a UE/AP may rotate a phase in a unit of $\{C_{12}D_{12}\}$ and/or $\{C_{12}\}$ in order to reduce a PAPR. In other words, a phase rotation factor $\Upsilon_k$ may be applied to the proposed sequence.

For example, when $C_{52}$ is defined in the same way as in an STF system of a VHT system, $C_{52}$ may be defined according to Mathematical Expression 6 below.

$$C_{52} = \sqrt{1/2}\{0\ 0\ 0\ 1+j\ 0\ 0\ 0\ -1-j\ 0\ 0\ 0\ 1+j\ 0\ 0\ 0\ -1-j$$
$$0\ 0\ 0\ -1-j\ 0\ 0\ 0\ 1+j\ 0\ 0\ 0\ 0 \ldots 0\ 0\ 0\ -1-j\ 0$$
$$0\ 0\ -1-j\ 0\ 0\ 0\ 1+j\ 0\ 0\ 0\ 1+j\ 0\ 0\ 0\ 1+0\ 0\ 0$$
$$1+j\} \qquad \text{[Mathematical Expression 6]}$$

In this case, according to the proposed exemplary embodiment, a 20 MHz sequence with $D_{12}$ applied thereto may be defined according to Mathematical Expression 7.

$$S_{20\ MHz} = [0_5 C_{52}D_{12}C_{52}D_{12} C_{52}D_{12}C_{52}0_7] \qquad \text{[Mathematical Expression 7]}$$

Then, a procedure of applying a phase rotation factor to a sequence of Mathematical Expression 7 will be described with regard to Mathematical Expression 8 below.

[Mathematical Expression 8]

$$S_{20MHz} = [0_5 \ \underbrace{C_{52}\ D_{12}}_{\times \Upsilon_1^{(20)}} \underbrace{C_{52}\ D_{12}}_{\times \Upsilon_2^{(20)}} \underbrace{C_{52}\ D_{12}}_{\times \Upsilon_3^{(20)}} \underbrace{C_{52}}_{\times \Upsilon_4^{(20)}} \ 0_7]$$

In Mathematical Expression 8 above, k of $\Upsilon_k$ may refer to an index of a phase rotation factor applied to each sequence and an upper subscript 20 may indicate that the corresponding phase rotation factor is applied to a 20 MHz sequence.

With regard to the proposed exemplary embodiment according to Mathematical Expression 7 above, a procedure of determining a phase rotation factor for optimizing PAPR (=1.7379) will be described. First, Table 2 below shows the number of 8 cases for $\Upsilon_k$ for obtaining 1.7379 as an optimal PAPR value. In Table 2 below, a column may refer to an index (k=1, 2, 3, 4) of a phase rotation factor and a row refers to examples of 8 independent types.

TABLE 2

| 1 | 1 | 1 | −1 |
|---|---|---|---|
| 1 | −1 | −1 | −1 |
| −1 | 1 | 1 | 1 |
| −1 | −1 | −1 | 1 |
| 1i | 1i | 1i | −1i |
| 1i | −1i | −1i | −1i |
| −1i | 1i | 1i | 1i |
| −1i | −1i | −1i | 1i |

In Table 2 above, when $0_{12\_}$ is used instead of $D_{12}$ (that is, all components $0_{12}$ are set to 0), PAPR may be further reduced and may have a value of 1.6747. Table 3 below shows an example of a phase rotation factor for a sequence for 20 MHz when $0_{12}$ is used and there are a total of 32 cases.

TABLE 3

| 1 | 1 | 1 | −1 |
|---|---|---|---|
| 1 | 1 | −1 | 1 |
| 1 | −1 | 1 | 1 |
| 1 | −1 | −1 | −1 |
| 1 | 1i | 1 | −1i |
| 1 | 1i | −1 | 1i |
| 1 | −1i | 1 | 1i |

TABLE 3-continued

| 1 | −1i | −1 | −1i |
|---|---|---|---|
| −1 | 1 | 1 | 1 |
| −1 | 1 | −1 | −1 |
| −1 | −1 | 1 | −1 |
| −1 | −1 | −1 | 1 |
| −1 | 1i | 1 | 1i |
| −1 | 1i | −1 | −1i |
| −1 | −1i | 1 | −1i |
| −1 | −1i | −1 | 1i |
| 1i | 1 | 1i | −1 |
| 1i | 1 | −1i | 1 |
| 1i | −1 | 1i | 1 |
| 1i | −1 | −1i | −1 |
| 1i | 1i | 1i | −1i |
| 1i | 1i | −1i | 1i |
| 1i | −1i | 1i | 1i |
| 1i | −1i | −1i | −1i |
| −1i | 1 | 1i | 1 |
| −1i | 1 | −1i | −1 |
| −1i | −1 | 1i | −1 |
| −1i | −1 | −1i | 1 |
| −1i | 1i | 1i | 1i |
| −1i | 1i | −1i | −1i |
| −1i | −1i | 1i | −1i |
| −1i | −1i | −1i | 1i |

The sequence for 20 MHz described in Mathematical Expression 7 above may be extended to generate sequences for 40 MHz and 80 MHz. That is, the sequence for 40 MHz may be generated based on a sequence for 20 MHz and the sequence for 80 MHz may be generated based on a sequence for 40 MHz.

Hereinafter, a procedure of generating sequences for 40 and 80 MHz and an example of a phase rotation factor for each of sequences for 40 and 80 MHz will be described. First, a sequence for 40 MHz obtained by extending a sequence $S_{20\ MHz}$ for 20 MHz may be defined according to Mathematical Expression 9 below.

[Mathematical Expression 9]

$$S_{40MHz} = [0_5 \ \underbrace{S'_{20MHz}\ D_{12}}_{\times \Upsilon_1^{(40)}} \underbrace{S'_{20MHz}}_{\times \Upsilon_2^{(40)}} \ 0_7]$$

In Mathematical Expression 9 above, $S'_{20\ MHz}$ may refer to parts of sequences obtained by removing a headmost component $0_5$ and a backmost component $0_7$ from a sequence $S_{20\ MHz}$ for 20 MHz. That is, a sequence $S_{40\ MHz}$ for 40 MHz may be understood in the form of parts of sequences for 20 MHz are repeatedly extended. Similarly, a sequence $S_{80\ MHz}$ for 80 MHz may be defined by extending $S'_{40\ MHz}$ and may be defined according to Mathematical Expression 10 below. $S'_{40\ MHz}$ may refer to parts of sequences obtained by removing a headmost component $0_5$ and a backmost component $0_7$ from $S_{40\ MHz}$.

[Mathematical Expression 10]

$$S_{80MHz} = [0_5 \ \underbrace{S'_{40MHz}\ D_{12}}_{\times \Upsilon_1^{(80)}} \underbrace{S'_{40MHz}}_{\times \Upsilon_2^{(80)}} \ 0_7]$$

Table 4 below shows optimal PAPR in a sequence defined for each frequency bandwidth according to FFT applied to a proposed communication system.

TABLE 4

| BW | FFT | PAPR |
|---|---|---|
| 20 MHz | 256 | 1.7379 |
| 40 MHz | 512 | 2.2941 |
| 80 MHz | 1024 | 3.5251 |

Table 5 below shows PAPR according to a sequence and FFT defined in a legacy 802.11ac system.

TABLE 5

| BW | FFT | PAPR |
|---|---|---|
| 20 MHz | 64 | 1.6179 |
| 40 MHz | 128 | 1.6179 |
| 80 MHz | 256 | 1.6747 |

As seen from Tables 4 and 5 above, when a proposed sequence is used, PAPR may be increased. Accordingly, in order to reduce a PAPR, it may be necessary to adjust the phase rotation factor $\Upsilon_k$ and, hereinafter, a phase rotation factor will be described below.

First, an embodiment of setting a phase rotation factor for a sequence for 40 MHz will be described. In Mathematical Expression 10 above, an embodiment of setting a phase rotation factor for $S'_{20\ MHz}$ that is a part of sequences for 20 MHz has been described. Hereinafter, differently from Mathematical Expression 9 above, an embodiment of subdividing $S_{40\ MHz}$ and setting a phase rotation factor will be described.

First, $S_{40\ MHz}$ may be divided and represented into two parts according to Mathematical Expression 11 below.

$$S_{40\ MHz} = [0_5 S_{40\ MHz}^1 S_{40\ MHz}^2 0_7]$$

$$S_{40\ MHz}^1 = [C_{52} D_{12} C_{52} D_{12} C_{52} D_{12} C_{52} D_{12}]$$

$$S_{40\ MHz}^2 = [C_{52} D_{12} C_{52} D_{12} C_{52} D_{12} C_{52}] \quad \text{[Mathematical Expression 11]}$$

Then, $S_{40\ MHz}^1$ and $S_{40\ MHz}^2$ are defined according to Mathematical Expression 11 above, a phase rotation factor may be defined and applied in a unit of $\{C_{12}D_{12}\}$ according to Mathematical Expression 12 below.

In other words, similarly to the case in which a phase rotation factor for a sequence for 20 MHz is set in a unit of $\{C_{12}D_{12}\}$ and/or $\{C_{12}\}$ in Mathematical Expression 9 above, the phase rotation factor may also be defined in a unit of $\{C_{12}D_{12}\}$ and/or $\{C_{12}\}$ with respect to a sequence for 40 MHz. This embodiment may be represented according to Mathematical Expression 12 below.

[Mathematical Expression 12]

$$S_{40MHz}^1 = [\underbrace{C_{52}\ D_{12}}_{\times \Upsilon_1^{(40)}}\ \underbrace{C_{52}\ D_{12}}_{\times \Upsilon_2^{(40)}}\ \underbrace{C_{52}\ D_{12}}_{\times \Upsilon_3^{(40)}}\ \underbrace{C_{52}\ D_{12}}_{\times \Upsilon_4^{(40)}}]$$

$$S_{40MHz}^2 = [\underbrace{C_{52}\ D_{12}}_{\times \Upsilon_5^{(40)}}\ \underbrace{C_{52}\ D_{12}}_{\times \Upsilon_6^{(40)}}\ \underbrace{C_{52}\ D_{12}}_{\times \Upsilon_7^{(40)}}\ \underbrace{C_{52}}_{\times \Upsilon_8^{(40)}}]$$

As such, when a phase rotation factor for 40 MHz is subdivided and set, PAPR may be obtained as 2.0227 lower than 2.2941 in Table 4 above. The number of cases of embodiments of a phase rotation factors that satisfy PAPR=2.0227 is 8 as follows. In Table 6 below, each column refers to an index (k=1, 2, ..., 8) of a phase rotation factor and each row refers to the number of 8 independent cases.

TABLE 6

| 1 | 1i | −1 | −1 | −1 | 1i | 1 | −1 |
|---|---|---|---|---|---|---|---|
| 1 | −1i | −1 | −1 | −1 | −1i | 1 | −1 |
| −1 | 1i | 1 | 1 | 1 | 1i | −1 | 1 |
| −1 | −1i | 1 | 1 | 1 | −1i | −1 | 1 |
| 1i | 1 | −1i | −1i | −1i | 1 | 1i | −1i |
| 1i | −1 | −1i | −1i | −1i | −1 | 1i | −1i |
| −1i | 1 | 1i | 1i | 1i | 1 | −1i | 1i |
| −1i | −1 | 1i | 1i | 1i | −1 | −1i | 1i |

When $0_{12}$ is used instead of $D_{12}$ in a 40 MHz sequence, PAPR may be lowered to 1.6747 and 128 different embodiments may be possible according to a phase rotation factor. A total of 128 different sequences with PAPR=1.6747 may be generated and each phase rotation factor may be represented according to Table 7 below.

TABLE 7

| 1 | 1 | 1 | 1i | −1 | 1 | −1 | 1i |
|---|---|---|---|---|---|---|---|
| 1 | 1 | 1 | −1i | −1 | 1 | −1 | −1i |
| 1 | 1 | −1 | 1i | −1 | 1 | 1 | 1i |
| 1 | 1 | −1 | −1i | −1 | 1 | 1 | −1i |
| 1 | 1 | 1i | 1 | 1 | −1 | 1i | −1 |
| 1 | 1 | 1i | −1 | 1 | −1 | 1i | 1 |
| 1 | 1 | −1i | 1 | 1 | −1 | −1i | −1 |
| 1 | 1 | −1i | −1 | 1 | −1 | −1i | 1 |
| 1 | −1 | 1 | 1i | −1 | −1 | −1 | 1i |
| 1 | −1 | 1 | −1i | −1 | −1 | −1 | −1i |
| 1 | −1 | −1 | 1i | −1 | −1 | 1 | 1i |
| 1 | −1 | −1 | −1i | −1 | −1 | 1 | −1i |
| 1 | −1 | 1i | 1 | 1 | 1 | 1i | −1 |
| 1 | −1 | 1i | −1 | 1 | 1 | 1i | 1 |
| 1 | −1 | −1i | 1 | 1 | 1 | −1i | −1 |
| 1 | −1 | −1i | −1 | 1 | 1 | −1i | 1 |
| −1 | 1 | 1 | 1i | 1 | 1 | −1 | 1i |
| −1 | 1 | 1 | −1i | 1 | 1 | −1 | −1i |
| −1 | 1 | −1 | 1i | 1 | 1 | 1 | 1i |
| −1 | 1 | −1 | −1i | 1 | 1 | 1 | −1i |
| −1 | 1 | 1i | 1 | −1 | −1 | 1i | −1 |
| −1 | 1 | 1i | −1 | −1 | −1 | 1i | 1 |
| −1 | 1 | −1i | 1 | −1 | −1 | −1i | −1 |
| −1 | 1 | −1i | −1 | −1 | −1 | −1i | 1 |
| −1 | −1 | 1 | 1i | 1 | −1 | −1 | 1i |
| −1 | −1 | 1 | −1i | 1 | −1 | −1 | −1i |
| −1 | −1 | −1 | 1i | 1 | −1 | 1 | 1i |
| −1 | −1 | −1 | −1i | 1 | −1 | 1 | −1i |
| −1 | −1 | 1i | 1 | −1 | 1 | 1i | −1 |
| −1 | −1 | 1i | −1 | −1 | 1 | 1i | 1 |
| −1 | −1 | −1i | 1 | −1 | 1 | −1i | −1 |
| −1 | −1 | −1i | −1 | −1 | 1 | −1i | 1 |
| 1 | 1i | 1 | 1 | −1 | 1i | −1 | 1 |
| 1 | 1i | 1 | −1 | −1 | 1i | −1 | −1 |
| 1 | 1i | −1 | 1 | −1 | 1i | 1 | 1 |
| 1 | 1i | −1 | −1 | −1 | 1i | 1 | −1 |
| 1 | 1i | 1i | 1 | 1 | −1i | 1i | −1i |
| 1 | 1i | 1i | −1 | 1 | −1i | 1i | 1i |
| 1 | 1i | −1i | 1 | 1 | −1i | −1i | −1i |
| 1 | 1i | −1i | −1 | 1 | −1i | −1i | 1i |
| 1 | −1i | 1 | 1 | −1 | −1i | −1 | 1 |
| 1 | −1i | 1 | −1 | −1 | −1i | −1 | −1 |
| 1 | −1i | −1 | 1 | −1 | −1i | 1 | 1 |
| 1 | −1i | −1 | −1 | −1 | −1i | 1 | −1 |
| 1 | −1i | 1i | 1 | 1 | 1i | 1i | −1i |
| 1 | −1i | 1i | −1 | 1 | 1i | 1i | 1i |
| 1 | −1i | −1i | 1 | 1 | 1i | −1i | −1i |
| 1 | −1i | −1i | −1 | 1 | 1i | −1i | 1i |
| −1 | 1i | 1 | 1 | 1 | 1i | −1 | 1 |
| −1 | 1i | 1 | −1 | 1 | 1i | −1 | −1 |
| −1 | 1i | −1 | 1 | 1 | 1i | 1 | 1 |
| −1 | 1i | −1 | −1 | 1 | 1i | 1 | −1 |
| −1 | 1i | 1i | 1 | −1 | −1i | 1i | −1i |
| −1 | 1i | 1i | −1 | −1 | −1i | 1i | 1i |
| −1 | 1i | −1i | 1 | −1 | −1i | −1i | −1i |
| −1 | 1i | −1i | −1 | −1 | −1i | −1i | 1i |

TABLE 7-continued

| | | | | | | | |
|---|---|---|---|---|---|---|---|
| -1 | -1i | 1 | 1 | 1 | -1i | -1 | 1 |
| -1 | -1i | 1 | -1 | 1 | -1i | -1 | -1 |
| -1 | -1i | -1 | 1 | 1 | -1i | 1 | 1 |
| -1 | -1i | -1 | -1 | 1 | -1i | 1 | -1 |
| -1 | -1i | 1i | 1i | -1 | 1i | 1i | -1i |
| -1 | -1i | 1i | -1i | -1 | 1i | 1i | 1i |
| -1 | -1i | -1i | 1i | -1 | 1i | -1i | -1i |
| -1 | -1i | -1i | -1i | -1 | 1i | -1i | 1i |
| 1i | 1 | 1 | 1 | 1i | -1 | 1 | -1 |
| 1i | 1 | 1 | -1 | 1i | -1 | 1 | 1 |
| 1i | 1 | -1 | 1 | 1i | -1 | -1 | -1 |
| 1i | 1 | -1 | -1 | 1i | -1 | -1 | 1 |
| 1i | 1 | 1i | 1i | -1i | 1 | -1i | 1i |
| 1i | 1 | 1i | -1i | -1i | 1 | -1i | -1i |
| 1i | 1 | -1i | 1i | -1i | 1 | 1i | 1i |
| 1i | 1 | -1i | -1i | -1i | 1 | 1i | -1i |
| 1i | -1 | 1 | 1 | 1i | 1 | 1 | -1 |
| 1i | -1 | 1 | -1 | 1i | 1 | 1 | 1 |
| 1i | -1 | -1 | 1 | 1i | 1 | -1 | -1 |
| 1i | -1 | -1 | -1 | 1i | 1 | -1 | 1 |
| 1i | -1 | 1i | 1i | -1i | -1 | -1i | 1i |
| 1i | -1 | 1i | -1i | -1i | -1 | -1i | -1i |
| 1i | -1 | -1i | 1i | -1i | -1 | 1i | 1i |
| 1i | -1 | -1i | -1i | -1i | -1 | 1i | -1i |
| -1i | 1 | 1 | 1 | -1i | -1 | 1 | -1 |
| -1i | 1 | 1 | -1 | -1i | -1 | 1 | 1 |
| -1i | 1 | -1 | 1 | -1i | -1 | -1 | -1 |
| -1i | 1 | -1 | -1 | -1i | -1 | -1 | 1 |
| -1i | 1 | 1i | 1i | 1 | 1 | -1i | 1i |
| -1i | 1 | 1i | -1i | 1 | 1 | -1i | -1i |
| -1i | 1 | -1i | 1i | 1 | 1 | 1i | 1i |
| -1i | 1 | -1i | -1i | 1 | 1 | 1i | -1i |
| -1i | -1 | 1 | 1 | -1i | 1 | 1 | -1 |
| -1i | -1 | 1 | -1 | -1i | 1 | 1 | 1 |
| -1i | -1 | -1 | 1 | -1i | 1 | -1 | -1 |
| -1i | -1 | -1 | -1 | -1i | 1 | -1 | 1 |
| -1i | -1 | 1i | 1i | 1 | -1 | -1i | 1i |
| -1i | -1 | 1i | -1i | 1 | -1 | -1i | -1i |
| -1i | -1 | -1i | 1i | 1 | -1 | 1i | 1i |
| -1i | -1 | -1i | -1i | 1 | -1 | 1i | -1i |
| 1i | 1i | 1 | 1i | 1i | -1i | 1 | -1i |
| 1i | 1i | 1 | -1i | 1i | -1i | 1 | 1i |
| 1i | 1i | -1 | 1i | 1i | -1i | -1 | -1i |
| 1i | 1i | -1 | -1i | 1i | -1i | -1 | 1i |
| 1i | 1i | 1i | 1 | -1i | 1i | -1i | 1 |
| 1i | 1i | 1i | -1 | -1i | 1i | -1i | -1 |
| 1i | 1i | -1i | 1 | -1i | 1i | 1i | 1 |
| 1i | 1i | -1i | -1 | -1i | 1i | 1i | -1 |
| 1i | -1i | 1 | 1i | 1i | 1i | 1 | -1i |
| 1i | -1i | 1 | -1i | 1i | 1i | 1 | 1i |
| 1i | -1i | -1 | 1i | 1i | 1i | -1 | -1i |
| 1i | -1i | -1 | -1i | 1i | 1i | -1 | 1i |
| 1i | -1i | 1i | 1 | -1i | -1i | -1i | 1 |
| 1i | -1i | 1i | -1 | -1i | -1i | -1i | -1 |
| 1i | -1i | -1i | 1 | -1i | -1i | 1i | 1 |
| 1i | -1i | -1i | -1 | -1i | -1i | 1i | -1 |
| -1i | 1i | 1 | 1i | -1i | -1i | 1 | -1i |
| -1i | 1i | 1 | -1i | -1i | -1i | 1 | 1i |
| -1i | 1i | -1 | 1i | -1i | -1i | -1 | -1i |
| -1i | 1i | -1 | -1i | -1i | -1i | -1 | 1i |
| -1i | 1i | 1i | 1 | 1i | 1i | -1i | 1 |
| -1i | 1i | 1i | -1 | 1i | 1i | -1i | -1 |
| -1i | 1i | -1i | 1 | 1i | 1i | 1i | 1 |
| -1i | 1i | -1i | -1 | 1i | 1i | 1i | -1 |
| -1i | -1i | 1 | 1i | -1i | 1i | 1 | -1i |
| -1i | -1i | 1 | -1i | -1i | 1i | 1 | 1i |
| -1i | -1i | -1 | 1i | -1i | 1i | -1 | -1i |
| -1i | -1i | -1 | -1i | -1i | 1i | -1 | 1i |
| -1i | -1i | 1i | 1 | 1i | -1i | -1i | 1 |
| -1i | -1i | 1i | -1 | 1i | -1i | -1i | -1 |
| -1i | -1i | -1i | 1 | 1i | -1i | 1i | 1 |
| -1i | -1i | -1i | -1 | 1i | -1i | 1i | -1 |

Hereinafter, an embodiment of subdividing a phase rotation factor for a sequence for 80 MHz will be described. Two different embodiments may be applied to a sequence for 80 MHz.

As a first method, a sequence for 20 MHz defined as 256 components may be first generated and a sequence for 20 MHz may be repeated four times to generate a 80 MHz sequence with 1024 components, which is represented according to Mathematical Expression 13 below.

[Mathematical Expression 13]

$$S_{20MHz} = [C_{52}\ D_{12}\ C_{52}\ D_{12}\ C_{52}\ D_{12}\ C_{52}]$$
$$\times \gamma_1^{(80)} \quad \times \gamma_2^{(80)} \quad \times \gamma_3^{(80)} \quad \times \gamma_4^{(80)}$$

$$S_{80MHz} = [0_5\ S_{20MHz}\ D_{12}\ S_{20MHz}\ D_{12}\ S_{20MHz}\ D_{12}\ S_{20MHz}\ 0_7]$$
$$\times \gamma_5^{(80)} \quad \times \gamma_6^{(80)} \quad \times \gamma_7^{(80)} \quad \times \gamma_8^{(80)}$$

In Mathematical Expression 13 above, $\Upsilon_k$ is determined according to a direction of minimizing PAPR of an 80 MHz sequence. In other words, Mathematical Expression 14, components of $\Upsilon_k$ (k=1, 2, 3, 4) of a phase rotation factor for 20 MHz is not determined as an optimal value for a 20 MHz sequence and is determined as an optimal value for a 80 MHz sequence. That is, in Mathematical Expression 13, components of $\Upsilon_k$ (k=5, 6, 7, 8) of a phase rotation factor for a 80 MHz sequence is not simple four-time repetition of a 20 MHz sequence and components of a phase rotation factor of 20 MHz and components of a phase rotation factor of 80 MHz may be determined together.

In the case of an 80 MHz sequence according to the first method, PAPR=2.1348 may be obtained and there are 4 number of cases shown in Table 8 below.

TABLE 8

| | | | | | | | |
|---|---|---|---|---|---|---|---|
| 1 | -1 | -1 | -1 | 1 | 1 | 1 | -1 |
| 1 | -1 | -1 | -1 | -1 | -1 | -1 | 1 |
| 1 | -1 | -1 | -1 | i | i | i | -i |
| 1 | -1 | -1 | -1 | -i | -i | -i | i |

As a second method for 80 MHz, a similar method to an embodiment of subdividing 40 MHz may be applied. That is, for an 80 MHz sequence, a value of a phase rotation factor may be determined in a unit of $\{C_{12}D_{12}\}$ and/or $\{C_{12}\}$. First, a 80 MHz sequence according to the second method may be represented according to Mathematical Expression 14 below.

$$S_{80\ MHz} = [0_5\ S_{80\ MHz}^1\ S_{80\ MHz}^2\ 0_7]$$

$$S_{80\ MHz}^1 = [C_{52}D_{12}C_{52}D_{12}C_{52}D_{12}C_{52}D_{12}C_{52}D_{12}C_{52}D_{12}C_{52}D_{12}C_{52}D_{12}]$$

$$S_{80\ MHz}^2 = [C_{52}D_{12}C_{52}D_{12}C_{52}D_{12}C_{52}D_{12}\ C_{52}D_{12}C_{52}D_{12}C_{52}D_{12}C_{52}]$$

[Mathematical Expression 14]

A 80 MHz sequence may be divided into two parts ($S_{80\ MHz}^1$, $S_{80\ MHz}^2$) as shown in Mathematical Expression 14 above and the respective parts may include a total of 16 including 8 components $\{C_{12}D_{12}\}$ (here, only $C_{12}$ is pre sent in 16 last components. Accordingly, a phase rotation factor may be applied in a unit of $\{C_{12}D_{12}\}$ and a total of 16 phase rotation factor values may be defined for one sequence. Mathematical Expression 15 below states this embodiment and this method may be a method of obtaining optimal PAPR.

$$S^1_{80\ MHz} = \begin{bmatrix} \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} \\ \gamma_1 & \gamma_2 & \gamma_3 & \gamma_4 & \gamma_5 & \gamma_6 & \gamma_7 & \gamma_8 \end{bmatrix}$$

$$S^2_{80\ MHz} = \begin{bmatrix} \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} & \dfrac{C_{52}\ D_{12}}{\times} \\ \gamma_9 & \gamma_{10} & \gamma_{11} & \gamma_{12} & \gamma_{13} & \gamma_{14} & \gamma_{15} & \gamma_{16} \end{bmatrix}$$

[Mathematical Expression 15]

In the case of $D_{12}=0_{12}$ in Mathematical Expression 15 above, 6144 phase rotation factors that satisfy PAPR=1.6747 may be generated and each phase rotation factor may include 16 components ($\gamma=\{\gamma_1, \gamma_2, \ldots \gamma_{16}\}$).

Table 9 below shows only 704 sequences as a base sequence among the 6144 phase rotation factors. Table 9 below shows only 704 sequences as a base sequence among the 6144 phase rotation factors. In Table 9 below, a total of 704 rows are present and a baseline sequence with 16 components are indicated in one row. In addition, in each room in Table 9 below, 704 rows are divided into an arbitrary number of parts in order to easily distinguish sequences.

TABLE 9

| | | | | | | | | | | | | | | | |
|---|---|---|---|---|---|---|---|---|---|---|---|---|---|---|---|
| 1 | 1 | 1 | 1 | 1 | -1 | -i | i | 1 | 1 | -1 | -1 | 1 | -1 | i | -i |
| 1 | 1 | 1 | 1 | 1 | -i | i | -1 | 1 | -1 | -1 | 1 | 1 | i | -i | -1 |
| 1 | 1 | 1 | 1 | i | 1 | i | -1 | -1 | 1 | -1 | 1 | -i | i | i | -1 |
| 1 | 1 | 1 | 1 | i | -i | -1 | 1 | -1 | -1 | 1 | 1 | -i | 1 | -1 | 1 |
| 1 | 1 | 1 | -1 | 1 | -1 | -i | -i | 1 | 1 | -1 | 1 | 1 | -1 | i | i |
| 1 | 1 | 1 | -1 | 1 | 1 | -i | -i | 1 | 1 | -1 | 1 | -1 | 1 | i | i |
| 1 | 1 | 1 | -1 | -1 | -i | i | -1 | 1 | -1 | -1 | -1 | -1 | i | -i | -1 |
| 1 | 1 | 1 | -1 | i | -1 | -i | -1 | -1 | 1 | -1 | -1 | -i | -1 | i | -1 |
| 1 | 1 | 1 | -1 | -i | -1 | 1 | -1 | -1 | 1 | -1 | -1 | 1 | -1 | -i | -1 |
| 1 | 1 | 1 | i | 1 | 1 | -i | -i | 1 | -1 | -1 | i | 1 | -1 | 1 | -i |
| 1 | 1 | 1 | i | -1 | 1 | -i | -1 | 1 | 1 | -1 | -1 | 1 | 1 | 1 | 1 |
| 1 | 1 | 1 | i | -1 | -i | i | i | 1 | -1 | -1 | i | -1 | 1 | -i | i |
| 1 | 1 | 1 | i | i | -1 | i | i | -1 | 1 | -1 | i | -i | -1 | i | i |
| 1 | 1 | 1 | i | -i | 1 | i | -1 | -1 | 1 | -1 | i | 1 | 1 | -i | -i |
| 1 | 1 | 1 | i | -1 | i | -1 | i | -1 | -1 | 1 | i | i | -1 | -1 | i |
| 1 | 1 | 1 | -i | 1 | i | -i | i | 1 | -1 | -1 | -i | i | -1 | i | i |
| 1 | 1 | 1 | -1 | -1 | 1 | -i | 1 | 1 | 1 | 1 | i | -1 | 1 | 1 | -1 |
| 1 | 1 | 1 | -1 | -1 | -i | -i | -1 | -1 | -1 | 1 | -1 | -i | 1 | -1 | -i |
| 1 | 1 | 1 | -i | i | -1 | -i | -1 | -1 | 1 | -1 | -i | -i | -1 | i | -1 |
| 1 | 1 | 1 | -i | -i | 1 | i | i | -1 | 1 | -1 | -i | i | 1 | -i | i |
| 1 | 1 | 1 | -1 | -1 | i | -1 | -i | -1 | -1 | 1 | -i | i | -1 | -1 | -i |
| 1 | 1 | -1 | 1 | 1 | i | 1 | -1 | 1 | 1 | 1 | 1 | -1 | i | -1 | -1 |
| 1 | 1 | 1 | 1 | 1 | 1 | -i | -1 | 1 | -1 | -1 | 1 | 1 | -i | i | -1 |
| 1 | 1 | 1 | 1 | -1 | i | i | i | 1 | 1 | -1 | -1 | 1 | 1 | i | -i |
| 1 | 1 | 1 | 1 | i | -1 | -i | 1 | -1 | 1 | -1 | 1 | -i | -1 | i | 1 |
| 1 | 1 | 1 | 1 | -i | 1 | i | -1 | 1 | -1 | 1 | 1 | i | i | -i | -1 |
| 1 | 1 | 1 | -1 | 1 | i | -1 | 1 | -1 | -1 | 1 | -1 | 1 | -i | i | 1 |
| 1 | 1 | 1 | -1 | -1 | i | -i | -1 | -1 | -1 | -1 | -1 | -1 | -i | i | -1 |
| 1 | 1 | 1 | -1 | i | 1 | -1 | 1 | -1 | 1 | -1 | -1 | -1 | -1 | 1 | 1 |
| 1 | 1 | 1 | -1 | i | -i | -i | -1 | -1 | -1 | 1 | -1 | -i | -i | -1 | -1 |
| 1 | 1 | 1 | -1 | -i | i | -1 | -1 | -1 | -1 | 1 | -1 | i | -i | -1 | -1 |
| 1 | 1 | 1 | 1 | 1 | -i | 1 | -i | 1 | -1 | -1 | i | 1 | i | -i | -i |
| 1 | 1 | 1 | i | -1 | i | -i | 1 | 1 | -1 | 1 | -1 | -i | i | i | 1 |
| 1 | 1 | 1 | i | i | 1 | -1 | -1 | 1 | -1 | 1 | i | 1 | 1 | 1 | -1 |
| 1 | 1 | 1 | i | i | -i | -1 | i | -1 | -1 | 1 | i | i | -i | -1 | i |
| 1 | 1 | 1 | i | -i | -1 | i | i | 1 | -1 | 1 | i | i | -i | -i | i |
| 1 | 1 | 1 | -i | 1 | -1 | -i | 1 | 1 | -1 | i | 1 | i | -1 | i | -1 |
| 1 | 1 | 1 | -i | 1 | -i | i | i | 1 | -1 | -1 | -i | 1 | i | -i | i |
| 1 | 1 | 1 | -i | -1 | 1 | i | i | 1 | -1 | -i | -1 | i | -i | -i | i |
| 1 | 1 | 1 | -i | i | 1 | -i | -1 | 1 | -1 | -i | -i | 1 | i | -i | -i |
| 1 | 1 | 1 | -i | i | -i | -1 | -1 | 1 | -1 | i | -i | i | -i | -i | -i |
| 1 | 1 | 1 | -i | -i | -i | i | -1 | -1 | -1 | 1 | -i | -i | 1 | -i | -i |
| 1 | 1 | -1 | 1 | 1 | -1 | -i | 1 | 1 | 1 | 1 | -1 | 1 | -1 | i | i |
| 1 | 1 | -1 | 1 | 1 | -i | -1 | -1 | 1 | -1 | 1 | 1 | 1 | i | i | -1 |
| 1 | 1 | -1 | 1 | -1 | 1 | -i | -i | 1 | 1 | 1 | -1 | -1 | 1 | 1 | i |
| 1 | 1 | -1 | 1 | i | 1 | 1 | -1 | -1 | 1 | 1 | 1 | -i | 1 | -i | -1 |
| 1 | 1 | -1 | 1 | -i | 1 | 1 | -1 | -1 | -1 | 1 | -i | 1 | -i | -1 | -1 |
| 1 | 1 | -1 | 1 | -i | -1 | -i | 1 | 1 | 1 | 1 | i | -1 | i | 1 | 1 |
| 1 | 1 | -1 | -1 | 1 | -1 | -i | i | 1 | 1 | 1 | 1 | 1 | -1 | i | -i |
| 1 | 1 | -1 | -1 | -1 | 1 | -i | i | 1 | 1 | 1 | 1 | 1 | 1 | i | -i |
| 1 | 1 | -1 | -1 | -1 | -1 | -i | -1 | 1 | -1 | 1 | -1 | -1 | -1 | i | -i |
| 1 | 1 | -1 | -1 | i | -1 | -1 | -i | -1 | 1 | 1 | -1 | -1 | -1 | -1 | 1 |
| 1 | 1 | -1 | -1 | -i | 1 | -1 | -1 | 1 | -1 | -1 | 1 | -1 | i | -1 | -i |
| 1 | 1 | -1 | i | 1 | -1 | -i | 1 | 1 | -1 | 1 | -i | 1 | -1 | i | -i |
| 1 | 1 | -1 | i | 1 | -i | 1 | 1 | -1 | -1 | 1 | 1 | 1 | 1 | 1 | 1 |
| 1 | 1 | -1 | i | -1 | 1 | -1 | i | -1 | 1 | 1 | 1 | 1 | -i | i | -1 |
| 1 | 1 | -1 | i | -1 | -i | -1 | -1 | 1 | 1 | 1 | i | 1 | 1 | -1 | -1 |
| 1 | 1 | -1 | i | i | i | 1 | -1 | 1 | -1 | i | 1 | -1 | -i | -i | i |
| 1 | 1 | -1 | i | i | -i | i | -1 | -1 | -1 | i | -1 | i | -1 | -1 | i |
| 1 | 1 | -1 | i | -i | 1 | -1 | -1 | 1 | -1 | -1 | i | i | -i | -1 | -1 |
| 1 | 1 | -1 | i | -i | -i | -i | -1 | -1 | -1 | i | -1 | -i | -i | -1 | -i |
| 1 | 1 | -1 | -i | 1 | i | 1 | -1 | -1 | 1 | 1 | -i | 1 | -i | -1 | -1 |
| 1 | 1 | -1 | -i | -i | i | -1 | 1 | -1 | 1 | 1 | -i | 1 | -i | 1 | 1 |

TABLE 9-continued

| | | | | | | | | | | | | | | | |
|---|---|---|---|---|---|---|---|---|---|---|---|---|---|---|---|
| 1 | 1 | -1 | -i | -1 | 1 | i | 1 | 1 | 1 | 1 | i | -1 | 1 | -i | -1 |
| 1 | 1 | -1 | -i | -1 | -i | -1 | 1 | 1 | -1 | -1 | i | -1 | i | -1 | -1 |
| 1 | 1 | -1 | -i | i | -1 | i | -1 | -1 | 1 | 1 | -i | -i | -1 | -i | -i |
| 1 | 1 | -1 | -i | -i | 1 | -i | i | -1 | 1 | 1 | -i | i | 1 | i | i |
| 1 | 1 | -1 | -i | -i | i | -1 | i | -1 | -1 | -1 | -i | i | -i | -1 | i |
| 1 | 1 | i | 1 | 1 | i | -i | -i | 1 | -1 | i | -1 | 1 | -i | -i | i |
| 1 | 1 | i | 1 | -1 | 1 | -1 | -1 | 1 | 1 | -i | -1 | -1 | 1 | 1 | i |
| 1 | 1 | i | 1 | -1 | -i | i | i | 1 | -1 | i | -1 | -1 | i | i | -i |
| 1 | 1 | i | 1 | -1 | i | -i | -1 | 1 | 1 | i | -1 | -i | -1 | i | i |
| 1 | 1 | -1 | 1 | -1 | -i | -i | 1 | 1 | -1 | 1 | 1 | -1 | i | i | 1 |
| 1 | 1 | -1 | 1 | i | -1 | i | 1 | -1 | 1 | 1 | 1 | -1 | -1 | -1 | 1 |
| 1 | 1 | -1 | 1 | -i | 1 | -i | -1 | -1 | 1 | 1 | 1 | 1 | 1 | i | -1 |
| 1 | 1 | -1 | i | i | -1 | -1 | -1 | 1 | 1 | -1 | 1 | i | -i | -1 | -1 |
| 1 | 1 | -1 | -1 | 1 | -1 | -i | 1 | 1 | -1 | 1 | -1 | 1 | 1 | i | 1 |
| 1 | 1 | -1 | -1 | -1 | i | i | -1 | 1 | -1 | 1 | -1 | -1 | -i | -i | -1 |
| 1 | 1 | -1 | -1 | i | -1 | i | -1 | -1 | 1 | 1 | -1 | -i | -1 | -i | -1 |
| 1 | 1 | -1 | -1 | -i | -i | 1 | -1 | 1 | 1 | 1 | 1 | -1 | i | i | 1 |
| 1 | 1 | -1 | -1 | -i | i | -1 | 1 | -1 | -1 | -1 | i | 1 | -i | -1 | 1 |
| 1 | 1 | -1 | i | 1 | i | -i | 1 | -1 | 1 | i | i | -i | -i | -i | -i |
| 1 | 1 | -1 | i | -1 | 1 | -i | 1 | 1 | 1 | -i | -1 | 1 | i | -1 |
| 1 | 1 | -1 | i | -1 | -i | -i | i | i | 1 | 1 | i | -1 | 1 | i | i |
| 1 | 1 | -1 | i | i | -1 | i | 1 | -1 | 1 | 1 | i | -i | -1 | -i | i |
| 1 | 1 | -1 | i | -i | -1 | -1 | -1 | 1 | -1 | -i | 1 | -1 | -1 | 1 |
| 1 | 1 | -1 | -i | 1 | -1 | i | 1 | 1 | 1 | 1 | i | 1 | -1 | -i | -1 |
| 1 | 1 | -1 | -i | 1 | -i | 1 | 1 | 1 | 1 | 1 | i | i | 1 | i | -1 |
| 1 | 1 | -1 | -i | -1 | i | -1 | 1 | -1 | -1 | 1 | i | -1 | -i | -1 | 1 |
| 1 | 1 | -1 | -i | i | i | i | -i | 1 | 1 | -i | -i | 1 | -i | i |
| 1 | 1 | -1 | -i | i | -i | -1 | i | -1 | -1 | -i | -i | i | -1 | 1 |
| 1 | 1 | -1 | -i | -i | -1 | -i | -1 | 1 | 1 | -i | 1 | 1 | 1 | -1 | -i |
| 1 | 1 | i | 1 | 1 | -1 | -i | i | 1 | -1 | i | 1 | i | -i | 1 | i |
| 1 | 1 | i | 1 | 1 | -i | -i | i | 1 | -1 | i | 1 | i | -i | -i | -i |
| 1 | 1 | i | 1 | -1 | i | i | -i | 1 | -1 | i | -1 | -1 | -i | i | i |
| 1 | 1 | i | 1 | i | 1 | -i | -1 | 1 | i | -1 | -i | 1 | -i | -1 | i |
| 1 | 1 | i | 1 | i | -i | i | -1 | 1 | i | -1 | -i | i | -i | 1 |
| 1 | 1 | i | 1 | -i | 1 | -i | i | 1 | -1 | i | i | 1 | -i | -i |
| 1 | 1 | 1 | -1 | 1 | -1 | 1 | -i | 1 | 1 | -i | 1 | 1 | -1 | -1 | i |
| 1 | 1 | i | -1 | -1 | 1 | -1 | i | 1 | 1 | -i | 1 | -1 | 1 | 1 | -i |
| 1 | 1 | i | -1 | -1 | -i | i | 1 | 1 | -1 | 1 | -1 | 1 | i | i | 1 |
| 1 | 1 | 1 | -1 | 1 | -1 | i | 1 | -1 | 1 | 1 | 1 | -1 | -1 | i | -i |
| 1 | 1 | i | -1 | -i | -1 | -1 | -1 | 1 | -i | -1 | i | -1 | 1 | 1 | -1 |
| 1 | 1 | i | i | 1 | i | 1 | -i | 1 | -1 | -i | i | 1 | -i | -1 | -i |
| 1 | 1 | i | i | -1 | 1 | 1 | 1 | 1 | -i | -i | -1 | -1 | -1 | 1 | i |
| 1 | 1 | i | i | -1 | -i | -1 | i | 1 | 1 | -i | i | -1 | -1 | -1 | i |
| 1 | 1 | i | i | i | -1 | 1 | i | -1 | i | -1 | 1 | -i | -1 | 1 | i |
| 1 | 1 | i | i | i | -i | -i | i | 1 | -i | -i | i | 1 | -i | -1 | 1 |
| 1 | 1 | i | i | -i | -i | 1 | -1 | 1 | -i | i | i | 1 | 1 | 1 | -i |
| 1 | 1 | i | -i | -1 | -1 | -1 | 1 | -1 | i | i | i | i | 1 | i |
| 1 | 1 | i | -i | i | 1 | 1 | -1 | 1 | i | i | 1 | -i | -i | 1 |
| 1 | 1 | 1 | -i | -i | -1 | -1 | -i | 1 | -i | 1 | -1 | 1 | -i |
| 1 | -i | 1 | 1 | -1 | 1 | -i | 1 | 1 | i | -1 | 1 | -1 | -1 | i |
| 1 | 1 | -i | 1 | 1 | -i | 1 | -1 | 1 | 1 | i | 1 | 1 | 1 | -1 | -1 |
| 1 | 1 | -i | 1 | -1 | i | 1 | 1 | 1 | i | 1 | -1 | -1 | 1 | 1 |
| 1 | 1 | -i | 1 | i | -1 | -1 | 1 | -1 | 1 | 1 | -i | -1 | 1 | 1 |
| 1 | 1 | i | 1 | -i | i | i | -1 | -1 | 1 | 1 | i | -i | i | i | -1 |
| 1 | 1 | i | -1 | 1 | -i | -i | -1 | 1 | 1 | 1 | -1 | i | -i | i |
| 1 | 1 | i | -1 | -1 | 1 | i | i | 1 | 1 | 1 | -1 | -i | i | -i |
| 1 | 1 | i | -1 | i | 1 | -1 | -1 | 1 | 1 | 1 | -1 | -i | i | i | -i |
| 1 | 1 | i | -1 | i | -i | -i | -1 | -1 | 1 | -1 | -1 | -i | i | -i | -i |
| 1 | 1 | i | -1 | -i | i | i | -1 | 1 | -i | -i | -1 | -i | -i | -1 | -i |
| 1 | 1 | i | -1 | -i | -i | 1 | -1 | 1 | -i | i | -1 | -i | -i | -1 | -i |
| 1 | 1 | i | -1 | -i | -i | -i | 1 | -1 | -i | -i | -1 | i | 1 | i |
| 1 | 1 | i | -i | -i | 1 | i | -i | 1 | -1 | -i | 1 | -i | i |
| 1 | 1 | -i | 1 | 1 | i | -1 | -1 | 1 | 1 | 1 | -i | 1 | -1 |
| 1 | 1 | -i | 1 | -1 | 1 | -1 | i | -1 | -1 | 1 | -1 | 1 | i |
| 1 | 1 | -i | 1 | -1 | 1 | 1 | 1 | -1 | i | 1 | -1 | i | 1 | 1 |
| 1 | 1 | -i | 1 | i | -1 | 1 | -1 | i | 1 | 1 | i | 1 | -1 | -1 |
| 1 | 1 | -i | 1 | i | -i | -1 | -1 | 1 | i | 1 | -1 | 1 | -1 | -1 | 1 |
| 1 | 1 | -i | -1 | 1 | -1 | i | 1 | 1 | 1 | 1 | -1 | -1 | i | -i |
| 1 | 1 | -i | -1 | 1 | 1 | i | 1 | 1 | i | 1 | 1 | -1 | 1 | -1 | -i |
| 1 | 1 | -i | -1 | -1 | -i | 1 | 1 | -1 | i | -1 | -1 | -1 | -1 | -i |
| 1 | 1 | -i | -1 | -1 | -1 | -i | 1 | -1 | i | -1 | -1 | i | -1 | -1 | -i |
| 1 | 1 | -i | -1 | -i | 1 | -1 | 1 | -1 | i | -1 | i | 1 | 1 | -i |

TABLE 9-continued

| | | | | | | | | | | | | | | | |
|---|---|---|---|---|---|---|---|---|---|---|---|---|---|---|---|
| 1 | 1 | -i | -1 | i | -1 | -i | i | -1 | 1 | -i | 1 | -i | -1 | -i | -i |
| 1 | 1 | -i | -1 | -i | 1 | i | -i | -1 | 1 | -i | 1 | i | 1 | i | i |
| 1 | 1 | -i | -1 | -i | 1 | -i | 1 | -1 | -1 | -i | -1 | i | -1 | -i | 1 |
| 1 | 1 | -i | i | 1 | -i | 1 | i | -1 | i | i | 1 | 1 | i | -1 | -i |
| 1 | 1 | -i | i | -1 | i | -i | 1 | 1 | -1 | i | -i | -1 | -i | -i | -1 |
| 1 | 1 | -i | i | 1 | -1 | -i | 1 | -1 | 1 | -i | -i | -i | -1 | -i | -1 |
| 1 | 1 | -i | i | -i | 1 | i | -1 | -1 | 1 | -i | -i | i | 1 | i | 1 |
| 1 | 1 | -i | 1 | -i | 1 | i | i | 1 | -1 | -i | 1 | 1 | -i | 1 | 1 |
| 1 | 1 | -i | -1 | 1 | 1 | -1 | 1 | 1 | -1 | i | -1 | 1 | -i | 1 | 1 |
| 1 | 1 | -i | -1 | -1 | i | -1 | -1 | 1 | -1 | i | -1 | -1 | -i | 1 | -1 |
| 1 | 1 | -i | -1 | i | 1 | i | i | -1 | 1 | -i | 1 | -i | 1 | i | -i |
| 1 | 1 | -i | -1 | i | -1 | -i | 1 | -1 | -i | -1 | -i | i | i | -i | 1 |
| 1 | 1 | -i | -1 | -i | -1 | -i | -1 | 1 | -i | -1 | -i | i | 1 | -i | 1 |
| 1 | 1 | -i | i | 1 | 1 | -i | 1 | -1 | i | 1 | 1 | 1 | -i | 1 | -1 |
| 1 | 1 | -i | i | -1 | 1 | 1 | 1 | 1 | i | -i | -1 | 1 | -1 | -1 |
| 1 | 1 | -i | i | i | 1 | i | 1 | -1 | 1 | -i | -i | -i | 1 | 1 | -1 |
| 1 | 1 | -i | i | i | -i | -1 | -i | -1 | -1 | 1 | i | 1 | -i | -i | -i |
| 1 | 1 | -i | i | -i | -1 | -i | -1 | 1 | 1 | -i | i | -1 | -i | 1 |
| 1 | 1 | -i | -i | -1 | -1 | -1 | 1 | 1 | -1 | -i | i | -1 | i | -1 | -1 |
| 1 | 1 | -i | -i | i | -1 | -1 | -1 | 1 | -i | i | -i | -1 | -i | 1 |
| 1 | 1 | -i | -i | -i | 1 | 1 | 1 | -1 | 1 | 1 | i | 1 | i | 1 | -1 |
| 1 | 1 | -i | -i | -i | i | -1 | i | -1 | -i | -1 | 1 | -i | -i | 1 |
| 1 | -1 | 1 | 1 | 1 | i | i | -1 | 1 | 1 | -1 | 1 | 1 | -1 | -i | -1 |
| 1 | -1 | 1 | 1 | -1 | -1 | -i | i | 1 | 1 | -1 | -1 | -1 | -1 | 1 | -1 |
| 1 | -1 | 1 | 1 | -1 | -i | -i | 1 | 1 | 1 | -1 | 1 | -1 | 1 | i | i |
| 1 | -1 | 1 | 1 | i | -1 | -i | -1 | -1 | -1 | 1 | -i | -1 | i | -1 |
| 1 | -1 | 1 | 1 | -i | -1 | i | -1 | -1 | -1 | -1 | 1 | i | -1 | -i | -1 |
| 1 | -1 | 1 | -1 | 1 | 1 | -i | -i | 1 | -1 | 1 | 1 | 1 | i | 1 |
| 1 | -1 | 1 | -1 | 1 | -i | 1 | 1 | -1 | 1 | 1 | 1 | 1 | i | 1 | 1 |
| 1 | -1 | 1 | -1 | -1 | 1 | i | -1 | 1 | 1 | -1 | -1 | -i | -i | -1 |
| 1 | -1 | 1 | -1 | i | 1 | -i | -1 | -1 | -1 | -1 | -i | 1 | i | -1 |
| 1 | -1 | 1 | -1 | -1 | 1 | -1 | -1 | -1 | 1 | 1 | 1 | 1 | 1 |
| 1 | -1 | 1 | -1 | -i | 1 | -1 | 1 | 1 | 1 | 1 | 1 | i | 1 | 1 |
| 1 | -1 | 1 | i | 1 | -i | -1 | 1 | 1 | 1 | -1 | 1 | 1 | -1 | -i |
| 1 | -1 | 1 | i | -1 | 1 | 1 | 1 | 1 | -1 | 1 | -1 | -1 | -i | 1 |
| 1 | -1 | 1 | i | i | 1 | -i | 1 | -1 | -1 | 1 | -1 | 1 | i | 1 |
| 1 | -1 | 1 | i | i | 1 | -1 | 1 | 1 | 1 | 1 | -i | -i | -1 | 1 |
| 1 | -1 | 1 | -i | 1 | -1 | -i | -1 | 1 | 1 | 1 | 1 | 1 | -i | -1 | 1 |
| 1 | 1 | -i | -i | i | 1 | i | -1 | -1 | 1 | -i | 1 | -1 | 1 | 1 | 1 |
| 1 | 1 | -i | -i | 1 | -i | -i | 1 | -1 | 1 | -i | -i | -i | i | -1 | i |
| 1 | 1 | -1 | -1 | -i | -1 | -1 | i | 1 | -1 | -1 | 1 | 1 | -1 | -1 | 1 |
| 1 | -1 | 1 | 1 | 1 | 1 | -i | i | 1 | -1 | 1 | -1 | 1 | 1 | i | -i |
| 1 | -1 | 1 | 1 | 1 | -i | -1 | -1 | 1 | 1 | -1 | 1 | 1 | 1 | 1 | -1 |
| 1 | -1 | 1 | 1 | -1 | i | i | 1 | 1 | 1 | -1 | 1 | -i | -i | -i | 1 |
| 1 | -1 | 1 | 1 | i | 1 | -1 | 1 | 1 | -1 | 1 | -i | 1 | 1 | 1 |
| 1 | -1 | 1 | 1 | -i | 1 | i | 1 | -1 | -1 | 1 | 1 | 1 | 1 | -i | 1 |
| 1 | -1 | 1 | 1 | -i | -i | -1 | 1 | -1 | 1 | 1 | 1 | 1 | i | -1 | 1 |
| 1 | -1 | 1 | -1 | 1 | i | i | 1 | 1 | 1 | -1 | -1 | -1 | -i | -i | 1 |
| 1 | -1 | 1 | -1 | -1 | -1 | -i | -i | 1 | -1 | 1 | 1 | -1 | 1 | 1 |
| 1 | -1 | 1 | -1 | -1 | -1 | -i | -1 | 1 | 1 | 1 | -1 | -1 | 1 | 1 | -i |
| 1 | -1 | 1 | -1 | i | -1 | -i | 1 | -1 | -1 | -1 | -i | -1 | i | 1 |
| 1 | -1 | 1 | -1 | -i | -1 | -i | -1 | -1 | 1 | 1 | -1 | -1 | i |
| 1 | -1 | 1 | i | 1 | 1 | 1 | 1 | -1 | -1 | 1 | -i | 1 | 1 | -i | -1 |
| 1 | -1 | 1 | i | -1 | 1 | i | 1 | 1 | -1 | 1 | -i | -1 | i | -i | -1 |
| 1 | -1 | 1 | i | -1 | -i | i | 1 | 1 | -1 | 1 | -i | -1 | i | 1 | i |
| 1 | -1 | 1 | i | i | -1 | -i | -1 | -1 | i | -i | -1 | i | -i |
| 1 | -1 | 1 | i | i | -1 | -1 | -1 | -1 | 1 | i | -1 | 1 | -1 | 1 |
| 1 | -1 | 1 | -i | 1 | i | 1 | 1 | -1 | 1 | i | 1 | 1 | -1 | 1 |
| 1 | -1 | 1 | -i | 1 | -1 | -1 | 1 | 1 | 1 | 1 | 1 | 1 | 1 | -1 | 1 |
| 1 | -1 | 1 | -i | -1 | -1 | i | -1 | 1 | -1 | 1 | -1 | -1 | -1 | 1 |
| 1 | -1 | 1 | -i | -1 | -1 | -i | -i | 1 | 1 | -1 | i | i | -1 | i |
| 1 | -1 | 1 | -1 | 1 | 1 | 1 | -1 | 1 | -1 | 1 | 1 | 1 | i | 1 | 1 |
| 1 | -1 | -1 | 1 | 1 | 1 | 1 | 1 | 1 | -1 | -1 | 1 | -i | 1 | -i |
| 1 | -1 | -1 | 1 | -1 | 1 | 1 | 1 | 1 | -1 | -1 | -1 | -1 | -1 | -i |
| 1 | -1 | -1 | 1 | -1 | -1 | -1 | 1 | -1 | 1 | -1 | -1 | 1 | -1 | i |
| 1 | -1 | -1 | 1 | i | -1 | 1 | -1 | -1 | -1 | -1 | -1 | -1 | 1 | i |
| 1 | -1 | -1 | 1 | -i | 1 | -i | 1 | -1 | -1 | 1 | 1 | 1 | 1 | 1 | 1 |
| 1 | -1 | -1 | 1 | -i | -i | -1 | -1 | -1 | 1 | -1 | 1 | i | 1 | -1 | -1 |
| 1 | -1 | -1 | -1 | -1 | 1 | 1 | 1 | -1 | 1 | -i | 1 | i |
| 1 | -1 | -1 | -1 | -1 | i | 1 | 1 | 1 | -1 | -1 | 1 | -1 | -i | i |
| 1 | -1 | -1 | -1 | -i | -1 | i | 1 | 1 | -1 | 1 | 1 | -1 | i | -i | -i |
| 1 | -1 | -1 | -1 | -1 | -i | 1 | 1 | -1 | 1 | -i | -1 | 1 | -1 |
| 1 | -1 | -1 | -1 | -i | -1 | i | 1 | -1 | -1 | 1 | 1 | i | i | 1 | i |
| 1 | -1 | -1 | i | -1 | i | 1 | 1 | -1 | -i | 1 | i | 1 | -1 |
| 1 | -1 | -1 | i | -1 | i | -1 | 1 | -1 | -i | -1 | -i | -1 | 1 |
| 1 | -1 | -1 | i | i | 1 | 1 | -1 | -1 | -i | -1 | 1 | -1 | -1 |
| 1 | -1 | -1 | i | 1 | i | 1 | i | -1 | 1 | -1 | i | -i | 1 | 1 |

TABLE 9-continued

| | | | | | | | | | | | | | | |
|---|---|---|---|---|---|---|---|---|---|---|---|---|---|---|
| 1 | -1 | -1 | i | -i | -1 | 1 | -1 | -1 | -1 | -1 | -i | 1 | -1 | 1 | 1 |
| 1 | -1 | -1 | -i | 1 | 1 | i | 1 | 1 | -1 | 1 | i | 1 | 1 | -1 | -1 |
| 1 | -1 | -1 | -i | 1 | -i | i | i | 1 | 1 | 1 | -i | 1 | i | -1 | i |
| 1 | -1 | -1 | -i | -1 | i | -i | -1 | 1 | 1 | 1 | -i | -1 | 1 | i | -i |
| 1 | -1 | -1 | -i | 1 | 1 | 1 | -1 | -1 | -1 | 1 | -i | -i | 1 | -1 | -1 |
| 1 | -1 | 1 | -1 | -1 | 1 | 1 | 1 | 1 | 1 | 1 | i | -1 | -i | 1 | -1 |
| 1 | -1 | 1 | -i | i | i | 1 | i | -1 | 1 | 1 | -i | -1 | -i | 1 | i |
| 1 | -1 | 1 | -i | -i | -1 | -1 | 1 | -1 | -1 | 1 | i | i | -1 | -1 | -1 |
| 1 | -1 | -1 | 1 | 1 | 1 | i | 1 | -1 | -1 | 1 | -1 | 1 | 1 | -1 | 1 |
| 1 | -1 | -1 | 1 | 1 | -1 | 1 | -1 | 1 | 1 | -1 | -1 | 1 | 1 | 1 | 1 |
| 1 | -1 | -1 | 1 | -1 | 1 | -1 | i | 1 | 1 | -1 | -1 | -1 | -1 | -1 | -i |
| 1 | -1 | -1 | 1 | i | 1 | -1 | -i | -1 | -1 | -1 | -1 | -i | 1 | -1 | i |
| 1 | -1 | -1 | 1 | i | i | 1 | i | -1 | -1 | -1 | 1 | -i | -1 | -1 | -1 |
| 1 | -1 | -1 | 1 | -i | -1 | 1 | -1 | -1 | -1 | 1 | 1 | i | -1 | 1 | -1 |
| 1 | -1 | -1 | -1 | 1 | 1 | 1 | -i | 1 | -1 | 1 | 1 | 1 | 1 | -1 | i |
| 1 | -1 | -1 | -1 | 1 | -1 | -1 | i | 1 | 1 | -1 | 1 | 1 | i | 1 | -i |
| 1 | -1 | -1 | -1 | -1 | -1 | -1 | i | 1 | 1 | -1 | 1 | 1 | 1 | -1 | 1 |
| 1 | -1 | -1 | -1 | i | 1 | 1 | i | -1 | -1 | 1 | 1 | -i | 1 | -1 | -i |
| 1 | -1 | -1 | -1 | i | i | 1 | -1 | -1 | 1 | -1 | -1 | -i | -i | 1 | -1 |
| 1 | -1 | -1 | -1 | -i | -1 | 1 | -i | -1 | -1 | 1 | 1 | 1 | -1 | 1 | 1 |
| 1 | -1 | -1 | 1 | 1 | 1 | 1 | 1 | -1 | -1 | 1 | 1 | -i | i | 1 | 1 |
| 1 | -1 | -1 | i | -1 | -1 | i | -1 | 1 | 1 | 1 | -i | -i | -1 | -i | 1 |
| 1 | -1 | -1 | 1 | -1 | -1 | -1 | 1 | 1 | 1 | -1 | -1 | -1 | 1 | -1 | -1 |
| 1 | -1 | -1 | i | i | -1 | 1 | -1 | -1 | 1 | -i | -1 | -1 | 1 | -1 |
| 1 | -1 | -1 | 1 | -i | -1 | -1 | 1 | -1 | -1 | -i | 1 | 1 | 1 | 1 |
| 1 | -1 | -1 | i | -i | -1 | i | -1 | 1 | 1 | -i | i | i | 1 | 1 | i |
| 1 | -1 | -1 | -i | 1 | 1 | 1 | i | 1 | 1 | -1 | i | i | -i | 1 | -1 |
| 1 | -1 | -1 | -1 | -1 | -1 | -1 | 1 | -1 | 1 | i | -1 | -1 | 1 | 1 |
| 1 | -1 | -1 | -1 | -1 | -1 | i | -1 | 1 | 1 | 1 | i | -1 | -1 | -1 | -i |
| 1 | -1 | -1 | -i | 1 | -i | i | 1 | -1 | -1 | -i | -i | -i | -i | i |
| 1 | -1 | -1 | -i | i | i | -1 | 1 | -1 | -1 | -i | -i | -i | -1 | i |
| 1 | -1 | -1 | -1 | -i | -1 | -i | 1 | -1 | -1 | 1 | -i | i | -1 | 1 | i |
| 1 | -1 | i | 1 | 1 | 1 | -1 | 1 | -1 | -i | 1 | 1 | 1 | 1 | i |
| 1 | -1 | i | 1 | 1 | -i | -i | -1 | 1 | 1 | i | 1 | i | -i | i |
| 1 | -1 | i | 1 | -1 | i | i | 1 | 1 | 1 | -1 | -1 | -i | i | -i |
| 1 | -1 | i | 1 | i | 1 | 1 | -1 | -1 | -i | 1 | -1 | 1 | -1 | 1 |
| 1 | -1 | i | 1 | i | i | 1 | -1 | -1 | 1 | 1 | -1 | -i | i | -1 |
| 1 | -1 | i | 1 | -i | -i | 1 | -1 | -1 | i | 1 | i | 1 | -1 | -i |
| 1 | -1 | i | -1 | 1 | 1 | -i | 1 | 1 | -1 | -i | 1 | 1 | 1 | 1 | -i |
| 1 | -1 | i | -1 | 1 | -i | 1 | 1 | 1 | -i | -1 | 1 | i | -1 | 1 |
| 1 | -1 | i | -1 | -1 | i | -1 | 1 | 1 | -i | -1 | -1 | -i | 1 | -1 |
| 1 | -1 | i | -1 | -i | 1 | 1 | 1 | -1 | -1 | 1 | -1 | -1 | 1 | -1 |
| 1 | -1 | i | -1 | i | 1 | 1 | -i | -1 | 1 | -i | -i | -1 | -1 | 1 |
| 1 | -1 | i | i | 1 | 1 | 1 | -1 | 1 | -1 | -i | -i | 1 | 1 | -1 | 1 |
| 1 | -1 | i | 1 | 1 | -1 | 1 | -1 | 1 | -1 | 1 | 1 | 1 | -1 | -1 |
| 1 | -1 | i | i | -1 | -1 | 1 | 1 | 1 | i | -i | -1 | 1 | 1 | -1 | -1 |
| 1 | -1 | i | 1 | i | -i | 1 | -1 | -1 | i | -1 | -1 | -1 | -1 | -1 |
| 1 | -1 | i | 1 | -i | 1 | i | -1 | -1 | -1 | i | i | 1 | i | 1 |
| 1 | -1 | i | -i | 1 | 1 | -1 | -1 | 1 | -1 | i | 1 | 1 | 1 | 1 |
| 1 | -1 | i | -1 | -1 | -1 | -1 | 1 | 1 | -1 | -1 | -1 | -1 | i | -1 |
| 1 | -1 | i | -i | 1 | 1 | i | -1 | -1 | 1 | i | -i | 1 | 1 | 1 |
| 1 | -1 | i | -1 | -i | 1 | i | 1 | -1 | -1 | i | i | 1 | i | -1 |
| 1 | -1 | i | -i | -i | -1 | -1 | -1 | 1 | i | -i | i | i | -1 | -i |
| 1 | -1 | -1 | 1 | 1 | 1 | i | 1 | 1 | -1 | 1 | -1 | 1 | i | -i |
| 1 | -1 | -i | 1 | -1 | 1 | -1 | 1 | 1 | -1 | -1 | -1 | -1 | 1 | i | -i |
| 1 | -1 | -1 | -i | 1 | -i | -i | -1 | -1 | 1 | -i | 1 | 1 | i | -i |
| 1 | -1 | -1 | -i | -i | -1 | i | -1 | 1 | -1 | -i | 1 | i | -1 | i |
| 1 | -1 | i | 1 | 1 | i | -1 | i | 1 | 1 | 1 | 1 | 1 | -i | -i | -i |
| 1 | -1 | i | 1 | i | 1 | -1 | -1 | 1 | 1 | -1 | -1 | -1 | -1 | -1 |
| 1 | -1 | i | 1 | -1 | -i | 1 | 1 | 1 | -1 | -1 | -1 | i | -1 | 1 |
| 1 | -1 | i | 1 | -1 | -1 | -1 | 1 | -1 | -1 | 1 | -1 | -1 | -1 | -1 |
| 1 | -1 | i | 1 | 1 | 1 | 1 | -1 | -1 | -i | -1 | 1 | 1 | i | -i |
| 1 | -1 | i | 1 | -1 | -1 | 1 | 1 | 1 | 1 | 1 | 1 | 1 | 1 | 1 |
| 1 | -1 | i | -1 | 1 | i | -1 | -i | 1 | 1 | 1 | 1 | -i | -i | i |
| 1 | -1 | i | -1 | -1 | -1 | -i | 1 | 1 | -i | 1 | -1 | -1 | -1 | 1 |
| 1 | -1 | i | -1 | -1 | -i | -1 | 1 | 1 | -i | -1 | -1 | i | 1 | -1 |
| 1 | -1 | i | -1 | -i | -1 | 1 | -1 | -1 | 1 | -1 | 1 | -1 | -i | -1 |
| 1 | -1 | i | -1 | 1 | 1 | -1 | -1 | 1 | i | 1 | 1 | 1 | i | i |
| 1 | -1 | i | 1 | 1 | i | -1 | -1 | 1 | -1 | i | 1 | -i | 1 | -i |
| 1 | -1 | i | i | -1 | -1 | -1 | 1 | 1 | -i | -1 | -1 | -1 | 1 | -1 |
| 1 | -1 | i | i | 1 | 1 | 1 | 1 | 1 | -1 | 1 | -1 | -i | -1 | -i | i |
| 1 | -1 | i | -i | i | 1 | 1 | 1 | 1 | i | i | 1 | -i | -i | -1 |
| 1 | -1 | i | -i | 1 | i | -1 | -i | 1 | 1 | i | -1 | -1 | -i | -i | -1 |
| 1 | -1 | i | -i | 1 | -i | -i | -i | 1 | -1 | 1 | i | 1 | -i | -i | -1 |
| 1 | -1 | i | -1 | -i | -i | -i | 1 | -1 | 1 | i | 1 | -1 | -i | -i |
| 1 | -1 | -i | 1 | 1 | 1 | 1 | -1 | 1 | -1 | -i | -1 | 1 | 1 | 1 | -i |
| 1 | -1 | -i | 1 | 1 | -1 | 1 | -1 | 1 | 1 | -i | -1 | 1 | i | i | i |
| 1 | -1 | -1 | 1 | -1 | 1 | -i | -1 | 1 | 1 | 1 | -1 | -1 | -1 | -i | -i |

TABLE 9-continued

| | | | | | | | | | | | | | | | |
|---|---|---|---|---|---|---|---|---|---|---|---|---|---|---|---|
| 1 | −1 | −i | 1 | −1 | −1 | −1 | −i | 1 | 1 | −i | −1 | −1 | i | −i | i |
| 1 | −1 | −i | 1 | i | −1 | i | −i | −1 | −1 | −i | −1 | −i | −1 | i | i |
| 1 | −1 | −i | 1 | −i | 1 | −i | i | −1 | −1 | −i | −1 | i | 1 | −i | −1 |
| 1 | −1 | −i | 1 | −1 | −i | i | 1 | −1 | 1 | −i | 1 | i | i | i | 1 |
| 1 | −1 | −i | −1 | 1 | i | i | −i | 1 | 1 | −i | 1 | 1 | −i | i | i |
| 1 | −1 | −i | −1 | −1 | i | 1 | −1 | 1 | 1 | i | −1 | −1 | −i | −1 | −1 |
| 1 | −1 | −i | −1 | i | 1 | −1 | −1 | −1 | −1 | 1 | −1 | −i | 1 | 1 | −1 |
| 1 | −1 | −i | 1 | i | i | −1 | −1 | 1 | −1 | −1 | −1 | −i | 1 | −1 | i |
| 1 | −1 | −1 | 1 | i | i | −i | −1 | 1 | −1 | −i | −1 | −1 | i | −1 | i |
| 1 | −1 | −1 | 1 | i | 1 | −i | −1 | 1 | −i | 1 | −i | −1 | −i | −1 |
| 1 | −1 | −i | 1 | −i | −1 | 1 | −1 | −1 | −1 | i | 1 | i | −1 | −1 | −1 |
| 1 | −1 | −i | −1 | 1 | 1 | 1 | i | −1 | i | 1 | 1 | 1 | 1 | −i | −i |
| 1 | −1 | −i | −1 | −1 | −1 | 1 | 1 | −1 | i | 1 | −1 | 1 | −1 | −1 | −1 |
| 1 | −1 | −i | −1 | −1 | −i | −1 | 1 | 1 | i | −1 | −1 | i | 1 | −1 |
| 1 | −1 | −i | −1 | i | −1 | 1 | −1 | −1 | i | −1 | −i | −1 | 1 | 1 |
| 1 | −1 | −1 | −1 | −i | 1 | 1 | −1 | −1 | i | −1 | 1 | 1 | −1 | −1 |
| 1 | −1 | −1 | i | 1 | −i | 1 | 1 | 1 | 1 | 1 | i | i | i | −1 |
| 1 | −1 | −i | i | −1 | −i | 1 | 1 | 1 | −i | −i | −1 | i | −i | −1 |
| 1 | −1 | −i | i | i | −1 | i | 1 | −1 | −1 | −i | −i | −1 | i | −1 |
| 1 | −1 | −i | i | −i | 1 | −i | −1 | −1 | −i | −i | 1 | 1 | −i | 1 |
| 1 | −1 | −i | i | −i | −i | −1 | −1 | 1 | −i | i | i | i | i | −1 |
| 1 | −1 | −i | −i | 1 | i | i | 1 | 1 | i | −i | 1 | i | −1 | i |
| 1 | −1 | −i | −i | −1 | −1 | 1 | 1 | −1 | i | i | −1 | −1 | 1 | −1 |
| 1 | −1 | −i | −i | −i | −i | −1 | 1 | 1 | −i | i | −1 | i | −i | 1 |
| 1 | −1 | −i | −i | i | −i | 1 | −1 | −1 | i | i | 1 | 1 | −i | 1 |
| 1 | −1 | −i | −i | −1 | −i | 1 | −1 | 1 | −1 | i | 1 | −1 | 1 |
| 1 | i | 1 | 1 | 1 | −1 | −1 | −1 | 1 | −i | −1 | 1 | 1 | 1 | i | −1 |
| 1 | i | 1 | 1 | −1 | 1 | 1 | 1 | −i | −1 | 1 | −1 | −1 | −i | 1 |
| 1 | i | 1 | 1 | −1 | 1 | i | 1 | 1 | −1 | −1 | −1 | 1 | i | −1 | −i |
| 1 | i | 1 | 1 | i | −i | 1 | −i | −1 | i | 1 | −1 | −i | 1 | i |
| 1 | i | 1 | 1 | −i | i | i | −1 | −1 | i | −1 | 1 | i | i | −i | −1 |
| 1 | i | 1 | −1 | 1 | −i | −i | 1 | i | −1 | 1 | 1 | −i | i | i |
| 1 | i | 1 | −1 | −1 | −1 | −1 | 1 | −1 | −1 | −1 | −1 | 1 | 1 | i | −1 |
| 1 | i | 1 | −1 | i | i | −1 | i | 1 | 1 | 1 | −i | −1 | i | −i |
| 1 | i | 1 | −1 | −i | −1 | 1 | 1 | −1 | 1 | −1 | i | 1 | 1 | 1 |
| 1 | i | 1 | −1 | −i | −i | 1 | −i | −1 | i | 1 | 1 | i | −i | 1 | i |
| 1 | i | 1 | 1 | 1 | −1 | 1 | 1 | −i | 1 | −1 | 1 | 1 | −1 | −1 |
| 1 | i | 1 | 1 | −1 | 1 | 1 | 1 | −i | 1 | i | −i | −1 | −1 | 1 | 1 |
| 1 | −1 | −1 | i | −1 | −1 | −1 | 1 | −1 | i | −i | −1 | −1 | 1 | 1 |
| 1 | −1 | −i | i | i | 1 | −i | 1 | −1 | −1 | −i | −i | −i | 1 | −i | −1 |
| 1 | −1 | −i | i | i | i | −i | −i | −1 | 1 | −i | i | −i | −i | −i |
| 1 | −1 | −i | i | −i | −1 | i | −1 | −1 | −1 | i | i | i | 1 | i |
| 1 | −1 | −i | −i | 1 | 1 | −1 | 1 | 1 | −1 | i | i | 1 | 1 | −1 |
| 1 | −1 | −i | −i | 1 | −i | −1 | i | 1 | 1 | i | −i | 1 | 1 | 1 | i |
| 1 | −1 | −i | −1 | −1 | i | −i | 1 | 1 | −i | i | −1 | −1 | −i | −1 |
| 1 | −1 | −i | −i | 1 | 1 | 1 | −1 | 1 | 1 | −i | i | −1 | −1 | 1 |
| 1 | −1 | −i | −i | −i | 1 | 1 | −1 | −1 | 1 | i | i | −1 | i | −1 |
| 1 | i | 1 | 1 | 1 | 1 | i | −1 | 1 | −i | −1 | 1 | 1 | −1 | −i | −1 |
| 1 | i | 1 | 1 | 1 | −1 | −i | 1 | 1 | 1 | −1 | −1 | 1 | −i | 1 | −i |
| 1 | i | 1 | 1 | −1 | −1 | i | −1 | 1 | i | −1 | 1 | −1 | 1 | i | 1 |
| 1 | i | 1 | 1 | i | i | −1 | −i | −1 | i | 1 | −1 | −i | i | −1 | i |
| 1 | i | 1 | 1 | −i | −1 | 1 | −1 | −1 | −i | 1 | 1 | i | 1 | 1 | −1 |
| 1 | i | 1 | −1 | 1 | −1 | i | 1 | 1 | i | −1 | −1 | 1 | 1 | 1 | 1 |
| 1 | i | 1 | −1 | −1 | 1 | i | −1 | 1 | −1 | −1 | −1 | 1 | −i | −1 |
| 1 | i | 1 | −1 | −1 | i | −1 | −i | 1 | −1 | 1 | 1 | −1 | i | 1 | −1 |
| 1 | i | 1 | −1 | i | −i | 1 | i | −1 | i | 1 | 1 | −i | −i | 1 | −i |
| 1 | i | 1 | −1 | i | i | −1 | −i | 1 | 1 | 1 | i | i | −1 | i |
| 1 | i | 1 | i | 1 | −1 | −1 | 1 | 1 | i | 1 | −i | 1 | −1 | 1 | 1 |
| 1 | i | 1 | i | 1 | 1 | −1 | −i | 1 | 1 | 1 | −i | 1 | −1 | −i | −1 |
| 1 | i | 1 | i | −1 | 1 | 1 | −i | 1 | 1 | −i | i | 1 | −i | −1 |
| 1 | i | 1 | i | −1 | 1 | 1 | 1 | 1 | −i | −1 | 1 | i | −1 | −1 |
| 1 | i | 1 | i | i | −1 | −1 | 1 | 1 | i | i | 1 | 1 | 1 | −i |
| 1 | i | 1 | i | i | 1 | −1 | 1 | −1 | −1 | 1 | i | −1 | 1 | i |
| 1 | i | 1 | −i | 1 | −1 | 1 | 1 | 1 | −i | 1 | i | 1 | 1 | 1 | i |
| 1 | i | 1 | −i | −1 | 1 | 1 | −1 | 1 | i | 1 | i | −i | 1 | −1 |
| 1 | i | 1 | −i | −i | −1 | 1 | i | −1 | i | 1 | 1 | 1 | 1 | i |
| 1 | i | 1 | −i | −i | −1 | 1 | −1 | 1 | i | i | −i | 1 | −1 |
| 1 | i | −1 | 1 | 1 | −1 | i | −1 | −i | −1 | −1 | −1 | −1 | −1 | −i |
| 1 | i | −1 | 1 | −1 | i | 1 | 1 | 1 | 1 | −1 | −1 | i | −1 | −i | −i |
| 1 | i | −1 | 1 | i | i | −1 | −1 | i | 1 | 1 | −i | i | −i | −1 |
| 1 | i | −1 | 1 | −1 | 1 | −i | −1 | i | 1 | −1 | −1 | −1 | −i | −1 | −1 |
| 1 | i | −1 | −1 | 1 | −1 | i | 1 | 1 | −i | 1 | −1 | 1 | 1 | −i | 1 |
| 1 | i | −1 | −1 | −1 | 1 | −i | 1 | 1 | i | −1 | −1 | −1 | i | −1 |
| 1 | i | −1 | −1 | −1 | i | −i | 1 | i | 1 | 1 | −1 | i | i | −i |
| 1 | i | −1 | −1 | i | i | i | i | −1 | i | 1 | −1 | −i | i | −i | 1 |

TABLE 9-continued

| | | | | | | | | | | | | | | | |
|---|---|---|---|---|---|---|---|---|---|---|---|---|---|---|---|
| 1 | i | −1 | −1 | −i | i | 1 | −i | −1 | i | −1 | 1 | i | i | 1 | i |
| 1 | i | 1 | i | i | 1 | 1 | −i | −1 | −i | 1 | i | −i | −1 | 1 | −i |
| 1 | i | 1 | i | i | −1 | 1 | 1 | −1 | i | 1 | −i | −1 | −i | 1 | −1 |
| 1 | i | 1 | i | −i | 1 | −1 | −1 | i | 1 | −i | i | 1 | −1 | 1 |
| 1 | i | 1 | −i | 1 | 1 | −1 | 1 | i | 1 | i | 1 | −1 | −1 | −1 |
| 1 | i | 1 | −i | 1 | −i | i | −1 | 1 | i | −1 | i | 1 | −1 | −1 | 1 |
| 1 | i | 1 | −i | −1 | −1 | 1 | −1 | 1 | −i | 1 | i | −1 | 1 | 1 | 1 |
| 1 | i | 1 | −i | i | 1 | 1 | i | −1 | 1 | 1 | −i | −1 | i | 1 | 1 |
| 1 | i | 1 | −i | i | −i | 1 | −1 | 1 | i | 1 | i | −i | −1 | 1 | i |
| 1 | i | 1 | −i | −i | i | −1 | 1 | −i | i | 1 | i | i | i | −1 | −1 |
| 1 | i | −1 | 1 | 1 | 1 | 1 | i | 1 | 1 | −i | −1 | −1 | 1 | −i | 1 | −i |
| 1 | i | −1 | 1 | 1 | 1 | −i | i | i | 1 | 1 | −1 | 1 | 1 | −i | −1 |
| 1 | i | −1 | 1 | −1 | −1 | 1 | −1 | −1 | −1 | −i | −1 | 1 | −1 | −1 | 1 |
| 1 | i | −1 | 1 | 1 | 1 | −1 | −1 | −1 | −i | −1 | 1 | −i | −1 | −1 | 1 |
| 1 | i | −1 | 1 | i | −i | 1 | 1 | −1 | i | 1 | 1 | −i | −1 | −i | 1 |
| 1 | i | −1 | 1 | −i | i | 1 | 1 | −1 | 1 | −i | −1 | 1 | 1 | 1 | −i |
| 1 | i | −1 | −1 | 1 | 1 | 1 | −i | 1 | −i | 1 | 1 | 1 | −1 | 1 | 1 |
| 1 | i | −1 | −1 | 1 | −i | −i | i | 1 | 1 | 1 | 1 | 1 | −i | i | −i |
| 1 | i | −1 | −1 | −1 | 1 | 1 | −i | 1 | −i | 1 | −1 | −1 | 1 | −i | −1 |
| 1 | i | −1 | −1 | 1 | 1 | −1 | 1 | −i | 1 | −1 | −1 | −1 | −1 | 1 |
| 1 | i | −1 | i | 1 | 1 | 1 | −1 | 1 | −i | −1 | 1 | −1 | 1 | 1 | 1 |
| 1 | i | −1 | i | 1 | −i | 1 | −1 | 1 | 1 | −i | 1 | −i | −i | 1 |
| 1 | i | −1 | i | −1 | −1 | 1 | 1 | 1 | −i | 1 | 1 | −1 | 1 | −1 | −i |
| 1 | i | −1 | i | i | 1 | −1 | −i | −i | −1 | −1 | 1 | −1 | −1 | −i |
| 1 | i | −1 | i | i | −i | 1 | 1 | −i | −i | 1 | −1 | −i | −1 | −i | i |
| 1 | i | −1 | i | −i | −i | −1 | −1 | 1 | −1 | −i | 1 | −i | −1 | 1 |
| 1 | i | −1 | −i | 1 | 1 | 1 | −1 | 1 | −i | 1 | 1 | 1 | 1 | 1 |
| 1 | i | −1 | −i | −1 | 1 | −1 | 1 | 1 | −i | 1 | −1 | 1 | 1 | 1 | −1 |
| 1 | i | −1 | −i | −1 | i | 1 | 1 | 1 | i | 1 | −i | 1 | −i | −1 |
| 1 | i | −1 | −i | i | i | 1 | −1 | 1 | −1 | 1 | i | −i | i | −i | i |
| 1 | i | −1 | −i | −i | 1 | 1 | −i | −1 | −1 | 1 | 1 | 1 | 1 | −i |
| 1 | i | −1 | −i | −i | −1 | −1 | 1 | −1 | 1 | −i | i | −i | −1 | −1 |
| 1 | i | i | 1 | i | −i | 1 | −1 | 1 | −i | −i | 1 | 1 | 1 | −1 | 1 |
| 1 | i | i | 1 | −1 | 1 | −1 | 1 | 1 | −i | −i | −1 | −1 | −1 | 1 | 1 |
| 1 | i | i | 1 | −1 | i | 1 | 1 | 1 | i | 1 | −1 | i | −1 | −i |
| 1 | i | i | 1 | i | 1 | −1 | 1 | −1 | 1 | 1 | i | −1 | i | −1 | −i |
| 1 | i | i | 1 | −i | i | −i | 1 | −1 | i | 1 | i | i | i | −i | −i |
| 1 | i | i | −1 | 1 | −1 | 1 | 1 | 1 | −i | −i | 1 | 1 | 1 | −1 | 1 |
| 1 | i | i | −1 | −1 | 1 | 1 | −1 | 1 | −i | −1 | −1 | −1 | 1 | −1 |
| 1 | i | i | −1 | −1 | 1 | 1 | i | 1 | 1 | −i | 1 | 1 | −1 | 1 | 1 |
| 1 | i | i | −1 | i | i | −i | i | −1 | 1 | i | −i | i | −i | −i |
| 1 | i | i | −1 | −i | −i | −1 | −i | −1 | i | 1 | 1 | 1 | −i | −1 |
| 1 | i | i | i | −1 | 1 | 1 | −1 | −i | 1 | 1 | −1 | 1 | 1 |
| 1 | i | −1 | i | 1 | 1 | 1 | −i | 1 | 1 | −1 | 1 | i | i |
| 1 | i | i | −1 | i | 1 | −i | 1 | 1 | 1 | −i | 1 | i | −1 |
| 1 | i | i | i | i | i | −i | −1 | i | 1 | i | −i | i | −i | −i |
| 1 | −1 | i | 1 | −1 | 1 | 1 | 1 | −i | −1 | −i | 1 | 1 | 1 | −1 |
| 1 | −1 | i | −1 | 1 | 1 | 1 | 1 | −i | 1 | 1 | −1 | 1 | i | i |
| 1 | −1 | i | −1 | 1 | −i | 1 | 1 | 1 | 1 | −i | −1 | 1 | i | −1 |
| 1 | −1 | i | i | 1 | i | −i | −1 | 1 | 1 | −i | i | −i | −i |
| 1 | −1 | i | −i | −1 | −1 | −i | −1 | −i | −1 | i | i | 1 | −1 | −i |
| 1 | −1 | −i | 1 | 1 | 1 | 1 | −1 | 1 | 1 | i | 1 | −i | −i | −1 |
| 1 | −1 | −i | 1 | −1 | −1 | 1 | 1 | −i | −1 | i | −1 | 1 | −1 | 1 |
| 1 | −1 | −i | −1 | −1 | −1 | −1 | 1 | −i | −1 | i | −1 | 1 | −1 | 1 |
| 1 | −1 | −i | i | 1 | −i | −1 | −1 | −i | −1 | −i | −i | −1 | 1 | −i |
| 1 | −1 | −i | i | −1 | 1 | −i | −1 | 1 | i | −i | −1 | −i | −i |
| 1 | −1 | −i | −i | −1 | 1 | 1 | 1 | −1 | −i | 1 | i | 1 | 1 | −1 |
| 1 | i | i | 1 | 1 | 1 | −1 | −1 | 1 | −i | −i | 1 | 1 | −1 | 1 | −1 |
| 1 | i | i | 1 | 1 | −i | 1 | 1 | 1 | −i | −1 | 1 | −i | −1 | −1 |
| 1 | i | i | 1 | −1 | 1 | 1 | 1 | 1 | −1 | i | 1 | −1 | 1 | 1 | 1 |
| 1 | i | i | 1 | i | −i | 1 | −1 | i | 1 | −1 | 1 | 1 | i | 1 | −1 |
| 1 | i | i | 1 | i | −i | 1 | −i | −1 | 1 | −1 | −i | −i | i | −1 |
| 1 | i | i | −1 | 1 | 1 | −1 | 1 | 1 | −i | −i | −1 | 1 | −1 | 1 | 1 |
| 1 | i | i | −1 | 1 | −i | 1 | −i | 1 | 1 | −i | 1 | −i | −1 | i |
| 1 | i | i | −1 | −1 | 1 | 1 | 1 | 1 | −1 | −i | 1 | −1 | 1 | −1 | 1 |
| 1 | i | i | −1 | i | 1 | −1 | −1 | −1 | i | −1 | −1 | −i | −1 | −1 |
| 1 | i | i | −1 | i | −i | −1 | −1 | i | −1 | −i | −i | −i | −1 | −1 |
| 1 | i | i | i | 1 | 1 | 1 | −1 | 1 | 1 | −1 | 1 | −1 | 1 |
| 1 | i | i | −i | 1 | 1 | −1 | 1 | 1 | −1 | −1 | −1 | 1 |
| 1 | i | i | i | −1 | −1 | i | 1 | 1 | −i | i | −i | −1 | 1 | −i |
| 1 | i | i | i | i | 1 | −i | −1 | 1 | i | −i | −1 | i | −i |
| 1 | i | i | −i | 1 | −i | −i | −1 | i | 1 | −i | −1 | i | −1 |
| 1 | i | i | −i | 1 | −i | −i | 1 | 1 | i | −i | −1 | i | 1 |
| 1 | i | i | −i | −i | 1 | −i | −1 | −1 | −i | 1 | −i | −i | −i | −i |
| 1 | i | i | −i | −i | −1 | 1 | 1 | 1 | i | −i | 1 | i | 1 |
| 1 | i | i | −i | −i | i | −i | 1 | −i | i | 1 | i | −i | −1 |
| 1 | i | −i | 1 | 1 | 1 | i | i | 1 | −i | −i | −1 | 1 | −1 | i | −i |
| 1 | 1 | −1 | 1 | 1 | −i | −1 | i | 1 | 1 | 1 | −1 | −1 | −1 | 1 | −1 |

TABLE 9-continued

| | | | | | | | | | | | | | | |
|---|---|---|---|---|---|---|---|---|---|---|---|---|---|---|
| 1 | i | i | i | 1 | -1 | 1 | -i | 1 | -i | -i | i | 1 | 1 | -1 | -i |
| 1 | i | i | i | 1 | -1 | 1 | -1 | 1 | 1 | -i | -1 | i | -1 | -1 | 1 | 1 |
| 1 | i | i | i | -1 | i | -1 | 1 | 1 | i | -i | -i | -1 | i | 1 | -1 |
| 1 | i | i | i | i | i | 1 | -i | -1 | i | -i | i | -i | i | -1 | -i |
| 1 | i | i | i | -i | -1 | i | -i | -1 | -i | i | i | i | 1 | -1 | -i |
| 1 | i | i | i | -i | -i | -1 | i | -1 | i | -i | i | i | -i | 1 | i |
| 1 | i | i | -i | 1 | -1 | 1 | i | 1 | -i | -i | -i | 1 | 1 | -1 | i |
| 1 | i | i | -i | -1 | -1 | 1 | -i | 1 | i | -i | -i | -1 | -1 | 1 | -i |
| 1 | i | i | -i | -1 | -1 | 1 | 1 | 1 | i | -i | i | -1 | 1 | -1 | -1 |
| 1 | i | i | -i | i | i | -i | -1 | -1 | i | i | i | -i | i | -i | 1 |
| 1 | i | i | -i | -i | -1 | -i | -i | -1 | i | -i | i | 1 | -i | -i |
| 1 | i | i | -i | -i | -i | 1 | -1 | 1 | i | i | i | -i | i | -1 |
| 1 | i | -i | 1 | 1 | -1 | i | -i | 1 | -i | -i | -1 | 1 | 1 | i | i |
| 1 | i | -i | 1 | -1 | -1 | -1 | 1 | 1 | -i | i | 1 | -1 | 1 | 1 | 1 |
| 1 | i | -i | 1 | -1 | i | 1 | -i | 1 | i | i | -1 | -1 | i | -1 | i |
| 1 | i | -i | 1 | i | i | i | -i | 1 | i | -1 | -1 | -i | i | i | i |
| 1 | i | -i | 1 | -1 | -1 | -i | i | 1 | -i | -1 | 1 | 1 | 1 | -i | -1 |
| 1 | i | -i | 1 | -i | -i | -i | 1 | 1 | i | i | -1 | -i | -i | -i |
| 1 | i | -i | -1 | 1 | -i | i | 1 | 1 | -i | -i | 1 | 1 | 1 | i | -i |
| 1 | i | -i | -1 | 1 | 1 | -1 | 1 | 1 | i | i | -1 | -1 | -1 | -1 | -i |
| 1 | i | -i | -1 | i | i | 1 | 1 | 1 | i | -1 | 1 | -1 | i | i | -i |
| 1 | i | -i | -i | i | i | i | -1 | 1 | -1 | 1 | 1 | -i | i | i | -i |
| 1 | i | -i | i | 1 | 1 | 1 | -i | 1 | -i | i | 1 | -1 | -1 | -i |
| 1 | i | -i | i | 1 | -i | -1 | 1 | 1 | -i | i | -i | -1 | -1 | 1 | 1 |
| 1 | i | -i | i | -1 | -1 | -i | 1 | 1 | -i | -i | -i | 1 | 1 | -1 |
| 1 | i | -i | i | i | -i | 1 | -1 | 1 | -i | 1 | -i | -i | -i | -1 |
| 1 | i | -i | i | -i | -i | 1 | -1 | 1 | -i | i | i | -i | i | -1 |
| 1 | i | -i | -i | 1 | -1 | i | 1 | 1 | -i | i | 1 | 1 | 1 | -1 |
| 1 | i | -i | -i | -1 | -1 | -i | 1 | 1 | i | -1 | -1 | 1 | 1 | -i |
| 1 | i | -i | -i | i | 1 | -i | 1 | 1 | -1 | -i | -i | -1 | -i | i |
| 1 | i | -i | -i | -i | 1 | i | -1 | 1 | -i | -i | i | -i | -1 | 1 |
| 1 | i | -i | -i | -i | i | 1 | -1 | 1 | -i | i | i | 1 | i | -1 |
| 1 | -i | 1 | 1 | 1 | 1 | -i | -1 | 1 | i | -1 | 1 | 1 | -1 | i | -1 |
| 1 | -i | 1 | 1 | 1 | i | -i | i | 1 | -i | -1 | 1 | i | i | -i |
| 1 | -i | 1 | 1 | -1 | -i | -i | i | 1 | -i | -1 | -1 | -i | 1 | -i |
| 1 | -i | 1 | 1 | i | -i | -1 | i | 1 | -1 | 1 | -i | -i | -1 | i |
| 1 | -i | 1 | i | 1 | -i | -1 | -1 | 1 | -i | 1 | -i | -1 | -i | -1 |
| 1 | -i | 1 | i | -1 | -i | -1 | -1 | 1 | -i | -1 | -1 | -i | -i | i |
| 1 | -i | 1 | -i | 1 | 1 | -1 | -1 | 1 | -i | -1 | 1 | 1 | i | -1 |
| 1 | -i | 1 | -1 | 1 | 1 | 1 | -1 | 1 | -i | i | 1 | 1 | 1 | -i |
| 1 | -i | 1 | -1 | 1 | -i | 1 | 1 | 1 | i | 1 | 1 | -i | -1 | -i |
| 1 | -i | 1 | -1 | -1 | -1 | -1 | 1 | 1 | i | -1 | -1 | 1 | 1 | -1 |
| 1 | -i | 1 | -1 | 1 | 1 | -i | -1 | 1 | -i | -1 | -1 | -i | -1 | -i |
| 1 | -i | 1 | -1 | 1 | i | -i | -1 | 1 | -1 | -1 | -1 | 1 | i | 1 |
| 1 | -i | 1 | -1 | -1 | -1 | -1 | 1 | 1 | -1 | -1 | -1 | 1 | -1 | -i | -i |
| 1 | -i | 1 | -i | 1 | 1 | i | 1 | 1 | i | -1 | -1 | -i | i | i | 1 |
| 1 | -i | 1 | i | 1 | 1 | -1 | 1 | 1 | -i | -i | 1 | 1 | -1 | -1 | -1 |
| 1 | -i | 1 | i | i | i | 1 | 1 | 1 | -i | 1 | i | i | -i | -1 |
| 1 | -i | 1 | i | 1 | -i | i | 1 | 1 | -1 | -1 | -1 | -i | -i | -i |
| 1 | -i | 1 | i | -1 | i | 1 | 1 | 1 | -1 | -1 | -i | -i | -i | -i |
| 1 | -i | 1 | -i | 1 | -1 | i | -1 | 1 | -i | 1 | 1 | -1 | i |
| 1 | -i | 1 | -i | -i | -i | -1 | -1 | 1 | -i | -i | -i | i | -i |
| 1 | -i | 1 | -i | 1 | -1 | -1 | -1 | 1 | -1 | 1 | 1 | 1 | -i | -i |
| 1 | -i | 1 | -i | -1 | 1 | -1 | 1 | 1 | -1 | -1 | -1 | i | -i |
| 1 | -i | 1 | -i | i | -i | 1 | i | 1 | -i | 1 | 1 | 1 | -1 |

TABLE 9-continued

| | | | | | | | | | | | | | | |
|---|---|---|---|---|---|---|---|---|---|---|---|---|---|---|
| 1 | -i | -1 | 1 | 1 | 1 | 1 | -i | 1 | i | -1 | 1 | -1 | -1 | 1 | i |
| 1 | -i | -1 | 1 | 1 | 1 | 1 | i | 1 | -i | 1 | 1 | i | i | -i | -i |
| 1 | -i | -1 | 1 | -1 | -1 | -1 | i | 1 | 1 | -1 | -1 | 1 | 1 | -1 | -i |
| 1 | -i | -1 | 1 | -1 | -i | -i | -i | 1 | 1 | 1 | -1 | -i | -i | i | i |
| 1 | -i | -1 | 1 | i | -i | 1 | -i | -1 | -i | 1 | -i | -i | -1 | 1 | i |
| 1 | -i | -1 | 1 | -i | -i | 1 | i | -1 | -i | -1 | i | i | -i | 1 | -i |
| 1 | -i | -1 | -1 | 1 | -1 | -i | 1 | 1 | i | 1 | 1 | 1 | 1 | i | 1 |
| 1 | -i | 1 | 1 | -i | -i | i | -1 | -1 | -i | -1 | 1 | 1 | -i | -i | -1 |
| 1 | -i | 1 | -1 | 1 | 1 | i | i | 1 | -i | -1 | 1 | 1 | 1 | -i | -i |
| 1 | -i | 1 | -1 | -1 | 1 | -i | -1 | 1 | i | -1 | -1 | -1 | -1 | i | -1 |
| 1 | -i | 1 | -1 | -1 | -i | -i | -i | 1 | -i | -1 | 1 | -1 | -i | i | i |
| 1 | -i | 1 | -1 | i | -i | -1 | i | -1 | -i | 1 | 1 | -i | -1 | -1 | -i |
| 1 | -i | 1 | -1 | -i | -1 | -i | -1 | i | 1 | 1 | 1 | -i | -1 | 1 | i |
| 1 | -i | 1 | 1 | 1 | -1 | -1 | 1 | i | 1 | 1 | -i | 1 | 1 | -1 | 1 |
| 1 | -i | 1 | i | -1 | 1 | 1 | 1 | 1 | i | 1 | -i | -1 | -1 | 1 | -1 |
| 1 | -i | 1 | i | -1 | 1 | i | 1 | 1 | 1 | -1 | i | -1 | 1 | -i | 1 |
| 1 | -i | 1 | i | -1 | 1 | -i | -1 | i | 1 | 1 | i | 1 | 1 | 1 | -i |
| 1 | -i | 1 | i | i | 1 | -1 | 1 | -1 | -i | -1 | 1 | -1 | 1 | i | i |
| 1 | -i | 1 | i | -i | 1 | -1 | i | -1 | i | 1 | i | -1 | -1 | -1 | i |
| 1 | -i | 1 | -i | 1 | 1 | -i | i | 1 | 1 | -1 | -i | 1 | -1 | i | i |
| 1 | -i | 1 | -i | 1 | i | 1 | 1 | i | -1 | -1 | 1 | 1 | i | i | -1 |
| 1 | -i | 1 | -i | -1 | 1 | 1 | 1 | i | 1 | 1 | -1 | 1 | 1 | i | -1 |
| 1 | -i | 1 | -i | 1 | 1 | -i | -1 | -1 | -i | -1 | -1 | -1 | i | 1 | -i |
| 1 | -i | 1 | -i | -i | 1 | 1 | -i | -1 | i | -1 | i | -1 | 1 | 1 | i |
| 1 | -i | 1 | -i | -i | 1 | 1 | -1 | i | 1 | -i | i | -1 | 1 | 1 | i |
| 1 | -i | 1 | -i | -i | -i | -1 | 1 | -1 | i | 1 | i | i | -1 | -1 | -1 |
| 1 | -i | -1 | 1 | 1 | -1 | 1 | i | 1 | i | -1 | 1 | 1 | 1 | 1 | -i |
| 1 | -i | -1 | 1 | -1 | 1 | -1 | -i | 1 | i | -1 | -1 | -1 | -1 | -1 | i |
| 1 | -i | -1 | 1 | -i | -i | i | i | 1 | 1 | -1 | -1 | -1 | -i | -i |
| 1 | -i | -1 | 1 | 1 | i | -1 | -i | 1 | -1 | -i | -1 | -1 | i | i |
| 1 | -i | -1 | 1 | -i | 1 | -1 | -1 | 1 | -1 | 1 | i | -1 | -1 | -1 |
| 1 | -i | -1 | -1 | 1 | 1 | 1 | i | 1 | i | -1 | 1 | 1 | -1 | 1 | -i |
| 1 | -i | -1 | -1 | 1 | i | -i | i | 1 | -i | i | 1 | 1 | 1 | i | -i |
| 1 | -i | -1 | -1 | i | 1 | -1 | i | 1 | 1 | -1 | -1 | 1 | -i | -i | -1 |
| 1 | -i | -1 | -1 | -1 | -i | -i | i | 1 | -i | 1 | -1 | -1 | -i | i | -i |
| 1 | -i | -1 | -1 | 1 | 1 | 1 | -1 | -1 | -i | 1 | -1 | 1 | 1 | -i | -1 |
| 1 | -i | -1 | -1 | -1 | 1 | -1 | -1 | -i | 1 | -1 | 1 | 1 | 1 | -1 |
| 1 | -i | -1 | i | 1 | 1 | 1 | -1 | 1 | 1 | 1 | i | -1 | -1 | -i | -i |
| 1 | -i | -1 | i | -1 | 1 | i | 1 | 1 | -1 | -i | 1 | -1 | -1 | -1 | -1 |
| 1 | -i | -1 | i | -1 | -1 | -i | 1 | 1 | -i | 1 | -1 | -1 | -1 | i | -1 |
| 1 | -i | -1 | i | i | i | i | -1 | -i | 1 | i | -i | 1 | -i | i |
| 1 | -i | -1 | i | -i | 1 | -1 | -i | -1 | i | 1 | i | -1 | 1 | -i |
| 1 | -i | -1 | i | -i | -1 | -1 | -i | -1 | i | 1 | i | -1 | 1 | 1 |
| 1 | -i | -1 | -i | 1 | -1 | 1 | 1 | 1 | -1 | i | 1 | 1 | 1 | -1 |
| 1 | -i | -1 | -i | -1 | -1 | 1 | 1 | 1 | -1 | i | -1 | 1 | -1 | -1 |
| 1 | -i | -1 | -i | i | 1 | -1 | -1 | -i | -i | 1 | i | -1 | -1 |
| 1 | -i | -1 | -i | -1 | 1 | -1 | -1 | i | -i | 1 | -1 | -1 | -1 |
| 1 | -i | -1 | -i | -i | -1 | 1 | -1 | -i | -1 | i | i | 1 | -1 | -1 |
| 1 | -i | i | 1 | 1 | 1 | 1 | -1 | 1 | i | -1 | 1 | 1 | -1 | -1 | -1 |
| 1 | -i | i | 1 | 1 | i | 1 | i | 1 | -1 | -1 | 1 | 1 | -1 | -i |
| 1 | -i | i | 1 | -1 | -1 | i | i | 1 | 1 | -1 | -1 | 1 | i | -i |
| 1 | -i | i | 1 | i | -1 | i | -1 | -1 | i | 1 | -i | 1 | i | -1 |
| 1 | -i | i | 1 | i | -i | 1 | -1 | -1 | -i | 1 | -i | -1 | -1 | -1 |
| 1 | -i | i | 1 | -i | i | i | i | -1 | -i | i | -1 | i | i | i | -i |
| 1 | -i | i | -1 | 1 | 1 | -1 | 1 | 1 | 1 | 1 | 1 | -1 | -i | -i |
| 1 | -i | i | -1 | 1 | 1 | i | -1 | 1 | -i | 1 | 1 | 1 | -1 | -1 |
| 1 | -i | i | -1 | -1 | -1 | -1 | 1 | 1 | -i | -1 | -1 | 1 | 1 | -1 |
| 1 | -i | i | -1 | i | -1 | i | 1 | -1 | -i | -1 | 1 | 1 | 1 | -1 |
| 1 | -i | i | -1 | i | 1 | 1 | -1 | -i | -i | -1 | -i | -i | -1 | 1 |
| 1 | -i | i | -1 | -i | i | i | -1 | i | 1 | 1 | i | 1 | 1 | i |
| 1 | -i | i | -i | 1 | 1 | 1 | -1 | 1 | -1 | 1 | 1 | i | -1 | -1 | -1 |
| 1 | -i | i | i | 1 | 1 | 1 | -i | -1 | i | 1 | 1 | i | 1 | -i |
| 1 | -i | i | i | -1 | -1 | 1 | i | 1 | -i | 1 | -1 | -1 | -i | 1 | i |
| 1 | -i | i | i | i | 1 | 1 | i | -1 | -i | 1 | -1 | -1 | -1 | -i | -i |
| 1 | -i | i | i | -i | -1 | i | 1 | -1 | -i | -1 | i | -1 | 1 | -1 | i |
| 1 | -i | i | -i | 1 | -1 | 1 | i | 1 | -i | -1 | 1 | -1 | i | -1 | 1 |
| 1 | -i | i | -i | -1 | 1 | i | 1 | 1 | -i | -i | -1 | -1 | -i | -1 | -i |
| 1 | -i | i | 1 | i | i | 1 | -i | -1 | -i | i | -1 | -i | i | i | i |

TABLE 9-continued

| | | | | | | | | | | | | | | | |
|---|---|---|---|---|---|---|---|---|---|---|---|---|---|---|---|
| 1 | -i | i | 1 | -i | 1 | i | -1 | -1 | i | i | 1 | i | -1 | i | -1 |
| 1 | -i | i | 1 | -i | -i | -1 | -1 | -1 | -i | -i | 1 | i | -i | i | -1 |
| 1 | -i | i | -1 | 1 | -1 | -i | -1 | 1 | i | 1 | 1 | 1 | 1 | -i | 1 |
| 1 | -i | i | -1 | -1 | 1 | 1 | -1 | 1 | i | -1 | -1 | -1 | -1 | -1 | -1 |
| 1 | -i | i | -1 | -1 | -1 | 1 | -i | 1 | -i | -i | 1 | -1 | -i | -1 | i |
| 1 | -i | i | -1 | i | i | 1 | -1 | -1 | -1 | -i | -1 | -i | i | -1 | -1 |
| 1 | -i | i | -1 | -i | 1 | -i | -1 | -1 | i | i | -1 | i | -1 | -i | -1 |
| 1 | -i | i | -1 | -1 | -i | -i | -1 | -1 | -i | i | 1 | 1 | -i | -1 | i |
| 1 | -i | i | i | 1 | -1 | -1 | -1 | 1 | i | -i | i | 1 | 1 | 1 | -1 |
| 1 | -i | i | i | 1 | i | -1 | 1 | 1 | -i | -i | 1 | i | 1 | 1 | -1 |
| 1 | -i | i | i | -1 | 1 | i | 1 | i | i | -i | -1 | -1 | i | -1 | -1 |
| 1 | -i | i | i | i | -1 | -i | i | -1 | i | i | -i | 1 | -i | i | i |
| 1 | -i | i | i | -i | -i | 1 | -1 | -i | i | -i | -i | -i | -i | -i | -1 |
| 1 | -i | i | i | -i | -i | -1 | -i | -1 | -i | i | i | -i | 1 | i | -i |
| 1 | -i | i | -i | 1 | -1 | -i | 1 | 1 | i | i | 1 | 1 | 1 | -i | -1 |
| 1 | -i | i | -i | -1 | 1 | i | -1 | 1 | 1 | i | i | i | -1 | i | 1 |
| 1 | -i | i | -i | -1 | -i | -1 | -1 | 1 | -i | -i | i | -1 | -i | 1 | 1 |
| 1 | -i | i | -i | i | i | -1 | -1 | -i | i | i | -i | 1 | i | i | 1 |
| 1 | -i | i | -i | -i | i | i | 1 | -1 | -i | i | i | i | i | i | -1 |
| 1 | -i | -i | 1 | 1 | 1 | i | -i | 1 | i | -i | -1 | 1 | -1 | i | i |
| 1 | -i | -i | 1 | 1 | i | 1 | i | -1 | i | i | -1 | 1 | 1 | i | -i |
| 1 | -i | -i | 1 | -1 | -1 | 1 | 1 | 1 | i | i | 1 | -1 | 1 | -1 | 1 |
| 1 | -i | -i | 1 | i | -1 | i | 1 | -i | 1 | -i | 1 | -1 | 1 | i | 1 |
| 1 | -i | -i | 1 | i | -i | -1 | -1 | -i | i | 1 | -i | -i | 1 | i | -1 |
| 1 | -i | -i | 1 | -i | i | -i | i | -1 | -i | -1 | i | i | -i | i | -i |
| 1 | -i | -i | -1 | 1 | 1 | i | i | 1 | -i | 1 | 1 | i | 1 | -1 | -i |
| 1 | -i | -i | -1 | 1 | 1 | 1 | 1 | i | -i | 1 | 1 | 1 | i | -1 | -i |
| 1 | -i | -i | -1 | -1 | -1 | 1 | -1 | 1 | i | -1 | -1 | 1 | -1 | i | 1 |
| 1 | -i | -i | -1 | i | -1 | i | -1 | 1 | -i | -1 | -i | 1 | i | 1 | -1 |
| 1 | -i | -i | -1 | i | i | -i | i | -1 | 1 | -i | i | -i | -i | -i |
| 1 | -i | -i | -1 | -i | 1 | i | -1 | 1 | -i | -1 | 1 | -1 | i | i | -1 |
| 1 | -i | i | -1 | -i | -i | -1 | 1 | 1 | -i | -1 | -i | -1 | i | -1 |
| 1 | -i | i | i | i | -1 | 1 | 1 | -i | -i | 1 | -i | i | 1 | -1 |
| 1 | -i | i | i | -i | 1 | -i | 1 | i | i | 1 | -1 | -1 | i |
| 1 | -i | i | -i | 1 | -i | i | -1 | i | i | i | -1 | -1 | i |
| 1 | -i | i | -i | 1 | 1 | 1 | i | i | -1 | -1 | 1 | -1 | i |
| 1 | -i | i | -i | 1 | i | -1 | -1 | 1 | -i | -i | 1 | 1 | 1 |
| 1 | -i | i | -i | -1 | -1 | i | 1 | 1 | i | -1 | 1 | i | -1 |
| 1 | -i | i | -i | -1 | -i | -i | i | 1 | -i | i | -1 | i | -i |
| 1 | -i | i | -i | -i | -1 | -i | -i | -1 | i | -i | -1 | -i | -i |
| 1 | -i | i | -i | -i | 1 | -1 | -i | 1 | -i | 1 | -1 | -i | -1 |
| 1 | -i | -i | 1 | 1 | -1 | i | i | 1 | i | -1 | 1 | 1 | i | -i |
| 1 | -i | -i | 1 | -1 | 1 | -i | -i | 1 | i | -1 | -1 | -1 | -i | i |
| 1 | -i | -i | 1 | -1 | -i | 1 | -i | 1 | i | -1 | -1 | -i | -1 | i |
| 1 | -i | -i | 1 | i | i | -1 | 1 | -1 | -i | i | 1 | -i | i | 1 | 1 |
| 1 | -i | -i | 1 | -i | 1 | 1 | 1 | -1 | i | -i | 1 | -1 | i | -1 | 1 |
| 1 | -i | -i | 1 | -i | -i | i | 1 | -i | -i | -1 | i | -1 | i | i | -i |
| 1 | -i | -i | -1 | 1 | -1 | 1 | 1 | i | i | -1 | 1 | 1 | -1 | 1 |
| 1 | -i | -i | -1 | -1 | 1 | -1 | -1 | 1 | i | -1 | -1 | -1 | i | -1 |
| 1 | -i | -i | -1 | -1 | -1 | 1 | i | 1 | -i | 1 | -i | -1 | -i | -i |
| 1 | -i | -i | -1 | i | i | -1 | -1 | -1 | -i | i | 1 | -1 | 1 | -i | i | -1 |
| 1 | -i | -i | -1 | -i | 1 | i | -1 | -i | i | -1 | 1 | -1 |
| 1 | -i | -i | -1 | -i | -i | i | -1 | -1 | 1 | 1 | i | -1 | i |
| 1 | -i | -i | -1 | -i | -i | i | -1 | -1 | -1 | 1 | 1 | -1 | i | i |
| 1 | -i | -i | i | 1 | -1 | 1 | -i | 1 | i | 1 | 1 | -1 | -i |
| 1 | -i | -i | i | -1 | 1 | i | 1 | i | i | -1 | -1 | 1 | i |
| 1 | -i | -i | i | -1 | -1 | 1 | i | i | -1 | 1 | i | -1 | i | i |
| 1 | -i | -i | i | -1 | -i | -1 | -i | 1 | i | 1 | i | -1 | -1 | i | -i |
| 1 | -i | -i | i | -i | -1 | -1 | 1 | 1 | i | i | -1 | i | -1 | i | -1 |
| 1 | -i | -i | i | -i | 1 | 1 | -1 | -i | i | -1 | 1 | -i | -1 | i |
| 1 | -i | -i | -i | 1 | i | -1 | -i | 1 | -i | -i | i | 1 | -i |
| 1 | -i | -i | -i | i | i | -1 | -i | -i | i | -i | -i | i | 1 |
| 1 | -i | -i | -i | i | -i | 1 | -1 | -i | i | -i | -i | 1 | i | -i | -1 |
| 1 | -i | -i | -i | i | 1 | -1 | -i | -1 | 1 | i | 1 | i | -1 |
| 1 | -i | -i | -i | -1 | -1 | 1 | -1 | -1 | -1 | 1 | i | -i | -1 | -1 |
| 1 | -i | -i | -i | 1 | -1 | i | -i | 1 | 1 | -i | i | 1 | i | -1 |
| 1 | -i | -i | -i | -1 | -1 | 1 | -i | 1 | i | i | -i | -1 | 1 | -1 | -i |
| 1 | -i | -i | -i | i | -1 | i | -i | -1 | i | -i | -i | -i | 1 | i | -i |

TABLE 9-continued

| | | | | | | | | | | | | | | |
|---|---|---|---|---|---|---|---|---|---|---|---|---|---|---|
| 1 | -i | -i | -i | 1 | -i | -1 | i | -1 | -i | i | -i | -i | -i | 1 | i |
| 1 | -i | -i | -i | -i | 1 | -i | i | -1 | i | -i | -i | i | -1 | -i | i |
| 1 | -i | -i | -i | -i | -i | i | 1 | -1 | -i | -i | i | i | -i | i | -1 |

5440 sequences other than 704 baseline sequences shown in Table 9 among a total of 6144 phase rotation factor sequences may be induced using methods to be described below. Hereinafter, an example of inducing the remaining sequences from a baseline sequence will be described. In Mathematical Expression 16 to Mathematical Expression 18 below, $\gamma_{k,l}$ refers to a baseline sequence and k and l are a row and an order of a corresponding baseline sequence in Table 9 (1≤k≤352, l={1,2}). For example, k=3 and l=2 refer to a baseline sequence indicated a right column of a third row. $\chi_{k,l}$ refers to a sequence inducted according to Mathematical Expression 16 to Mathematical Expression 18 below from a baseline sequence.

According to a first embodiment, the case in which a baseline sequencer is multiplied with a predetermined constant α may be considered according to Mathematical Expression 16 below.

$$\chi_{k,l} = \alpha \gamma_{k,l} \quad \text{[Mathematical Expression 16]}$$

In Mathematical Expression 16 above, α may be {1, -1, i, -i}.

As a second embodiment, a baseline sequence may be cyclic-shifted to generate a sequence according to Mathematical Expression 17 below.

$$\chi_{k,l} = \gamma_{k,l}^{(m)} \quad \text{[Mathematical Expression 17]}$$

In Mathematical Expression 17 above, m may refer to a cyclic shifting value.

Lastly, baseline sequences may be arranged at an opposite order to generate a sequence according to Mathematical Expression 18 below.

$$\chi_{k,l} = \text{rev}(\gamma_{k,l}) \quad \text{[Mathematical Expression 18]}$$

In Mathematical Expression 18 above, calculation rev(•) may refer to calculation for arranging specific sequences at an opposite order and, for example, rev([1 2 3])=[3 2 1] may be satisfied.

Two or more embodiments among embodiments proposed according to Mathematical Expression 16 to Mathematical Expression 18 above may be simultaneously applied to generate a new sequence.

Figure 18:
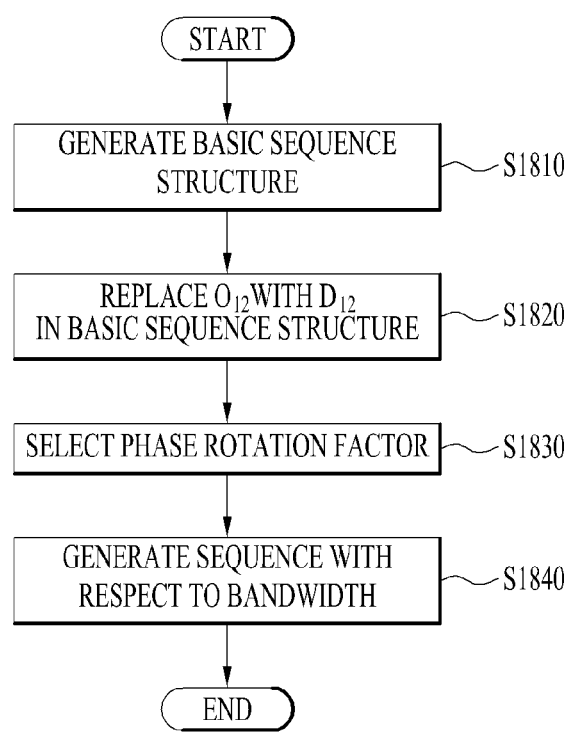
FIGS. 18 and 19 are flowcharts showing a method of generating a sequence according to a proposed exemplary embodiment of the present invention.

FIG. 18 is a flowchart illustrating a method of generating a sequence according to an exemplary embodiment of the present invention. FIG. 18 is a diagram illustrating time-series operations according to the aforementioned exemplary embodiments. Accordingly, although not clearly illustrated or described in FIG. 18, it may be easily seen that the aforementioned proposals may be applied in the same or similar way. FIG. 18 illustrates an exemplary embodiment in terms of an operation of an AP but a UE may also generate a sequence according to the same embodiment.

First, the AP may generate a basic sequence structure (S1810). The basic sequence structure may refer to a series of values that are repeatedly used to generate a sequence for bandwidths of 20, 40, and 80 MHz. For example, the basic sequence structure may refer to 244 tones obtained by removing headmost component $0_5$ and a backmost component $0_7$ among the aforementioned sequence of a band of 20 MHz in Mathematical Expression 2 above ($C_{52}0_{12}C_{52}0_{12}C_{52}0_{12}C_{52}$).

When a basic sequence structure is generated, an AP may replace $0_{12}$ with $D_{12}$ in the basic sequence structure (S1820). $D_{12}$ may be defined according to Mathematical Expression 5 and, differently from Mathematical Expression 5 above, $D_{12}$ may be defined in the form of repeatedly arranging values that are not 0 at an interval of 2 tones. For convenience of description, a structure of applying $D_{12}$ to a basic sequence structure is referred to as a replaced sequence structure or a $D_{12}$ sequence structure.

Then, the AP may select a phase rotation factor to be used to generate a sequence (S1830). According to each bandwidth, a plurality of optimal or suboptimal phase rotation factors may be predetermined in terms of PAPR and a UE may select any one of a plurality of phase rotation factors. The phase rotation factor may include different numbers of components for respective bandwidths.

The AP may lastly generate a sequence for a corresponding bandwidth using a $D_{12}$ sequence structure and a phase rotation factor (S1840). This procedure may be performed via a procedure of applying a phase rotation factor in a unit of $\{C_{12}D_{12}\}$ or $\{C_{12}\}$ as described above. That is, with respect to a bandwidth of 20 MHz, a sequence may be generated through a procedure of applying a phase rotation factor according to Mathematical Expression 8 above.

Although a bandwidth of 20 MHz has been exemplified, operations S1830 and S1840 may be differently performed on bandwidths of 40 and 80 MHz. As described with reference to Mathematical Expression 9 and Mathematical Expression 10 above, a sequence may be defined in the form of repeatedly arranging parts (headmost components $0_5$ and backmost components $0_7$ are removed) of a sequence of 20 MHz with respect to a bandwidth of 40 MHz and a sequence may be defined in the form of repeatedly arranging parts (headmost components $0_5$ and backmost components $0_7$ are removed) of a sequence of 40 MHz with respect to a bandwidth of 80 MHz.

In this case, the phase rotation factor may include two components of bandwidths of 40 and 80 MHz and the UE may select any one from a plurality of predetermined sequences.

On the other hand, a phase rotation factor may also be determined in a unit of $\{C_{12}D_{12}\}$ or $\{C_{12}\}$ with respect to a bandwidth of 40 and 80 MHz as described with regard to Mathematical Expressions 11, 12, 13, and 14 above. In this case, the phase rotation factor may be defined as 8 or 16 components and an AP may select any one of a plurality of predetermined phase rotation factors to generate a sequence.

According to another exemplary embodiment of the present invention, a sequence derived from a baseline sequence may be used as a phase rotation factor according to the exemplary embodiment described with regard to Mathematical Expression 166 to Mathematical Expression 18 above.

When the sequence is generated according to the proposed exemplary embodiment, the AP may transmit the corresponding sequence to a UE. That is, the generated sequence may be inserted into a preamble part of a frame and transmitted and used for synchronization between the UE and the AP, channel measurement, AGC, and so on.

Needless to say, the exemplary embodiments described with reference to FIG. 18 may also be applied to a UE in the same or similar way.

4. Proposed Method 2 of Generating Sequence

Hereinafter, an exemplary embodiment of using a conventional sequence that is defined for each frequency bandwidth instead of defining a new sequence like in the exemplary embodiment described with reference to FIG. 18 will be described.

First, a parameter to be used in the proposed exemplary embodiment is defined. $0_X$ refers to a vector with x tones that are all 0. $C_{48}$ refers to a vector including 48 tones and is defined as a total of 48 tones obtained by excluding first two 0, last two 0, and intermediate five tones of seven consecutive tones positioned in a central portion among a sequence $HTS_{-28, 28}$ (57 tones) defined in an HTS system. $C_{48}$ may contain a total of non-zero coefficients that are not 0 and may be represented according to Mathematical Expression 20 below.

$$C_{48} = \sqrt{1/2}\{0,0,c1,0,0,0,c2,0,\ldots,0,0,c6,0,0,c7,0,0,\ldots 0,c12,0,0\}$$ [Mathematical Expression 20]

When $0_X$ and $C_{48}$ are used, conventional STF sequences for 20, 40, and 80 MHz may be represented according to Mathematical Expressions 21, 22, and 23 below, respectively.

$$0_6 C_{48(1:24)} 0_5 C_{48(25:48)} 0_5$$ [Mathematical Expression 21]

In Mathematical Expression 21 above, $C_{48(x:y)}$ refers to some vectors including $x^{th}$ to $y^{th}$ tones among vectors of $C_{48}$.

$$0_6 C_{53} 0_{11} C_{53} 0_5 = 0_6 C_{48(1:24)} 0_5 C_{48(25:48)} 0_{11} C_{48(1:24)} 0_5 C_{48(25:48)} 0_5$$ [Mathematical Expression 22]

In Mathematical Expression 22 above, $C_{53} = C_{48(1:24)} 0_5 C_{48(25:48)}$ is defined.

$$0_6 C_{117} 0_{11} C_{117} 0_5 = 0_6 C_{53} 0_{11} C_{53} 0_{11} C_{53} 0_{11} \\ C_{53} 0_5 = \ldots = 0_6 C_{48(1:24)} 0_5 C_{48(1:24)} 0_{11} C_{48(1:24)} \\ 0_5 C_{48(1:24)} 0_{11} C_{48(1:24)} 0_5 C_{48(1:24)} 0_{11} \\ C_{48(1:24)} 0_5 C_{48(25:48)} 0_5$$ [Mathematical Expression 23]

In Mathematical Expression 23 above, $C_{117}$ is defined according to Mathematical Expression 24 below.

$$C_{117} = C_{53} 0_{11} C_{53} = C_{48(1:24)} 0_5 C_{48(25:48)} 0_{11} C_{48(1:24)} \\ 0_5 C_{48(25:48)}$$ [Mathematical Expression 24]

Hereinafter, an exemplary embodiment of generating a new sequence by defining $X_N$ instead of $0_X$ in a conventional STF sequence will be described.

First, an exemplary embodiment using $X_N$ instead of $0_X$ in Mathematical Expression 21 above in a bandwidth of 20 MHz used in 64 FFT will be described. When $X_6 = [0, 0, 0, 0, X1, 0]$ is defined and $X_5 = [0, X2, 0, 0, 0]$ is defined, a sequence defined according to Mathematical Expression 25 below may be derived a sequence described with regard to Mathematical Expression 21 above.

$$X_6 C_{48(1:24)} 0_5 C_{48(25:48)} X_5$$ [Mathematical Expression 25]

When X1 and X2 are set according to Mathematical Expression 26 below in Mathematical Expression 25 above, a sequence defined in Mathematical Expression 25 above may correspond to PAPR=1.5469 and the number of Pilots=14. As seen from this result, PAPR may be further enhanced compared with PAPR=1.6179 in the case of X1=X2=0.

$$[X_1 \quad X_2] = \frac{1}{\sqrt{2}}[-1-j \quad 1+j]$$ [Mathematical Expression 26]

Then, with respect to a bandwidth of 40 MHz used by 128 FFT, in Mathematical Expression 22 above, a new sequence derived by defining $X_6$ and $X_5$ instead of $0_6$ and $0_5$ may be used. A sequence that is newly defined with respect to 40 MHz may be represented according to Mathematical Expression 27 below.

$$A_{128} = [A_{64}^1 \quad A_{64}^2]$$ [Mathematical Expression 27]

where $$A_{64} = [X_6 \quad C_{48(1:24)} \quad Z_5 \quad C_{48(25:48)} \quad X_5]$$

$$A_{64}^1 = s_1 \times A_{64}, A_{54}^2 = s_2 \times A_{64},$$

$$s_1, s_2 \in \{1, -1, i, -i\}$$

$$Z_n = [\underbrace{0, \ldots, 0}_{n}]$$

In Mathematical Expression 27 above, s1 and s2 are a plurality of color scalar values and are components for changing a phase of $A_{64}$. $Z_n$ is a zero vector with n 0. When X1 and X2 are defined according to Mathematical Expression 26 above, different $A_{128}$ may be generated according to a combination of Bland s2 in Mathematical Expression 27 below. According to the exemplary embodiments, Table 10 below shows a combination of s1 and s2 corresponding to PAPR=1.5469 and the number of Pilots=28. That is, similarly to the aforementioned exemplary embodiment, Table 10 below shows combinations of phase rotation factors s1 and s2.

TABLE 10

| | |
|---|---|
| 1 | i |
| 1 | -i |
| -1 | i |
| -1 | -i |
| i | 1 |
| i | -1 |
| -i | 1 |
| -i | -1 |

In Table 10 above, a left column indicates s1, a right column indicates s2, and each row indicates examples of a combination of independent s1 and s2.

With respect to a bandwidth of 40 MHz, a sequence $A_{128}$ defined according to another method instead of the exemplary embodiment described with regard to Mathematical Expression 27 above and Table 10 above may be used. Mathematical Expression 28 below indicates the second exemplary embodiment.

$$A_{128} = [A_{64}{}^1 A_{64}{}^2]$$

where $A_{64} = [X_6 C_{48(1:24)} A_5 C_{48(25:48)} X_5]$ $$A_5 = [0 0 A_1 0 0]$$

$$A_{64}{}^1 = s_1 \times A_{64}, A_{54}{}^2 = s_2 \times A_{64},$$

$$s_1, s_2 \in \{1, -1, i, -i\}$$ [Mathematical Expression 28]

Comparing Mathematical Expression 28 above and Mathematical Expression 27 above, five tones defined in a central part of $A_{64}$ are $Z_5$ that are all 0 in Mathematical Expression 27 above but a central value of five toes defined in a center in $A_{64}$ may have a value that is not 0 in Mathematical Expression 28 above. That is, according to the second exemplary embodiment proposed in Mathematical Expression 28 above, when X1 and X2 are defined according to Mathematical Expression 26 above, a combination of $A_1$, s1, and s2 corresponding to PAPR=1.6667 and the number of Pilots=30 may be considered. The combinations are shown in Table 11 below.

TABLE 11

| | | |
|---|---|---|
| 0.7 + 0.7i | 1 | i |
| 0.7 + 0.7i | 1 | −i |
| 0.7 + 0.7i | −1 | i |
| 0.7 + 0.7i | −1 | −i |
| 0.7 + 0.7i | i | 1 |
| 0.7 + 0.7i | i | −1 |
| 0.7 + 0.7i | −i | 1 |
| 0.7 + 0.7i | −i | −1 |

In Table 11 above, a first column indicates a value of $A_1$, a second column indicates s1, a third column indicates s2, and 8 rows indicate examples of independent combinations.

A third exemplary embodiment of 40 MHz proposes a method of using a sequence defined according to Mathematical Expression 29 below.

$$0_6 A_{53} A_{11} A_{53} 0_5 \quad \text{[Mathematical Expression 29]}$$

In Mathematical Expression 29 above, $A_{53}=C_{48(1:24)} A_5 C_{48(25:48)}$ may be defined and $A_5=[0, 0, A_1, 0, 0]$. $A_1$ may be determined as a value for minimizing PAPR and determined as an arbitrary value that is not 0. Alternatively, $A_1$ may be 0.

In Mathematical Expression 29 above, $A_{11}=[0, A_2, 0, 0, 0, A_3, 0, 0, 0, A_4, 0]$. In this case, $A_2$, $A_3$, and $A_4$ may be all determined as a value for minimizing PAPR and 0 may be applied like in the conventional case. Alternatively, when a DC component is considered, $A_{11}=[0, A_2, 0, 0, 0, 0, 0, 0, 0, A_4, 0]$ may be defined and only $A_2$ and $A_4$ for minimizing PAPR may be determined to define $A_{11}$. In the case of $A_1=A_2=A_3=A_4=0$ in Mathematical Expression 29 below, the same STF sequence as a conventional HTS system may be used.

A forth exemplary embodiment with respect to 40 MHz proposes a method of using a sequence defined according to Mathematical Expression 30 below.

$$X_6 A_{56} A_{11} A_{53} X_5 \quad \text{[Mathematical Expression 30]}$$

In Mathematical Expression 30 above, $X_6=[0, 0, 0, 0, X1, 0]$ and $X_5=[0, X2, 0, 0, 0]$. That is, in the exemplary embodiment of Mathematical Expression 30 above, $0_6$ and $0_5$ may be changed to $X_6$ and $X_5$ in Mathematical Expression 29 above. Through the procedure of changing a phase according to the exemplary embodiment of Mathematical Expression 30, a sequence Mathematical Expression 31 may be derived.

$$X_6 A_{53}^1 A_{11} A_{53}^2 X_5,$$

where $A_{53}^1 = s_1 \times A_{53}$, $A_{53}^2 = s_2 \times A_{53}$, $$A_{53} = [C_{48(1:24)} A_5 C_{48(25:48)}]$$

$$A_5 = [0\ 0\ A_1\ 0\ 0]$$

$$s_1, s_2 \in \{1, -1, i, -i\}$$

$$A_{11} = [0\ A_2\ 0\ 0\ 0\ A_3\ 0\ 0\ 0\ A_4\ 0] \quad \text{[Mathematical Expression 31]}$$

That is, in Mathematical Expression 31 above, s1 and s2 are scalar values for changing a phase of a vector $A_{53}$. In Mathematical Expression 31 above, 16 independent sequences with PAPR=1.7714 and the number of Pilots=31 may be generated and a combination of $A_1$, $A_2$, $A_3$, $A_4$, X1, X2, s1, and s2 for generating these sequences is shown in Table 12 below.

TABLE 12

| | | | | | | | |
|---|---|---|---|---|---|---|---|
| 0.7 + 0.7i | 0.7 + 0.7i | 0.7 + 0.7i | 0.7 − 0.7i | −0.7 − 0.7i | 0.7 − 0.7i | −i | 1 |
| 0.7 + 0.7i | 0.7 + 0.7i | 0.7 + 0.7i | −0.7 + 0.7i | −0.7 − 0.7i | −0.7 + 0.7i | i | 1 |
| 0.7 + 0.7i | 0.7 + 0.7i | 0.7 − 0.7i | −0.7 + 0.7i | 0.7 + 0.7i | 0.7 − 0.7i | −i | −1 |
| 0.7 + 0.7i | 0.7 + 0.7i | −0.7 + 0.7i | 0.7 − 0.7i | 0.7 + 0.7i | −0.7 + 0.7i | i | −1 |
| 0.7 + 0.7i | 0.7 − 0.7i | 0.7 + 0.7i | −0.7 − 0.7i | 0.7 − 0.7i | 0.7 + 0.7i | 1 | i |
| 0.7 + 0.7i | 0.7 − 0.7i | 0.7 − 0.7i | 0.7 + 0.7i | −0.7 + 0.7i | 0.7 + 0.7i | 1 | −i |
| 0.7 + 0.7i | 0.7 − 0.7i | 0.7 − 0.7i | −0.7 − 0.7i | −0.7 + 0.7i | −0.7 − 0.7i | −1 | −i |
| 0.7 + 0.7i | 0.7 − 0.7i | −0.7 − 0.7i | 0.7 + 0.7i | 0.7 − 0.7i | −0.7 − 0.7i | −1 | i |
| 0.7 + 0.7i | −0.7 + 0.7i | 0.7 + 0.7i | −0.7 − 0.7i | −0.7 − 0.7i | 0.7 + 0.7i | 1 | −i |
| 0.7 + 0.7i | −0.7 + 0.7i | −0.7 − 0.7i | 0.7 + 0.7i | 0.7 − 0.7i | 0.7 + 0.7i | 1 | i |
| 0.7 + 0.7i | −0.7 + 0.7i | −0.7 + 0.7i | −0.7 − 0.7i | 0.7 − 0.7i | −0.7 − 0.7i | −1 | i |
| 0.7 + 0.7i | −0.7 + 0.7i | −0.7 − 0.7i | 0.7 + 0.7i | −0.7 − 0.7i | −0.7 − 0.7i | −1 | −i |
| 0.7 + 0.7i | −0.7 − 0.7i | 0.7 − 0.7i | −0.7 − 0.7i | −0.7 − 0.7i | 0.7 − 0.7i | −i | 1 |
| 0.7 + 0.7i | −0.7 − 0.7i | −0.7 − 0.7i | 0.7 + 0.7i | −0.7 − 0.7i | −0.7 + 0.7i | i | 1 |
| 0.7 + 0.7i | −0.7 − 0.7i | −0.7 − 0.7i | 0.7 − 0.7i | 0.7 − 0.7i | 0.7 − 0.7i | −i | −1 |
| 0.7 + 0.7i | −0.7 − 0.7i | −0.7 − 0.7i | −0.7 − 0.7i | 0.7 + 0.7i | −0.7 + 0.7i | i | −1 |

Table 13 below shows a combination of $A_2$, $A_3$, $A_4$, X1, X2, s1, and s2 when $A_1=0$ is fixed unlike in Table 12 above. Sequences shown in Table 13 below may correspond to PAPR=1.6669 and the number of Pilots=29.

TABLE 13

| | | | | | | |
|---|---|---|---|---|---|---|
| 0.7 + 0.7i | 0.7 − 0.7i | 0.7 − 0.7i | −0.7 − 0.7i | −0.7 + 0.7i | 1 | i |
| 0.7 + 0.7i | −0.7 + 0.7i | −0.7 + 0.7i | −0.7 − 0.7i | 0.7 − 0.7i | 1 | −i |
| 0.7 + 0.7i | −0.7 − 0.7i | 0.7 + 0.7i | −0.7 − 0.7i | −0.7 + 0.7i | 1 | i |
| 0.7 + 0.7i | −0.7 − 0.7i | −0.7 + 0.7i | −0.7 − 0.7i | 0.7 − 0.7i | 1 | −i |
| 0.7 − 0.7i | 0.7 + 0.7i | 0.7 + 0.7i | −0.7 + 0.7i | −0.7 − 0.7i | −i | −1 |
| 0.7 − 0.7i | −0.7 + 0.7i | 0.7 + 0.7i | −0.7 − 0.7i | −0.7 − 0.7i | −i | −1 |
| 0.7 − 0.7i | −0.7 + 0.7i | −0.7 − 0.7i | −0.7 − 0.7i | 0.7 + 0.7i | −i | 1 |
| 0.7 − 0.7i | −0.7 − 0.7i | −0.7 − 0.7i | −0.7 − 0.7i | 0.7 + 0.7i | −i | 1 |
| −0.7 + 0.7i | 0.7 + 0.7i | 0.7 + 0.7i | 0.7 − 0.7i | −0.7 − 0.7i | i | −1 |

TABLE 13-continued

| | | | | | | |
|---|---|---|---|---|---|---|
| −0.7 + 0.7i | 0.7 − 0.7i | 0.7 + 0.7i | 0.7 − 0.7i | −0.7 − 0.7i | i | −1 |
| −0.7 + 0.7i | 0.7 − 0.7i | −0.7 − 0.7i | 0.7 − 0.7i | 0.7 + 0.7i | i | 1 |
| −0.7 + 0.7i | −0.7 − 0.7i | −0.7 − 0.7i | 0.7 − 0.7i | 0.7 + 0.7i | i | 1 |
| −0.7 − 0.7i | 0.7 + 0.7i | 0.7 − 0.7i | 0.7 + 0.7i | −0.7 − 0.7i | −1 | i |
| −0.7 − 0.7i | 0.7 + 0.7i | −0.7 + 0.7i | 0.7 + 0.7i | 0.7 − 0.7i | −1 | −i |
| −0.7 − 0.7i | 0.7 − 0.7i | 0.7 − 0.7i | 0.7 + 0.7i | −0.7 + 0.7i | −1 | i |
| −0.7 − 0.7i | −0.7 + 0.7i | −0.7 + 0.7i | 0.7 + 0.7i | 0.7 − 0.7i | −1 | −i |

Table 14 below shows a combination of $A_2$, $A_4$, X1, X2, s1, and s2 corresponding to PAPR=1.5469 and the number of Pilots=28. In sequences in an exemplary embodiment of Table 14 below, $A_1 = A_3 = 0$.

TABLE 14

| | | | | | |
|---|---|---|---|---|---|
| 0.7 + 0.7i | 0.7 − 0.7i | −0.7 − 0.7i | −0.7 + 0.7i | 1 | i |
| 0.7 + 0.7i | −0.7 + 0.7i | −0.7 − 0.7i | 0.7 − 0.7i | 1 | −i |
| 0.7 − 0.7i | 0.7 + 0.7i | −0.7 + 0.7i | −0.7 − 0.7i | −i | −1 |
| 0.7 − 0.7i | −0.7 − 0.7i | −0.7 + 0.7i | 0.7 + 0.7i | −i | 1 |
| −0.7 + 0.7i | 0.7 + 0.7i | 0.7 − 0.7i | −0.7 − 0.7i | i | −1 |
| −0.7 + 0.7i | −0.7 − 0.7i | 0.7 − 0.7i | 0.7 + 0.7i | i | 1 |
| −0.7 − 0.7i | 0.7 − 0.7i | 0.7 + 0.7i | −0.7 + 0.7i | −1 | i |
| −0.7 − 0.7i | −0.7 + 0.7i | 0.7 + 0.7i | 0.7 − 0.7i | 1 | −i |

Table 15 below shows a combination of $A_1$, $A_2$, $A_4$, X1, X2, s1, and s2 with PAPR=1.7121 and the number of Pilots=30. In sequences shown in an exemplary embodiment of Table 15, $A_3 = 0$ and a value $A_3$ are positioned adjacent to a DC value.

TABLE 15

| | | | | | |
|---|---|---|---|---|---|
| 0.7 + 0.7i | 0.7 + 0.7i | −0.7 − 0.7i | 0.7 − 0.7i | 0.7 + 0.7i | i | 1 |
| 0.7 + 0.7i | 0.7 + 0.7i | −0.7 − 0.7i | −0.7 + 0.7i | 0.7 + 0.7i | −i | 1 |
| 0.7 + 0.7i | 0.7 − 0.7i | −0.7 − 0.7i | 0.7 + 0.7i | 0.7 − 0.7i | −1 | −i |
| 0.7 + 0.7i | 0.7 − 0.7i | −0.7 − 0.7i | −0.7 − 0.7i | 0.7 − 0.7i | 1 | −i |
| 0.7 + 0.7i | −0.7 + 0.7i | 0.7 − 0.7i | 0.7 + 0.7i | −0.7 + 0.7i | −1 | i |
| 0.7 + 0.7i | −0.7 + 0.7i | 0.7 − 0.7i | −0.7 − 0.7i | −0.7 + 0.7i | 1 | i |
| 0.7 + 0.7i | −0.7 − 0.7i | 0.7 + 0.7i | 0.7 − 0.7i | −0.7 − 0.7i | i | −1 |
| 0.7 + 0.7i | −0.7 − 0.7i | 0.7 + 0.7i | −0.7 + 0.7i | −0.7 − 0.7i | −i | −1 |

Hereinafter, a sequence with respect to a bandwidth of 80 MHz with 256 FFT applied thereto may be newly proposed. Sequences generated using four different methods will be sequentially described.

First, a sequence $A_{256}$ including 256 tones defined according to Mathematical Expression 32 below is proposed.

$$A_{256} = [\, A_{64}^1 \; A_{64}^2 \; A_{64}^3 \; A_{64}^4 \,]$$ [Mathematical Expression 32]

where $$A_{64} = [\, X_6 \; C_{48}(1:24) \; Z_5 \; C_{48}(25:48) \; X_5 \,]$$

$$A_{64}^1 = s_1 \times A_{64}, \; A_{64}^2 = s_2 \times A_{64},$$

$$A_{64}^3 = s_3 \times A_{64}, \; A_{64}^4 = s_4 \times A_{64}$$

$$s_1, s_2, s_3, s_4 \in \{1, -1, i, -i\}$$

$$Z_n = [\underbrace{0, \ldots, 0}_{n}]$$

In Mathematical Expression 32 above, s1, s2, s3, and s4 are all complex scalars and $Z_n$ is a zero vector with n 0. When X1 and X2 in Mathematical Expression 32 above satisfy Mathematical Expression 26 above, a combination of s1, s2, s3, and s4 shown in Table 16 below may be generated.

Sequences generated according to a combination of Table 16 below may be sequences with PAPR=1.9527 and the number of Pilots=56.

TABLE 16

| | | | |
|---|---|---|---|
| 1 | −1 | 1 | 1 |
| 1 | −1 | 1 | −1 |
| 1 | −1 | 1 | i |
| 1 | −1 | 1 | −i |
| i | −i | i | 1 |
| i | −i | i | −1 |
| i | −i | i | i |
| i | −i | i | −i |
| 1 | −1 | 1 | 1 |
| 1 | −1 | 1 | −1 |
| 1 | −1 | 1 | i |
| 1 | −1 | 1 | −i |
| −i | i | −i | 1 |
| −i | i | −i | −1 |
| −i | i | −i | i |
| −i | i | −i | −i |

TABLE 16-continued

| | | | |
|---|---|---|---|
| −1 | 1 | −1 | 1 |
| −1 | 1 | −1 | −1 |
| −1 | 1 | −1 | i |
| −1 | 1 | −1 | −i |
| i | −i | i | 1 |
| i | −i | i | −1 |
| i | −i | i | −i |
| −1 | 1 | −1 | 1 |
| −1 | 1 | −1 | −1 |
| −1 | 1 | −1 | i |
| −1 | 1 | −1 | −i |
| −i | i | −i | 1 |
| −i | i | −i | −1 |
| −i | i | −i | i |
| −i | i | −i | −i |

A second exemplary embodiment with respect to a bandwidth of 80 MHz proposes a sequence $A_{256}$ defined according to Mathematical Expression 33 below.

$$A_{256} = [A_{64}^1 A_{64}^2 A_{64}^3 A_{64}^4]$$

where $A_{64} = [X_6 C_{48}(1:24) A_5 C_{48}(25:48) X_5]$ $$A_5 = [0 \, 0 \, A_1 \, 0 \, 0]$$

$A_{64}^1 = s_1 \times A_{64}, A_{64}^2 = s_2 \times A_{64}, A_{64}^3 = s_3 \times A_{64}, A_{64}^4 = s_4 \times A_{64}$ $s_1, s_2, s_3, s_4 \in \{1, -1, i, -i\}$ [Mathematical Expression 33]

With respect to Mathematical Expression 33 above, Table 17 below shows examples of sequences with PAPR=1.6667 and the number of Pilots=60 when X1 and X2 satisfy Mathematical Expression 26 above. Table 17 below shows combinations of $A_1$, s1, s2, s3, and s4 in Mathematical Expression 33 above.

TABLE 17

| | | | |
|---|---|---|---|
| 0.7 + 0.7i | 1 | 1 | 1 | -1 |
| 0.7 + 0.7i | 1 | 1 | -1 | 1 |
| 0.7 + 0.7i | 1 | -1 | 1 | 1 |
| 0.7 + 0.7i | 1 | -1 | -1 | -1 |
| 0.7 + 0.7i | 1 | i | 1 | -i |
| 0.7 + 0.7i | 1 | i | -1 | i |
| 0.7 + 0.7i | 1 | -i | 1 | i |
| 0.7 + 0.7i | 1 | -i | -1 | -i |
| 0.7 + 0.7i | -1 | 1 | 1 | 1 |
| 0.7 + 0.7i | -1 | 1 | 1 | -1 |
| 0.7 + 0.7i | -1 | -1 | 1 | -1 |
| 0.7 + 0.7i | -1 | -1 | -1 | 1 |
| 0.7 + 0.7i | -1 | i | 1 | i |
| 0.7 + 0.7i | -1 | i | -1 | -i |
| 0.7 + 0.7i | -1 | -i | 1 | -i |
| 0.7 + 0.7i | -1 | -i | -1 | i |
| 0.7 + 0.7i | i | 1 | i | -1 |
| 0.7 + 0.7i | i | 1 | -i | 1 |
| 0.7 + 0.7i | i | -1 | i | 1 |
| 0.7 + 0.7i | i | -1 | -i | -1 |
| 0.7 + 0.7i | i | i | i | -i |
| 0.7 + 0.7i | i | i | -i | i |
| 0.7 + 0.7i | i | -i | i | i |
| 0.7 + 0.7i | i | -i | -i | -i |
| 0.7 + 0.7i | -i | 1 | i | 1 |
| 0.7 + 0.7i | -i | 1 | -i | -1 |
| 0.7 + 0.7i | -i | -1 | i | -1 |
| 0.7 + 0.7i | -i | -1 | -i | 1 |
| 0.7 + 0.7i | -i | i | i | i |
| 0.7 + 0.7i | -i | i | -i | -i |
| 0.7 + 0.7i | -i | -i | i | -i |
| 0.7 + 0.7i | -i | -i | -i | i |

According to a third exemplary embodiment with respect to a bandwidth of 80 MHz, a sequence generated according to Mathematical Expression 34 below may be considered.

$0_6 A_{117} A_{11} A_{117} 0_5$ [Mathematical Expression 34]

In Mathematical Expression 34 above, $A_{117} = A_{53} A_{11} A_{53}$ and $A_{11} = [0, A_{-2}, 0, 0, 0, A_3, 0, 0, 0, A_4, 0]$. In this case, $A_2$, $A_3$, and $A_4$ may be determined as values for minimizing PAPR or may be set to 0. When a DC component is considered, $A_{11}$ to $A_3=0$ may be set and, in this case, $A_2$ and $A_4$ may be determined as a value for minimizing PAPR.

In Mathematical Expression 34 above, $A_{53}=C_{48(1:24)} A_5 C_{48(25:48)}$ and $A_5=[0, 0, A_1, 0, 0]$. In this case, $A_1$ may be determined as a value for minimizing PAPR and may be an arbitrary value that is not 0. $A_{11}$ may be defined as $A_{11}=\{0, 1+j, 0, 0, 0, -1-j, 0, 0, 0, -1-j, 0\}$ similarly to the description with regard to Mathematical Expression 5 above.

Since $0_6 A_{117} A_{11} A_{117} 0_5 = [0_6\ A_{53}A_{11}\ A_{53}A_{11}\ A_{53}A_{11}\ A_{53}\ 0_5]$, the phase rotation factor values described with regard to Mathematical Expression 9 above and Table 2 above may be applied to the same form to the present exemplary embodiment. In other words, phase rotation factor values may be generated and applied so as to correspond a vector $C_{52}D_{12}$ in Mathematical Expression 9 above to a vector $A_{53}A_{11}$ according to the present embodiment and to correspond to $C_{52}$ of Mathematical Expression 9 above to $A_{53}$ according to the present embodiment.

According to a fourth exemplary embodiment of the present invention, a sequence generated according to Mathematical Expression 35 below with respect to a bandwidth of 80 MHz may be applied.

$X_6 A_{117} A_{11} A_{117} X_5$ [Mathematical Expression 35]

Mathematical Expression 35 above may be an exemplary embodiment in which $X_6$ and $X_5$ are applied instead of $0_6$ and $0_5$ in Mathematical Expression 34 above, and $X_6=[0, 0, 0, 0, X1, 0]$ and $X_5=[0, X2, 0, 0, 0]$. X1 and X2 may be determined as a value for minimizing PAPR of a sequence. Mathematical Expression 35 above may be represented according to Mathematical Expression 36 below.

$X_6 A_{117}^1 A_{11} A_{117}^2 X_5$ where $A_{117}^1 = [s_1 \times A_{53} A_{11} s_2 \times A_{53}]$, $A_{117}^2 = [s_3 \times A_{53} A_{11} s_4 \times A_{53}]$, $s_1, s_2, s_3, s_4 \in \{1, -1, i, -i\}$ $A_{11} = [0\ A_2\ 0\ 0\ 0\ A_3\ 0\ 0\ 0\ A_4\ 0]$ [Mathematical Expression 36]

In Mathematical Expression 36 above, s1, s2, s3, and s4 are a complex scalar value and may constantly change a phase of $A_{53}$. Table 18 below shows combinations of $A_2$, $A_3$, $A_4$, s1, s2, s3, and s4 with PAPR=1.7719 and the number of Pilots=57 with respect to a sequence of Mathematical Expression 36 above.

TABLE 18

| | | | | | | |
|---|---|---|---|---|---|---|
| 0.7 + 0.7i | −0.7 − 0.7i | −0.7 − 0.7i | 1 | 1 | 1 | −1 |
| 0.7 + 0.7i | −0.7 − 0.7i | −0.7 − 0.7i | −1 | 1 | 1 | 1 |
| 0.7 − 0.7i | −0.7 + 0.7i | −0.7 + 0.7i | i | −i | −i | −i |
| 0.7 − 0.7i | −0.7 + 0.7i | −0.7 + 0.7i | −i | −i | −i | i |
| −0.7 + 0.7i | 0.7 − 0.7i | 0.7 − 0.7i | i | i | i | −i |
| −0.7 + 0.7i | 0.7 − 0.7i | 0.7 − 0.7i | −i | i | i | i |
| −0.7 − 0.7i | −0.7 + 0.7i | 0.7 + 0.7i | 1 | −1 | −1 | −1 |
| −0.7 − 0.7i | −0.7 + 0.7i | 0.7 + 0.7i | −1 | −1 | −1 | 1 |

Table 19 below shows combinations of $A_1$, X1, X2, s1, s2, s3, and s4 with PAPR=1.9529 and the number of Pilots=54 with respect to a sequence of Mathematical Expression 36 above.

TABLE 19

| | | | | | | |
|---|---|---|---|---|---|---|
| 0.7 + 0.7i | 0.7 + 0.7i | −0.7 − 0.7i | −1 | 1 | −1 | −1 |
| 0.7 + 0.7i | 0.7 + 0.7i | −0.7 − 0.7i | −1 | −1 | 1 | −1 |
| 0.7 + 0.7i | 0.7 − 0.7i | −0.7 − 0.7i | i | i | −i | i |
| 0.7 + 0.7i | 0.7 − 0.7i | −0.7 − 0.7i | i | −i | i | i |
| 0.7 + 0.7i | −0.7 + 0.7i | 0.7 − 0.7i | −i | i | −i | −i |
| 0.7 + 0.7i | −0.7 + 0.7i | 0.7 − 0.7i | −i | −i | i | −i |
| 0.7 + 0.7i | −0.7 − 0.7i | 0.7 + 0.7i | 1 | 1 | −1 | 1 |
| 0.7 + 0.7i | −0.7 − 0.7i | 0.7 + 0.7i | 1 | −1 | 1 | 1 |

Table 20 below shows combinations of $A_2$, $A_3$, $A_4$, X1, X2, s1, s2, s3, and s4 with PAPR=1.9529 and the number of Pilots=59 with respect to a sequence of Mathematical Expression 36 above.

TABLE 20

| | | | | | | | | |
|---|---|---|---|---|---|---|---|---|
| 0.7 + 0.7i | −0.7 − 0.7i | −0.7 − 0.7i | 0.7 + 0.7i | −0.7 − 0.7i | 1 | 1 | 1 | −1 |
| 0.7 + 0.7i | −0.7 − 0.7i | −0.7 − 0.7i | 0.7 + 0.7i | −0.7 − 0.7i | −1 | 1 | 1 | 1 |
| 0.7 + 0.7i | −0.7 − 0.7i | −0.7 − 0.7i | 0.7 + 0.7i | −0.7 − 0.7i | −1 | 1 | −1 | −1 |
| 0.7 + 0.7i | −0.7 − 0.7i | −0.7 − 0.7i | 0.7 + 0.7i | −0.7 − 0.7i | −1 | −1 | 1 | −1 |
| 0.7 − 0.7i | −0.7 + 0.7i | −0.7 + 0.7i | 0.7 − 0.7i | −0.7 + 0.7i | i | i | −i | i |
| 0.7 − 0.7i | −0.7 + 0.7i | −0.7 + 0.7i | 0.7 − 0.7i | −0.7 + 0.7i | i | −i | i | i |
| 0.7 − 0.7i | −0.7 + 0.7i | −0.7 + 0.7i | 0.7 − 0.7i | −0.7 + 0.7i | i | −i | −i | −i |
| 0.7 − 0.7i | −0.7 + 0.7i | −0.7 + 0.7i | 0.7 − 0.7i | −0.7 + 0.7i | −i | −i | −i | i |
| −0.7 + 0.7i | 0.7 − 0.7i | 0.7 − 0.7i | −0.7 + 0.7i | 0.7 − 0.7i | i | i | i | −i |
| −0.7 + 0.7i | 0.7 − 0.7i | 0.7 − 0.7i | −0.7 + 0.7i | 0.7 − 0.7i | −i | i | i | i |
| −0.7 + 0.7i | 0.7 − 0.7i | 0.7 − 0.7i | −0.7 + 0.7i | 0.7 − 0.7i | −i | i | −i | −i |
| −0.7 + 0.7i | 0.7 − 0.7i | 0.7 − 0.7i | −0.7 + 0.7i | 0.7 − 0.7i | −i | −i | i | −i |
| −0.7 − 0.7i | 0.7 + 0.7i | 0.7 + 0.7i | −0.7 − 0.7i | 0.7 + 0.7i | 1 | 1 | −1 | 1 |
| −0.7 − 0.7i | 0.7 + 0.7i | 0.7 + 0.7i | −0.7 − 0.7i | 0.7 + 0.7i | 1 | −1 | 1 | 1 |
| −0.7 − 0.7i | 0.7 + 0.7i | 0.7 + 0.7i | −0.7 − 0.7i | 0.7 + 0.7i | 1 | −1 | −1 | −1 |
| −0.7 − 0.7i | 0.7 + 0.7i | 0.7 + 0.7i | −0.7 − 0.7i | 0.7 + 0.7i | −1 | −1 | −1 | 1 |

Table 21 below shows combinations of $A_1$, $A_2$, $A_3$, $A_4$, X1, X2, s1, s2, s3, and s4 with PAPR=2.0054 and the number of Pilots=63 with respect to a sequence of Mathematical Expression 36 above.

TABLE 21

| | | | | | | | | | |
|---|---|---|---|---|---|---|---|---|---|
| 0.7 + 0.7i | 0.7 + 0.7i | −0.7 − 0.7i | −0.7 − 0.7i | 0.7 − 0.7i | 0.7 − 0.7i | 1 | 1 | 1 | −1 |
| 0.7 + 0.7i | 0.7 + 0.7i | −0.7 − 0.7i | −0.7 − 0.7i | 0.7 − 0.7i | 0.7 − 0.7i | −1 | 1 | 1 | 1 |
| 0.7 + 0.7i | 0.7 + 0.7i | −0.7 − 0.7i | −0.7 − 0.7i | −0.7 + 0.7i | −0.7 + 0.7i | 1 | 1 | 1 | −1 |
| 0.7 + 0.7i | 0.7 + 0.7i | −0.7 − 0.7i | −0.7 − 0.7i | −0.7 + 0.7i | −0.7 + 0.7i | −1 | 1 | 1 | 1 |
| 0.7 + 0.7i | 0.7 − 0.7i | −0.7 + 0.7i | −0.7 + 0.7i | 0.7 + 0.7i | 0.7 + 0.7i | i | −i | −i | −i |
| 0.7 + 0.7i | 0.7 − 0.7i | −0.7 + 0.7i | −0.7 + 0.7i | 0.7 + 0.7i | 0.7 + 0.7i | −i | −i | −i | i |
| 0.7 + 0.7i | 0.7 − 0.7i | −0.7 + 0.7i | −0.7 + 0.7i | −0.7 − 0.7i | −0.7 − 0.7i | i | −i | −i | −i |
| 0.7 + 0.7i | 0.7 − 0.7i | −0.7 + 0.7i | −0.7 + 0.7i | −0.7 − 0.7i | −0.7 − 0.7i | −i | −i | −i | i |
| 0.7 + 0.7i | −0.7 + 0.7i | 0.7 − 0.7i | 0.7 − 0.7i | 0.7 + 0.7i | 0.7 + 0.7i | i | i | i | −i |
| 0.7 + 0.7i | −0.7 + 0.7i | 0.7 − 0.7i | 0.7 − 0.7i | 0.7 + 0.7i | 0.7 + 0.7i | −i | i | i | i |
| 0.7 + 0.7i | −0.7 + 0.7i | 0.7 − 0.7i | 0.7 − 0.7i | −0.7 − 0.7i | −0.7 − 0.7i | i | i | i | −i |
| 0.7 + 0.7i | −0.7 + 0.7i | 0.7 − 0.7i | 0.7 − 0.7i | −0.7 − 0.7i | −0.7 − 0.7i | −i | i | i | i |
| 0.7 + 0.7i | −0.7 − 0.7i | 0.7 + 0.7i | 0.7 + 0.7i | 0.7 − 0.7i | 0.7 − 0.7i | 1 | −1 | −1 | −1 |
| 0.7 + 0.7i | −0.7 − 0.7i | 0.7 + 0.7i | 0.7 + 0.7i | 0.7 − 0.7i | 0.7 − 0.7i | −1 | −1 | −1 | 1 |
| 0.7 + 0.7i | −0.7 − 0.7i | 0.7 + 0.7i | 0.7 + 0.7i | −0.7 + 0.7i | −0.7 + 0.7i | 1 | −1 | −1 | −1 |
| 0.7 + 0.7i | −0.7 − 0.7i | 0.7 + 0.7i | 0.7 + 0.7i | −0.7 + 0.7i | −0.7 + 0.7i | −1 | −1 | −1 | 1 |

In Mathematical Expression 36 above, $A_{11}$ positioned in a central portion of a sequence $A_6 A_{117}{}^1 A_{11} A_{117}{}^2 X_5$ may be changed according to Mathematical Expression 37 below.

$$X_6 A_{117}{}^1 A_{11}{}^3 A_{117}{}^2 X_5,$$

where $A_{11}{}^3 = [0 A_2 0 0 0 0 0 0 0 A_4 0]$ [Mathematical Expression 37]

Table 22 below shows combinations of $A_2$, $A_3$, $A_4$, s1, s2, s3, and s4 with PAPR=1.8588 and the number of Pilots=56 with respect to a sequence of Mathematical Expression 37 above.

TABLE 22

| | | | | | | |
|---|---|---|---|---|---|---|
| 0.7 + 0.7i | −0.7 − 0.7i | −0.7 − 0.7i | 1 | 1 | 1 | −1 |
| 0.7 + 0.7i | −0.7 − 0.7i | −0.7 − 0.7i | 1 | 1 | −1 | 1 |
| 0.7 + 0.7i | −0.7 − 0.7i | −0.7 − 0.7i | 1 | −1 | 1 | 1 |
| 0.7 + 0.7i | −0.7 − 0.7i | −0.7 − 0.7i | 1 | i | 1 | −i |
| 0.7 + 0.7i | −0.7 − 0.7i | −0.7 − 0.7i | 1 | −i | 1 | i |
| 0.7 + 0.7i | −0.7 − 0.7i | −0.7 − 0.7i | −1 | 1 | 1 | 1 |
| 0.7 + 0.7i | −0.7 − 0.7i | −0.7 − 0.7i | i | 1 | −i | 1 |
| 0.7 + 0.7i | −0.7 − 0.7i | −0.7 − 0.7i | −i | 1 | i | 1 |
| 0.7 − 0.7i | −0.7 + 0.7i | −0.7 + 0.7i | 1 | −i | −1 | −i |
| 0.7 − 0.7i | −0.7 + 0.7i | −0.7 + 0.7i | −1 | −i | 1 | −i |
| 0.7 − 0.7i | −0.7 + 0.7i | −0.7 + 0.7i | i | −i | −i | −i |
| 0.7 − 0.7i | −0.7 + 0.7i | −0.7 + 0.7i | −i | 1 | −i | −1 |
| 0.7 − 0.7i | −0.7 + 0.7i | −0.7 + 0.7i | −i | −1 | −i | 1 |

TABLE 22-continued

| | | | | | | |
|---|---|---|---|---|---|---|
| 0.7 − 0.7i | −0.7 + 0.7i | −0.7 + 0.7i | −i | i | −i | −i |
| 0.7 − 0.7i | −0.7 + 0.7i | −0.7 + 0.7i | −i | −i | i | −i |
| 0.7 − 0.7i | −0.7 + 0.7i | −0.7 + 0.7i | −i | −i | −i | i |
| −0.7 + 0.7i | 0.7 − 0.7i | 0.7 − 0.7i | 1 | i | −1 | i |
| −0.7 + 0.7i | 0.7 − 0.7i | 0.7 − 0.7i | −1 | i | 1 | i |
| −0.7 + 0.7i | 0.7 − 0.7i | 0.7 − 0.7i | i | 1 | i | −1 |
| −0.7 + 0.7i | 0.7 − 0.7i | 0.7 − 0.7i | i | −1 | i | 1 |
| −0.7 + 0.7i | 0.7 − 0.7i | 0.7 − 0.7i | i | i | i | −i |
| −0.7 + 0.7i | 0.7 − 0.7i | 0.7 − 0.7i | i | i | −i | i |
| −0.7 + 0.7i | 0.7 − 0.7i | 0.7 − 0.7i | −i | i | i | i |
| −0.7 − 0.7i | 0.7 + 0.7i | 0.7 + 0.7i | 1 | −1 | −1 | −1 |
| −0.7 − 0.7i | 0.7 + 0.7i | 0.7 + 0.7i | −1 | 1 | −1 | −1 |
| −0.7 − 0.7i | 0.7 + 0.7i | 0.7 + 0.7i | −1 | −1 | 1 | −1 |

Table 23 below shows combinations of $A_2$, $A_3$, $A_4$, X1, X2, s1, s2, s3, and s4 with PAPR=1.8688 and the number of Pilots=58 with respect to a sequence of Mathematical Expression 37 above.

TABLE 23

| | | | | | | | | |
|---|---|---|---|---|---|---|---|---|
| 0.7 + 0.7i | −0.7 − 0.7i | −0.7 − 0.7i | 0.7 + 0.7i | 0.7 + 0.7i | −1 | 1 | 1 | 1 |
| 0.7 + 0.7i | −0.7 − 0.7i | −0.7 − 0.7i | −0.7 − 0.7i | −0.7 − 0.7i | 1 | 1 | 1 | −1 |
| 0.7 − 0.7i | −0.7 + 0.7i | −0.7 + 0.7i | 0.7 − 0.7i | 0.7 − 0.7i | i | −i | −i | −i |
| 0.7 − 0.7i | −0.7 + 0.7i | −0.7 + 0.7i | −0.7 + 0.7i | −0.7 + 0.7i | −i | −i | −i | i |
| −0.7 + 0.7i | 0.7 − 0.7i | 0.7 − 0.7i | 0.7 − 0.7i | 0.7 − 0.7i | i | i | i | −i |
| −0.7 + 0.7i | 0.7 − 0.7i | 0.7 − 0.7i | −0.7 + 0.7i | −0.7 + 0.7i | −i | i | i | i |
| −0.7 − 0.7i | 0.7 + 0.7i | 0.7 + 0.7i | 0.7 + 0.7i | 0.7 + 0.7i | −1 | −1 | −1 | 1 |
| −0.7 − 0.7i | 0.7 + 0.7i | 0.7 + 0.7i | −0.7 − 0.7i | −0.7 − 0.7i | 1 | −1 | −1 | −1 |

Table 24 below shows combinations of $A_1$, $A_2$, $A_3$, $A_4$, X1, X2, s1, s2, s3, and s4 with PAPR=1.9889 and the number of Pilots=62 with respect to a sequence of Mathematical Expression 37 above.

TABLE 24

| | | | | | | | | |
|---|---|---|---|---|---|---|---|---|
| 0.7 + 0.7i | 0.7 + 0.7i | 0.7 − 0.7i | 0.7 + 0.7i | −0.7 − 0.7i | −0.7 − 0.7i | 1 | −i | −1 | −i |
| 0.7 + 0.7i | 0.7 + 0.7i | 0.7 − 0.7i | 0.7 + 0.7i | −0.7 − 0.7i | −0.7 − 0.7i | −i | 1 | −i | −1 |
| 0.7 + 0.7i | 0.7 + 0.7i | −0.7 + 0.7i | 0.7 + 0.7i | −0.7 − 0.7i | −0.7 − 0.7i | 1 | i | −1 | i |
| 0.7 + 0.7i | 0.7 + 0.7i | −0.7 + 0.7i | 0.7 + 0.7i | −0.7 − 0.7i | −0.7 − 0.7i | i | 1 | i | −1 |
| 0.7 + 0.7i | 0.7 − 0.7i | 0.7 + 0.7i | 0.7 − 0.7i | −0.7 + 0.7i | −0.7 + 0.7i | 1 | −i | 1 | i |
| 0.7 + 0.7i | 0.7 − 0.7i | 0.7 + 0.7i | 0.7 − 0.7i | −0.7 + 0.7i | −0.7 + 0.7i | −i | 1 | i | 1 |
| 0.7 + 0.7i | 0.7 − 0.7i | −0.7 − 0.7i | 0.7 − 0.7i | −0.7 + 0.7i | −0.7 + 0.7i | −1 | −i | −1 | i |
| 0.7 + 0.7i | 0.7 − 0.7i | −0.7 − 0.7i | 0.7 − 0.7i | −0.7 + 0.7i | −0.7 + 0.7i | −i | −1 | i | −1 |
| 0.7 + 0.7i | −0.7 + 0.7i | 0.7 + 0.7i | −0.7 + 0.7i | 0.7 − 0.7i | 0.7 − 0.7i | 1 | i | 1 | −i |
| 0.7 + 0.7i | −0.7 + 0.7i | 0.7 + 0.7i | −0.7 + 0.7i | 0.7 − 0.7i | 0.7 − 0.7i | i | 1 | −i | 1 |
| 0.7 + 0.7i | −0.7 + 0.7i | −0.7 − 0.7i | −0.7 + 0.7i | 0.7 − 0.7i | 0.7 − 0.7i | −1 | i | −1 | −i |
| 0.7 + 0.7i | −0.7 + 0.7i | −0.7 − 0.7i | −0.7 + 0.7i | 0.7 − 0.7i | 0.7 − 0.7i | i | −1 | −i | −1 |
| 0.7 + 0.7i | −0.7 − 0.7i | 0.7 − 0.7i | −0.7 − 0.7i | 0.7 + 0.7i | 0.7 + 0.7i | −1 | −i | 1 | −i |
| 0.7 + 0.7i | −0.7 − 0.7i | 0.7 − 0.7i | −0.7 − 0.7i | 0.7 + 0.7i | 0.7 + 0.7i | −i | −1 | −i | 1 |
| 0.7 + 0.7i | −0.7 − 0.7i | −0.7 + 0.7i | −0.7 − 0.7i | 0.7 + 0.7i | 0.7 + 0.7i | −1 | i | 1 | i |
| 0.7 + 0.7i | −0.7 − 0.7i | −0.7 + 0.7i | −0.7 − 0.7i | 0.7 + 0.7i | 0.7 + 0.7i | i | −1 | i | 1 |

Differently from the aforementioned exemplary embodiments, hereinafter, a sequence with a sequence length defined to be doubled compared with a conventional case with respect to each bandwidth is proposed. That is, a sequence of the case in which an FFT size is applied to be doubled is proposed.

First, when 128 FFT is applied to a bandwidth of 20 MHz, a sequence of Mathematical Expression 38 below may be generated.

$$B_6 A_{53} A_{11} A_{53} B_5 \quad \text{[Mathematical Expression 38]}$$

In Mathematical Expression 38 above, $B_6$=[0, 0, 0, 0, B1, 0] and $B_5$=[0, B2, 0, 0, 0]. B1 and B2 may be determined as a value for minimizing PAPR and may be determined as an arbitrary value that is not 0. $A_{53}$ and $A_{11}$ are the same as definition of Mathematical Expression 29 above. In the case of $A_1=A_2=A_3=A_4=B1=B2=0$ in Mathematical Expression 38 above, the same sequence as 40 MHz in a conventional STF system may be used.

Then, when 256 FFT is applied with respect to a bandwidth of 40 MHz, a sequence of Mathematical Expression 39 below may be generated.

$$B_6 A_{117} A_{11} A_{117} B_5 \quad \text{[Mathematical Expression 39]}$$

Similarly to Mathematical Expression 38 above, $B_6$=[0, 0, 0, 0, B1, 0] and $B_5$=[0, B2, 0, 0, 0] also in Mathematical Expression 39 above. $A_{117}=A_{53}A_{11}A_{53}$ and $A_{11}$=[0, A2, 0, 0, 0, A3, 0, 0, 0, A4, 0] may be defined. In this case, A2, A3, and A4 may be determined as values for minimizing PAPR. In addition, in consideration with a DC component, $A_{11}$ to A3 may be 0.

In Mathematical Expression 39 above, $A_{53}$ may be $C_{48(1:24)}A_5C_{48(25:48)}$ and $A_5$=[0, 0, A1, 0, 0]. A1 may also be determined as a value for minimizing PAPR. In Mathematical Expression 39 above, $A_{11}$ may be defined as $A_{11}$={0, 1+j, 0, 0, 0, −1−j, 0, 0, 0, −1−j, 0} similarly to the description of Mathematical Expression 5 above.

When $0_6$ and $0_5$ are applied instead of $B_6$ and $B_5$, $0_6 A_{117} A_{11} A_{117} 0_5$=[$0_6$ $A_{53} A_{11}$ $A_{53} A_{11}$ $A_{53} A_{11}$ $A_{53}$ $0_5$] as described with regard to Mathematical Expression 34 above and, thus, phase rotation factors described with regard to Mathematical Expression 9 and Table 2 above may be applied in the same form to the present exemplary embodiment. In other words, phase rotation factor values may be generated and applied to correspond a vector $C_{52}D_{12}$ in Mathematical Expression 9 above to a vector $A_{53}A_{11}$ according to the present embodiment and to correspond to $C_{52}$ in Mathematical Expression 9 to $A_{53}$ according to the present embodiment. In the case of $A_1=A_2=A_3=A_4=B1=B2=0$ in Mathematical Expression 39 above, the same sequence as 80 MHz in a conventional STF system may be used.

Then, when 512 FFT is applied to a band of 80 MHz, a sequence of Mathematical Expression 40 below may be generated.

$$B_6 A_{245} A_{11} A_{245} B_5 \quad \text{[Mathematical Expression 40]}$$

In Mathematical Expression 40 above, $B_6$=[0, 0, 0, 0, B1, 0] and $B_5$=[0, B2, 0, 0, 0] like in Mathematical Expressions 38 and 39 above. $A_{245}=A_{117}A_{11}A_{117}$ and $A_{11}$=[0, A2, 0, 0, 0, A3, 0, 0, 0, A4, 0] may be defined. In this case, A2, A3, and A4 may be determined as values for minimizing PAPR. In addition, in consideration of a DC component, $A_{11}$ to A3 may also be 0. As described with regard to Mathematical Expression 39 above, $A_{53}$ in Mathematical Expression 40 may be $C_{48(1:24)}A_5C_{48(25:48)}$ and $A_5$=[0, 0, A1, 0, 0]. A1 may also be determined as a value for minimizing PAPR.

With respect to a sequence of Mathematical Expression 40 above, the aforementioned phase rotation factor value described with regard to Mathematical Expression 10 above may be applied in a similar way. In other words, a phase rotation factor may be applied to $A_{245}A_{11}$ and another phase rotation factor may be applied to subsequent $A_{245}$.

When Mathematical Expression 40 above is separately considered with respect to [$B_6$ $A_{117}A_{11}$ $A_{117}A_{11}$ $A_{117}A_{11}$ $A_{117}B_5$], four phase rotation factors may be applied. In other words, a phase rotation factor may be applied to three $A_{117}A_{11}$ and a fourth phase rotation factor may be applied to $A_{117}$ before last $B_5$ to generate a sequence for 80 MHz.

Differently from the exemplary embodiment with regard to Mathematical Expressions 38 to Mathematical Expression 40 above, a sequence with a sequence length defined with respect to each bandwidth to be lengthened four times compared with the conventional case is also proposed.

When 256 FFT is applied with respect to a bandwidth of 20 MHz, a sequence form proposed with respect to a bandwidth of 40 MHz in Mathematical Expression 39 above may be used. $B_6$=[0, 0, 0, 0, B1, 0] and $B_5$=[0, B2, 0, 0, 0] may be defined. $A_{117}$=$A_{53}A_{11}A_{53}$ and $A_{11}$=[0, A2, 0, 0, 0, A3, 0, 0, 0, A4, 0] may be defined. In this case, A2, A3, and A4 may be determined as values for minimizing PAPR. In addition, in consideration of a DC component, $A_{11}$ to A3 values may be 0.

In Mathematical Expression 39 above, $A_{53}$ may be $C_{48(1:24)}A_5C_{48(25:48)}$ and $A_5$=[0, 0, A1, 0, 0]. A1 may also be determined as a value for minimizing PAPR. In Mathematical Expression 39 above, $A_{11}$ may be defined as $A_{11}$={0, 1+j, 0, 0, 0, −1−j, 0, 0, 0, −1−j, 0} similarly to the description with regard to Mathematical Expression 5 above.

When $0_6$ and $0_5$ are applied instead of $B_6$ and $B_5$, $0_6A_{117}A_{11}A_{117}0_5$=[$0_6$ $A_{53}A_{11}$ $A_{53}A_{11}$ $A_{53}A_{11}$ $A_{53}$ $0_5$] is defined as described with regard to Mathematical Expression 34 above and, thus, the phase rotation factor values described with regard to Mathematical Expression 9 and Table 2 above may be applied in the same form to the present exemplary embodiment. In other words, phase rotation factor values may be generated and applied to correspond to a vector $C_{52}D_{12}$ in Mathematical Expression 9 to a vector $A_{53}A_{11}$ according to the present exemplary embodiment and to correspond to $C_{52}$ in Mathematical Expression 9 above to $A_{53}$ according to the present exemplary embodiment. In the case of $A_1$=$A_2$=$A_3$=$A_4$=B1=B2=0, the same sequence as 80 MHz in a conventional STF system may be used.

Similarly to this method, when 512 FFT is applied to a bandwidth of 40 MHz, the sequence form proposed with respect to a bandwidth of 80 MHz in Mathematical Expression 40 above may be used. $B_6$=[0, 0, 0, 0, B1, 0] and $B_5$=[0, B2, 0, 0, 0] may be defined. $A_{245}$=$A_{117}A_{11}A_{117}$ and $A_{11}$=[0, A2, 0, 0, 0, A3, 0, 0, 0, A4, 0] may be defined. In this case, A2, A3, and A4 may be determined as values for minimizing PAPR. In addition, in consideration of a DC component, $A_{11}$ to A3 values may also be 0. In addition, as described with regard to Mathematical Expression 39 above, $A_{53}$ in Mathematical Expression 40 above may be $C_{48(1:24)}A_5C_{48(25:48)}$ and $A_5$=[0, 0, A1, 0, 0]. A1 may also be determined as a value for minimizing PAPR.

With respect to a sequence of Mathematical Expression 40 above, the phase rotation factor value described with regard to Mathematical Expression 10 above may be applied in a similar way. In other words, a phase rotation factor may be applied to $A_{245}A_{11}$ and another phase rotation factor may be applied to subsequent $A_{245}$.

When Mathematical Expression 40 above is separately considered with respect to [$B_6$ $A_{117}A_{11}$ $A_{117}A_{11}$ $A_{117}A_{11}$ $A_{117}B_5$], four phase rotation factors may be applied. In other words, a phase rotation factor may be applied to three $A_{117}A_{11}$ and a fourth phase rotation factor may be applied to $A_{117}$ before last $B_5$ to generate a sequence for 80 MHz.

Furthermore, Mathematical Expression 40 above may be subdivided and may be separately considered with respect to [$B_6$ $A_{53}A_{11}$ $A_{53}A_{11}$ $A_{53}A_{11}$ $A_{53}A_{11}$ $A_{53}A_{11}$ $A_{53}A_{11}A_{53}A_{11}$ $A_{53}$ $B_5$]. In this case, eight phase rotation factors may be applied to generate a sequence by applying respective phase rotation factors to seven $A_{53}A_{11}$ and one last $A_{53}$.

Lastly, when 1024 FFT is applied with respect to a bandwidth of 80 MHz, a sequence form of Mathematical Expression 41 below may be applied.

$$B_6 A_{501} A_{11} A_{501} B_5 \quad \text{[Mathematical Expression 41]}$$

$B_6$=[0, 0, 0, 0, B1, 0] and $B_5$=[0, B2, 0, 0, 0] may be defined and B1 and B2 may be determined as values for minimizing PAPR. $A_{501}$=$A_{245}A_{11}A_{245}$ and $A_{11}$=[0, A2, 0, 0, 0, A3, 0, 0, 0, A4, 0] may be defined. In this case, A2, A3, and A4 may be determined as values for minimizing PAPR. In consideration of a DC component, $A_{11}$ to A3 values may be 0. As described with regard to Mathematical Expression 39 above, $A_{53}$ may be $C_{48(1:24)}A_5C_{48(25:48)}$ and $A_5$=[0, 0, A1, 0, 0]. A1 may also be determined as a value for minimizing PAPR.

When the form of Mathematical Expression 41 above is considered, the method of applying the phase rotation factor described with regard to Mathematical Expression 11 above may also be used. That is, a phase rotation factor may be applied to $A_{501}A_{11}$ and another phase rotation factor may be applied to $A_{501}$ before last $B_5$.

Furthermore, when a sequence of Mathematical Expression 41 above is separately considered with respect to [$B_6$ $A_{245}A_{11}$ $A_{245}A_{11}$ $A_{245}A_{11}$ $A_{245}$ $B_5$], four phase rotation factors may be applied in a unit of $A_{245}A_{11}$ or $A_{245}$. In addition, when the sequence is understood to be subdivided as $A_{245}$=$A_{117}A_{11}A_{117}$, the sequence may be designed as applying eight phase rotation factors. Lastly, the sequence may also be subdivided as $A_{117}$=$A_{53}A_{11}A_{53}$ to design a sequence with 16 phase rotation factors applied thereto.

Figure 19:
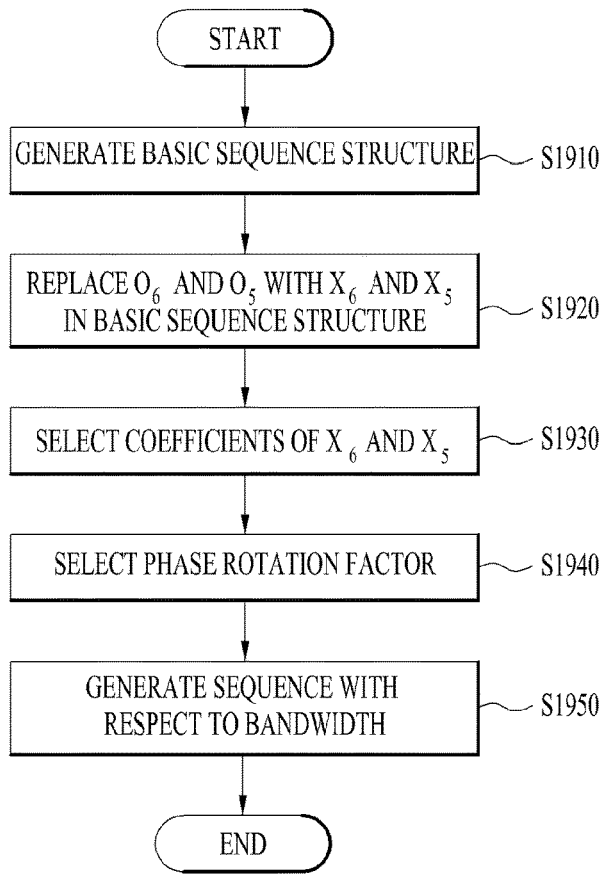

FIG. 19 is a flowchart showing another proposed method of generating a sequence. FIG. 19 shows the aforementioned exemplary embodiments according to a time series. Accordingly, although not obviously illustrated or described with regard to FIG. 19, the above proposals may be easily understood in the same or similar way. Although FIG. 19 illustrates an exemplary embodiment in terms of an operation of an AP, a UE may also generate a sequence according to the same exemplary embodiment.

First, the AP may generate a basic sequence structure (S1910). The basic sequence structure refers to a vector including a series of tones that are repeatedly used in a procedure of generating a sequence with respect to a bandwidth of 20, 40, and 80 MHz. For example, as described with regard to Mathematical Expression 21 above, a basic sequence structure with respect to a bandwidth of 20 MHz may include $0_6C_{48(1:24)}0_5C_{48(25:48)}0_5$ with 112 tones. A basic sequence structure with respect to a band of 40 and 80 MHz may be determined by repeating a basic sequence structure of a band of 20 MHz.

When the basic sequence structure is generated, the AP may replace $0_6$ and $0_5$ with $X_6$ and $X_5$ in the basic sequence structure, respectively (S1920). $X_6$=[0, 0, 0, 0, X1, 0] and $X_5$=[0, X2, 0, 0, 0] may be defined and X1 and X2 may be a non-zero value that is not 0. That is, a series of tones generated according to operation S1920 may be represented according to Mathematical Expression 25 above.

Then, the AP may determine X1 and X2 as a value for lowering PAPR (S1930). According to an exemplary embodiment, $$[X_1 \quad X_2] = \frac{1}{\sqrt{2}}[-1-j \quad 1+j]$$

may be defined (Mathematical Expression 26) but X1 and X2 values may not be limited to the present exemplary embodiment and a plurality of candidate values for obtaining the same PAPR may be present. A basic sequence structure with $X_6$ and $X_5$ inserted thereinto may also be referred to as a replacement sequence structure for convenience of description.

The AP may select a phase rotation factor to be used to generate a sequence (S1940). Differently from the phase rotation factor in FIG. 18, the phase rotation factor using s1, s2, s3, and s4 has been described in the proposed sequence generating method 2. s1, s2, s3, and s4 may have any one of [1, −1, i, −i]. In terms of PAPR, a plurality of equivalent phase rotation factors may be predetermined according to each bandwidth and the AP may select any one of a plurality of phase rotation factors. According to a bandwidth, the phase rotation factor may include different number of terms but, for example, it may be understood that a phase rotation factor is not defined with respect to a bandwidth of 20 MHz or includes only one term having a value of 1. On the other hand, with respect to bandwidths of 40 and 80 MHz, phase rotation factor including 2 and 4 terms may be defined, respectively.

Then, the AP may generate a sequence with respect to a bandwidth (S1950). A sequence generating procedure may be understood as repeating a replacement sequence structure a predetermined number of times according to a bandwidth. In the repetition procedure, one or more values that are not 0 may be inserted into consecutive values of 0 positioned between replacement sequence structures. For example, arbitrary values that are not 0, such as $A_5$ of Mathematical Expression 28 or $A_{11}$ of Mathematical Expression 29, may be inserted and one may be selected as an arbitrary value that is not 0 among a plurality of equivalent candidate values similarly to the exemplary embodiments described with regard to Table 11 to 14 above.

When a sequence is generated according to the above proposed exemplary embodiments, the AP may insert the corresponding sequence into a preamble and transmit the sequence to the UE. As described above with reference to FIG. 18, the sequence may be used in synchronization between the UE and the AP, channel measurement, AGC, and so on.

5. Apparatus Configuration

Figure 20:
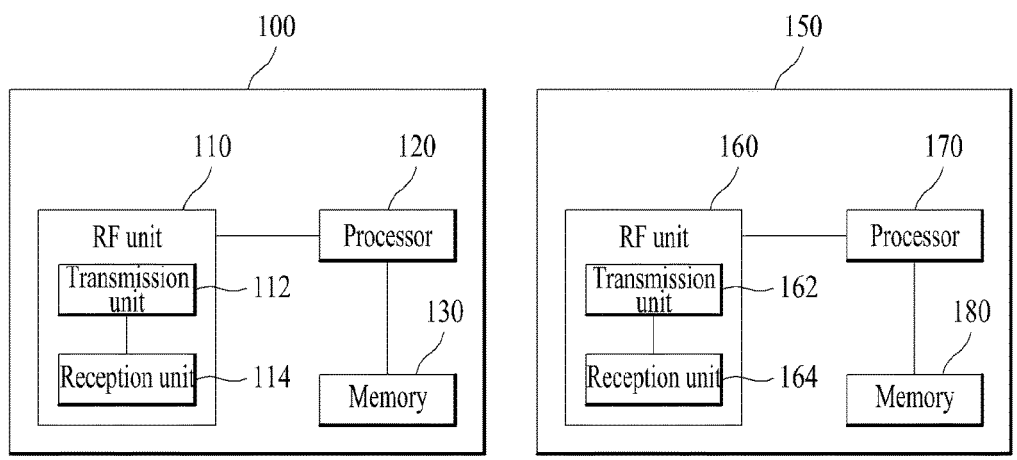
FIG. 20 is a diagram illustrating a configuration of a user equipment (UE) and a base station (BS) related to an embodiment of the present invention.

FIG. 20 is a block diagram showing the configuration of a user equipment and a base station (or, AP (Access Point) according to one embodiment of the present invention. In FIG. 20, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 20, a communication environment may be established between a plurality of reception module and the transmission module. In addition, the base station 200 shown in FIG. 20 is applicable to a macro cell transmitter and a small cell transmitter.

The RF units 110 and 210 may include transmitters 112 and 212 and receivers 114 and 214, respectively. The transmitter 112 and the receiver 114 of the user equipment 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another transmission module and reception modules and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the aforementioned sequence generating method has been described in terms of an example applied to an IEEE 802.11 system and an HEW system, the method may be applied to various wireless communication system including IEEE 802.16, 3GPP LTE, and LTE-A other than an IEEE 802.11 system and a HEW system.

The invention claimed is:

1. A method of generating a sequence to be inserted into a preamble by an access point (AP) in a wireless local area network (LAN) system, the method comprising:
   generating a basic sequence structure comprising $C_{48}$ comprising 48 tones and having 12 non-zero values, $X_6$ comprising 6 tones and having one non-zero value, and $X_5$ comprising five tones and having one non-zero value;
   determining X1 that is a non-zero value included in the $X_6$ and X2 that is a non-zero value included in the $X_5$;
   selecting any one of a plurality of predetermined phase rotation factors with respect to a bandwidth for communication with a user equipment (UE);
   generating the sequence using the basic sequence structure and the selected phase rotation factor; and
   transmitting, to a station (STA), the preamble into which the sequence is inserted,
   wherein the selected phase rotation factor is applied in a unit of the basic sequence structure that is repeatedly included in the sequence once or more.

2. The method according to claim 1, wherein the basic sequence structure is configured in the form of $X_6 C_{48(1:24)} 0_5 C_{48(25:48)} X_5$, the $C_{48(1:24)}$, indicates first to $24^{th}$ tones of the $C_{48}$, the $C_{48(25:48)}$, indicates $25^{th}$ to $48^{th}$ tones of the $C_{48}$, and the $0_5$ indicates five consecutive 0.

3. The method according to claim 1, wherein the $X_6$ is configured in the form of [0, 0, 0, 0, X1, 0] and the $X_5$ is configured in the form of [0, X2, 0, 0, 0].

4. The method according to claim 3, wherein the X1 and the X2 satisfy $$[X_1 \ X_2] = \frac{1}{\sqrt{2}}[-1-j \ 1+j].$$ Mathematical Expression 5. The method according to claim 1, wherein the basic sequence structure is configured in the form of $X_6 C_{48(1:24)} A_5 C_{48(25:48)} X_5$, the $C_{48(1:24)}$ indicates first to $24^{th}$ tones of the $C_{48}$, the $C_{48(25:48)}$ indicates $25^{th}$ to $48^{th}$ tones of the $C_{48}$, and the $A_5$ comprises 5 tones and comprises one non-zero value in a central part.

6. The method according to claim 1,
   wherein the generating of the sequence comprises:
   generating the sequence by repeating the basic sequence structure once when the bandwidth corresponds to 20 MHz;
   generating the sequence by repeating the basic sequence structure twice and by using two corresponding phase rotation values when the bandwidth corresponds to 40 MHz; and
   generating the sequence by repeating the basic sequence structure four times and using four corresponding phase rotation values when the bandwidth corresponds to 80 MHz.

7. The method according to claim 1,
   wherein the generating of the sequence comprises:
   generating the sequence by repeating the basic sequence structure once when the bandwidth corresponds to 20 MHz;
   generating the sequence by repeating a new sequence, in which the X5 and the X6 are removed from the basic sequence structure, twice and by using two corresponding phase rotation values, A11, X5 and X6 when the bandwidth corresponds to 40 MHz; and
   generating the sequence by repeating the new sequence, in which the X5 and the X6 are removed from the basic sequence structure, and by using two corresponding phase rotation values when the bandwidth corresponds to 80 MHz.

8. The method according to claim 7, wherein the $A_{11}$ is configured in the form of [0, A2, 0, 0, 0, A3, 0, 0, 0, A4, 0] and the A2, A3, and A4 are complex numbers that are not 0.

9. An access point (AP) for generating a sequence to be inserted into a preamble in a wireless local area network (LAN) system, the AP comprising:
   a transmitter;
   a receiver; and
   a processor connected to the transmitter and the receiver and configured to:
   generate a basic sequence structure comprising $C_{48}$ comprising 48 tones and having 12 non-zero values, $X_6$ comprising 6 tones and having one non-zero value, and $X_5$ comprising five tones and having one non-zero value,
   determine X1 that is a non-zero value included in the $X_6$ and X2 that is a non-zero value included in the $X_5$,
   selects any one of a plurality of predetermined phase rotation factors with respect to a bandwidth for communication with a user equipment (UE),
   generate the sequence inserted into the preamble to be transmitted to the UE using the basic sequence structure and the selected phase rotation factor, and
   control the transmitter to transmit the preamble into which the sequence is inserted to a station (STA),
   wherein the selected phase rotation factor is applied in a unit of the basic sequence structure that is repeatedly included in the sequence once or more.

10. The AP according to claim 9, wherein the basic sequence structure is configured in the form of $X_6 C_{48(1:24)} A_5 C_{48(25:48)} X_5$, the $C_{48(1:24)}$ indicates first to $24^{th}$ tones of the $C_{48}$, the $C_{48(25:48)}$ indicates $25^{th}$ to $48^{th}$ tones of the $C_{48}$, and the $0_5$ indicates five consecutive 0.

11. The AP according to claim 9, wherein the $X_6$ is configured in the form of [0, 0, 0, 0, X1, 0] and the $X_5$ is configured in the form of [0, X2, 0, 0, 0].

12. The AP according to claim 11, wherein the X1 and the X2 satisfy $$[X_1 \ X_2] = \frac{1}{\sqrt{2}}[-1-j \ 1+j].$$ Mathematical Expression 13. The AP according to claim 9, wherein the basic sequence structure is configured in the form of $X_6 C_{48(1:24)} A_5 C_{48(25:48)} X_5$, the $C_{48(1:24)}$ indicates first to $24^{th}$ tones of the $C_{48}$, the $C_{48(25:48)}$ indicates $25^{th}$ to $48^{th}$ tones of the $C_4$, and the $A_5$ comprises 5 tones and comprises one non-zero value in a central part.

14. The AP according to claim 9,
wherein the processor is further configured to:
generate the sequence by repeating the basic sequence structure once when the bandwidth corresponds to 20 MHz;
generate the sequence by repeating the basic sequence structure twice and by using two corresponding phase rotation values when the bandwidth corresponds to 40 MHz; and
generate the sequence by repeating the basic sequence structure four times and using four corresponding phase rotation values when the bandwidth corresponds to 80 MHz.

15. The AP according to claim 9,
wherein the processor is further configured to:
generate the sequence by repeating the basic sequence structure once when the bandwidth corresponds to 20 MHz;
generate the sequence by repeating a new sequence, in which the X5 and the X6 are removed from the basic sequence structure, twice and by using two corresponding phase rotation values, A11, X5, and X6 when bandwidth corresponds to 40 MHz; and
generate the sequence by repeating the new sequence, in which the X5 and the X6 are removed from the basic sequence structure, and by using two corresponding phase rotation values when the bandwidth corresponds to 80 MHz.

16. The AP according to claim 15, wherein the $A_{11}$ is configured in the form of [0, A2, 0, 0, 0, A3, 0, 0, 0, A4, 0] and the A2, A3, and A4 are complex numbers that are not 0.

* * * * *